United States Patent
Fu et al.

(10) Patent No.: US 11,195,398 B1
(45) Date of Patent: Dec. 7, 2021

(54) PREVENTATIVE AND DETERRING SECURITY CAMERA FLOODLIGHT

(71) Applicant: Kuna Systems Corporation, San Bruno, CA (US)

(72) Inventors: Sai-Wai Fu, Los Altos Hills, CA (US); Murali Sharma, Walnut Creek, CA (US); Harold G. Sampson, Sunnyvale, CA (US)

(73) Assignee: KUNA SYSTEMS CORPORATION, San Bruno, CA (US)

( * ) Notice: Subject to any disclaimer, the term of this patent is extended or adjusted under 35 U.S.C. 154(b) by 0 days.

(21) Appl. No.: 16/850,944

(22) Filed: Apr. 16, 2020

Related U.S. Application Data

(63) Continuation-in-part of application No. 16/792,642, filed on Feb. 17, 2020.

(60) Provisional application No. 62/835,167, filed on Apr. 17, 2019, provisional application No. 62/961,401, filed on Jan. 15, 2020.

(51) Int. Cl.
*G08B 15/00* (2006.01)
*G08B 13/196* (2006.01)
*H04N 7/18* (2006.01)
*G08B 25/10* (2006.01)

(52) U.S. Cl.
CPC ....... *G08B 15/00* (2013.01); *G08B 13/19613* (2013.01); *G08B 13/19619* (2013.01); *G08B 25/10* (2013.01); *H04N 7/188* (2013.01)

(58) Field of Classification Search
CPC .. G08B 15/00; G08B 13/19613; G08B 25/10; G08B 13/19619; H04N 7/188
See application file for complete search history.

(56) References Cited

U.S. PATENT DOCUMENTS

| | | | | |
|---|---|---|---|---|
| 4,651,144 A | * | 3/1987 | Pagano | G08B 13/19632 340/541 |
| 5,822,542 A | * | 10/1998 | Smith | G08B 13/19604 709/247 |
| 6,259,476 B1 | * | 7/2001 | Greene | G08B 13/19619 348/143 |
| 9,082,018 B1 | * | 7/2015 | Laska | G06F 3/0488 |
| 9,143,741 B1 | * | 9/2015 | Fu | F21V 33/0056 |
| 9,361,011 B1 | * | 6/2016 | Burns | G06K 9/00771 |
| 2004/0061614 A1 | * | 4/2004 | Sulaver | G08B 23/00 340/573.1 |

(Continued)

*Primary Examiner* — Ryan W Sherwin
(74) *Attorney, Agent, or Firm* — Christopher P. Maiorana, PC

(57) ABSTRACT

An apparatus includes a capture device, a light, a processor and a communication device. The capture device may be configured to generate high resolution video frames of an area below a level of the apparatus. The light may be configured to illuminate the area in a first mode and focus a light beam on a target in a second mode. The processor may be configured to perform video analysis on the high resolution video frames to detect objects, change the light to the second mode by identifying the target from the objects detected, perform digital pan, zoom and tilt operations on the high resolution video frames and crop the high resolution video frames to a low resolution video frame using the operations. The communication device may be configured to receive the low resolution video frame from the processor and transmit the low resolution video frame to a user device.

20 Claims, 27 Drawing Sheets

(56) References Cited

U.S. PATENT DOCUMENTS

| | | | | |
|---|---|---|---|---|
| 2009/0189981 | A1* | 7/2009 | Siann | H04N 7/188 |
| | | | | 348/143 |
| 2015/0350614 | A1* | 12/2015 | Meier | G06K 9/0063 |
| | | | | 348/144 |
| 2017/0302892 | A1* | 10/2017 | Ellerhold | H04N 7/183 |
| 2018/0033273 | A1* | 2/2018 | Siminoff | H04R 1/028 |
| 2018/0293863 | A1* | 10/2018 | Tavares | H05B 47/105 |
| 2019/0188985 | A1* | 6/2019 | Potter | G10L 25/51 |
| 2019/0251814 | A1* | 8/2019 | Wolfinger | G08B 13/19619 |
| 2019/0311604 | A1* | 10/2019 | Morehouse | G08B 17/08 |

* cited by examiner

PREVENTATIVE AND DETERRING SECURITY CAMERA FLOODLIGHT

This application relates to U.S. Ser. No. 16/792,642, filed Feb. 17, 2020. This application also relates to U.S. Provisional Application No. 62/835,167, filed Apr. 17, 2019. This application also relates to U.S. Provisional Application No. 62/961,401, filed Jan. 15, 2020. Each of the mentioned applications are incorporated by reference in their entirety.

FIELD OF THE INVENTION

The invention relates to security devices generally and, more particularly, to a method and/or apparatus for implementing a preventative and deterring security camera floodlight.

BACKGROUND

Outdoor floodlights are designed for general illumination and not for security. Some floodlights have passive infrared (PIR) sensors to activate the light when motion is detected. However, PIR sensors are not capable of intelligent behavior, and automatically activating a light when motion is detected offers little security. Even if an outdoor floodlight includes more advanced security measures, such as a camera, outdoor floodlights are often not vandal-proof and can be torn down by throwing a rope over the floodlight.

Outdoor floodlights that do include a security camera are either hard-wired or operate over Wi-Fi. Hard-wired security cameras enable high-speed transmission of security video footage but requires a significant installation fee. Transmitting video over Wi-Fi imposes bandwidth limitations on the camera resolution.

Security cameras are often statically mounted and cannot be moved in real-time to examine troubling areas or track intruders. Security cameras that are capable of movement either pan by moving the camera in a timed pattern, or require remote controlled zooming/panning from a person, which requires supervision.

Outdoor cameras provide a limited deterrence effect due to a lag in response time by authorities and difficulty in identifying suspects in dark conditions. False positives detected by security cameras can result in expensive bills from responders. Security cameras can further require hiring security personnel to watch camera feeds.

It would be desirable to implement a preventative and deterring security camera floodlight.

SUMMARY

The invention concerns an apparatus comprising a housing, a capture device, a plurality of light panels, a plurality of speakers, a processor and a communication device. The capture device may be configured generate video data of an area below a level of the apparatus. The plurality of light panels may be configured to illuminate the area in a first mode, focus a high intensity light beam on a target in a second mode and strobe colored light in a third mode. The plurality of speakers may be integrated within the housing, each configured to generate audio. The processor may be configured to receive the video data from the capture device, perform video analysis on video frames generated from the video data to detect objects and change the light to the second mode in response to identifying the target from said objects detected. The communication device may be configured to communicate wirelessly, receive the video frames from the processor and transmit the video frames to a remote device.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
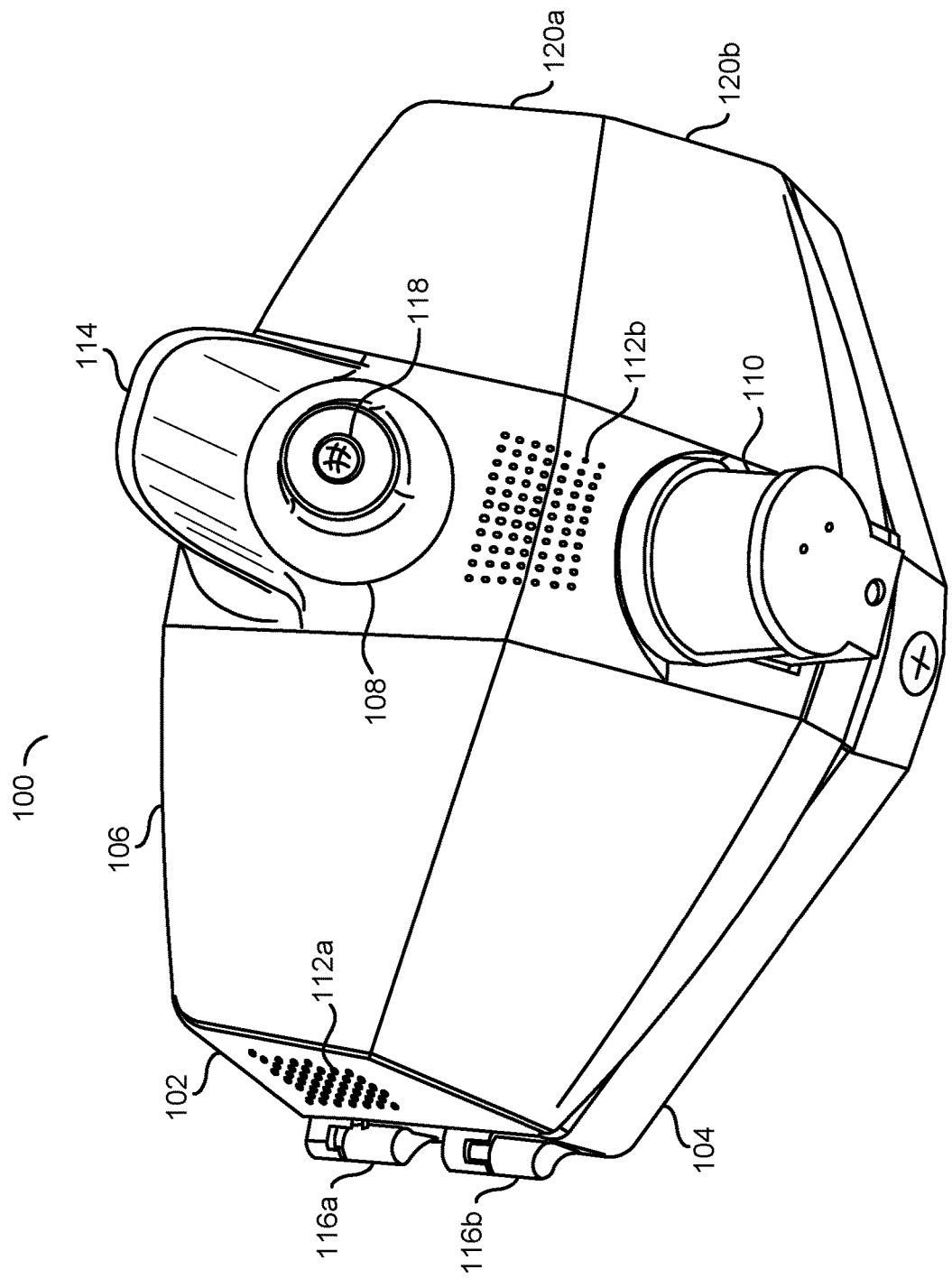
FIG. 1 is a diagram illustrating an example embodiment of the present invention.

Embodiments of the present invention include providing a preventative and deterring security camera floodlight that may (i) have a curved surface to prevent being torn down, (ii) implement a focused spotlight that may be remotely controlled, (iii) implement a focused spotlight controlled using artificial intelligence, (iv) generate time-lapse videos based on object detection, (v) implement a siren, (vi) implement a strobe effect, (vii) capture high resolution video frames, (viii) provide digital pan, zoom and tilt for high resolution video frames, (ix) implement conversational artificial intelligence to engage detected people, (x) stream lower resolution portions of a high resolution video frame, (xi) implement a network of smart security floodlights, (xii) perform video analysis to detect objects in captured video frames, (xiii) control a drone via Wi-Fi as a mobile security camera and/or (xiv) be implemented as one or more integrated circuits.

Embodiments of the present invention may be configured to implement a smart security floodlight. The smart security floodlight may be implemented as a commercial floodlight with a security camera. The smart security floodlight may comprise multiple features integrated with the device. Features of the smart security floodlight may comprise commercial grade lights (e.g., LEDs with tunable white color temperature and capable of outputting over 3 k lumens, plus red and blue floodlights), a high resolution security camera (e.g., capable of capturing 4K video), an audio system comprising multiple speakers, etc. The various features of the present invention may be configured to deter intruders and/or provide preventative measures to protect property that is under surveillance.

Embodiments of the present invention may be configured to be used in conjunction with a professional security service. Video data generated by the smart security camera may be communicated wirelessly. Video data may be intelligently cropped and/or compressed to enable wireless communication of the video data within the constraints of Wi-Fi bandwidth. The professional security service may manually review video data and/or provide remote commands to enable the present invention to deter intruders.

Embodiments of the present invention may be configured to perform video analysis on the captured video data to detect objects. Objects may be classified to identify and/or distinguish between potential intruders, customers, employees, loiterers, unimportant objects, etc. The light panels may be configured to implement a tracking spotlight that may be directed at a particular target (e.g., a detected intruder). The light panels may be controlled based on the objects detected by the video analysis. For example, results from the object detection may be used to provide controls to the light panels to provide automatic tracking of an intruder using the spotlight. The video analysis may comprise using facial detection and/or person detection technology.

Embodiments of the present invention may be configured to work in conjunction with a drone (e.g., an unmanned aerial vehicle). For example, an intruder detected using video analysis may be followed using the drone. Following the intruder with a drone may enable tracking the intruder once outside of a field of view of a stationary camera.

Referring to FIG. 1, a diagram illustrating an example embodiment of the present invention is shown. An apparatus (or device) 100 is shown. The apparatus 100 may be the smart security floodlight. The smart security floodlight 100 may be configured to capture video and/or provide illumination. The smart security floodlight 100 may be configured to implement a preventative and deterring security measure. The security floodlight 100 may be configured to implement intelligent deterrence. The security floodlight 100 may implement one or more deterrent responses. The deterrent responses may prevent crimes before damage is done. In an example, the deterrent responses may comprise sound and/or light. In some embodiments, the deterrent measures may be performed by the apparatus 100 intelligently in response to analyzing video data captured. In some embodiments, the deterrent measures may be performed by the apparatus 100 in response to communication from a remote device (not shown).

The apparatus 100 may comprise a housing 102, a back panel 104 and/or a front face panel 106. The housing 102 may be configured to provide an enclosure and/or protection for various components of the apparatus 100. The components within the housing 102 may be configured to implement the security features of the smart security floodlight 100. The housing/body 102 may be designed to be vandal proof/resistant. The back panel 104 may be configured to provide an enclosure and/or protection for external wiring and/or a power supply for the apparatus 100. The back panel 104 may be configured to enable the apparatus 100 to be mounted (e.g., attached to a wall of a premises). The front face panel 106 may be configured to provide protection to lights implemented by the apparatus 100. The lights may be covered by the front face panel 106. The front face panel 106 may be configured to diffuse the lighting emitted by the apparatus 100 and/or provide a decorative cover for the apparatus 100. In an example, the front face panel 106 may be replaceable (e.g., swappable) to enable an end user to select various aesthetic designs for the apparatus 100. The front face panel 106 may be curved LED panel cover that may be clipped on to the apparatus 100. In some embodiments, the front face panel 106 may extend from top to bottom and along the sides of the apparatus 100. The front face panel 106 may be an LED panel. Implementing the front face panel 106 as a frosted LED panel may provide a wide angle of coverage for general illumination. In one example, the LED panel 106 may be a one-piece curved panel to cover the front and sides of the smart security floodlight 100. In some embodiments, the front face LED panel 106 may extend to the mounting location (e.g., extend along the bottom close to the wall) to provide all-around illumination to limit the amount of dark spots. The front face panel 106 may comprise one or more LED panel covers. For example, the LED panel covers may comprise frosted and/or colored glass/plastic to provide frontal illumination. In some embodiments, one or more of the panels of the front face panel 106 may be an IR window.

The smart security floodlight 100 may comprise a capture device 108, a light (not shown), multiple speakers (not shown), a communication device (not shown), a processor (not shown) and/or passive infrared (PIR) sensor 110. The capture device 108 may be configured as a high resolution camera (e.g., a camera capable of capturing 4K and/or 8K video frames). The light may be configured to provide general illumination and/or a focused spotlight. The speakers may be configured to output audio. The communication device may be configured to communicate with remote devices. The processor may be configured perform video analysis of the video frames captured by the capture device 108 and/or generate control signals for the speakers and/or lights. The PIR sensor 110 may be configured to detect motion.

The capture device 108 is shown attached to the front of the apparatus 100. The capture device 108 may be configured to capture video data of an area below a level of the apparatus 100. In an example, the apparatus 100 may be mounted to a wall from at a high location (e.g., higher than six feet to be above people), and the capture device 108 may be directed to capture the ground below the apparatus 100. In the example shown, the capture device 108 may be implemented as a spherical shape that partially protrudes from the front of the apparatus 100. The partial protrusion of the capture device 108 may enable some electronics of the capture device 108 to be within the housing 102 (e.g., for protection and/or to enable connection to other internal components of the apparatus 100, such as the processor). The partial protrusion of the capture device 108 may enable the capture device 108 to move (e.g., pan and tilt) to monitor a wide field of view of the area below the apparatus 100.

The PIR sensor 110 is shown extending down from the bottom of the front of the smart security floodlight 100. The PIR sensor 100 is shown attached to the bottom of the smart security floodlight 100 without having a neck connector (e.g., a connection that may provide a hook for a rope that could be used to pull off the PIR sensor 110). Implementing the PIR sensor 110 without a neck may enable the PIR sensor 110 to resist vandalism (e.g., no anchor point for a rope). The PIR sensor 110 may extend from the bottom of the apparatus 100 to capture a wide area (e.g., greater than 180 degree field of view). In some embodiments, the PIR sensor 110 may enable IR for night vision.

The PIR sensor 110 may be implemented in a permanently fixed location. The PIR sensor 110 may comprise four separate sensors arranged to capture multiple angles to eliminate blind spots. The PIR sensor 110 may be configured to capture an area of interest without adjustment (e.g., the angle of the PIR sensor 110 may not be moved).

Speaker grilles 112a-112b are shown on the housing 102. The speaker grilles 112a-112b may provide openings to enable the speakers within the housing 102 to emit audio output. The apparatus 100 may further comprise a microphone (not shown). The speaker grilles 112a-112b may enable the microphone implemented within the housing 102 to receive audio input. A combination of the speaker and microphone may enable the apparatus 100 to output audio to playback messages and accept input audio. The security floodlight may further comprise a microphone and/or a speaker (e.g., enable two-way communication).

The housing 102 may comprise a lens hood (or duck visor) 114. The lens hood 114 may provide glare protection for the capture device 108. For example, stray light and/or incidental light may result in glare and/or washed out areas in video frames captured using the capture device 108. The lens hood 114 may prevent and/or partially block stray light and/or incidental light, which may prevent undesired effects in the captured video data. In one example, the lens hood 114 may have a length (e.g., extending from the housing 102) of approximately 67 mm, a base width (e.g., connected along the housing 102) of approximately 102 and/or a front width (e.g., over the capture device 108) of approximately 54 mm.

The lens hood 114 may enable sun glare protection for the capture device 108. In some embodiments, the lens hood 114 may provide housing for antennae. For example, antennae for Wi-Fi and/or Bluetooth may be implemented within the lens hood 114. Implementing antennae within the lens hood 114 may enable the housing 102 to implement heat dissipating materials that may interfere with wireless communication.

Hinges 116a-116b are shown on a side of the apparatus 100. The hinges 116a-116b may connect the back panel 104 to the housing 102. In some embodiments, the hinges 116a-116b may provide support for mounting the apparatus 100 to a wall. The hinges 116a-116b may enable the back panel 104 to be opened to enable access to the wiring and/or power supply of the apparatus 100. For example, even after the apparatus 100 is secured to a wall, the hinges 116a-116b may enable the back panel 104 to be opened.

A lens 118 is shown on the capture device 108. The lens 118 may receive light to enable the capture device 108 to capture images that may be used to generate video data. A position of the lens 118 may be movable to enable the capture device 108 to adjust a location of the field of view captured. The lens hood 114 may prevent the stray light and/or incident light from entering the lens 118 to prevent glare.

The lens 118 may comprise a wide angle lens. The wide angle lens 118 may enable the security floodlight 100 to capture a wide angle field of view (e.g., generate wide angle video frame). In some embodiments, the video frames generated from the light captured may have a barrel effect (e.g., a bulge distortion) caused by the wide angle lens 118. The processor implemented by the apparatus 100 may be configured to correct (e.g., dewarp) the barrel distortion effect.

The processor implemented by the apparatus 100 may be configured to generate control signals in response to video operations and/or analysis performed on the video data. In some embodiments, the control signals generated may be configured to generate audio from the speakers, control and/or adjust the lights and/or mechanically control the capture device 108 to pan, tilt and/or zoom the lens 118.

Video operations performed by the processor of the apparatus 100 may be configured to enable a digital pan, zoom and/or tilt (PZT) in real-time. The digital PZT may enable particular areas (e.g., areas that may be determined to be troubling areas) to be examined closely. The video operations may further comprise object detection. Objects may be identified in the video frames. For example, one object that may be detected is an intruder. The intruders may be tracked over a sequence of video frames to determine behavior and/or a location of the intruder. The high resolution video frames captured by the camera may be stored locally and/or transmitted wirelessly. To enable transmission of the video data wirelessly (e.g., over a Wi-Fi connection) the smart security floodlight 100 may be configured to perform video operations to crop portions of the high resolution video frames into one or more lower resolution video frames.

The front of the housing 102 may have an upper portion 120a and a lower portion 120b. The capture device 108 may be at the middle of the upper portion 120a. Generally, the upper portion 120a may be slightly angled downwards (e.g., to provide the downwards field of view for the capture device 108). To a left side of the capture device 108, the upper portion 120a may be angled slightly outwards to the left. To a right side of the capture device 108, the upper portion 120a may be angled slightly outwards to the right. The PIR sensor 110 may be at the middle of the lower portion 120b. Generally, the lower portion 120b may be angled downwards at a greater angle than the upper portion 120a. To a left side of the PIR sensor 110, the lower portion 120b may be angled slightly outwards to the left. To a right side of the PIR sensor 120b, the lower portion 120b may be angled slightly outwards to the right.

Figure 2:
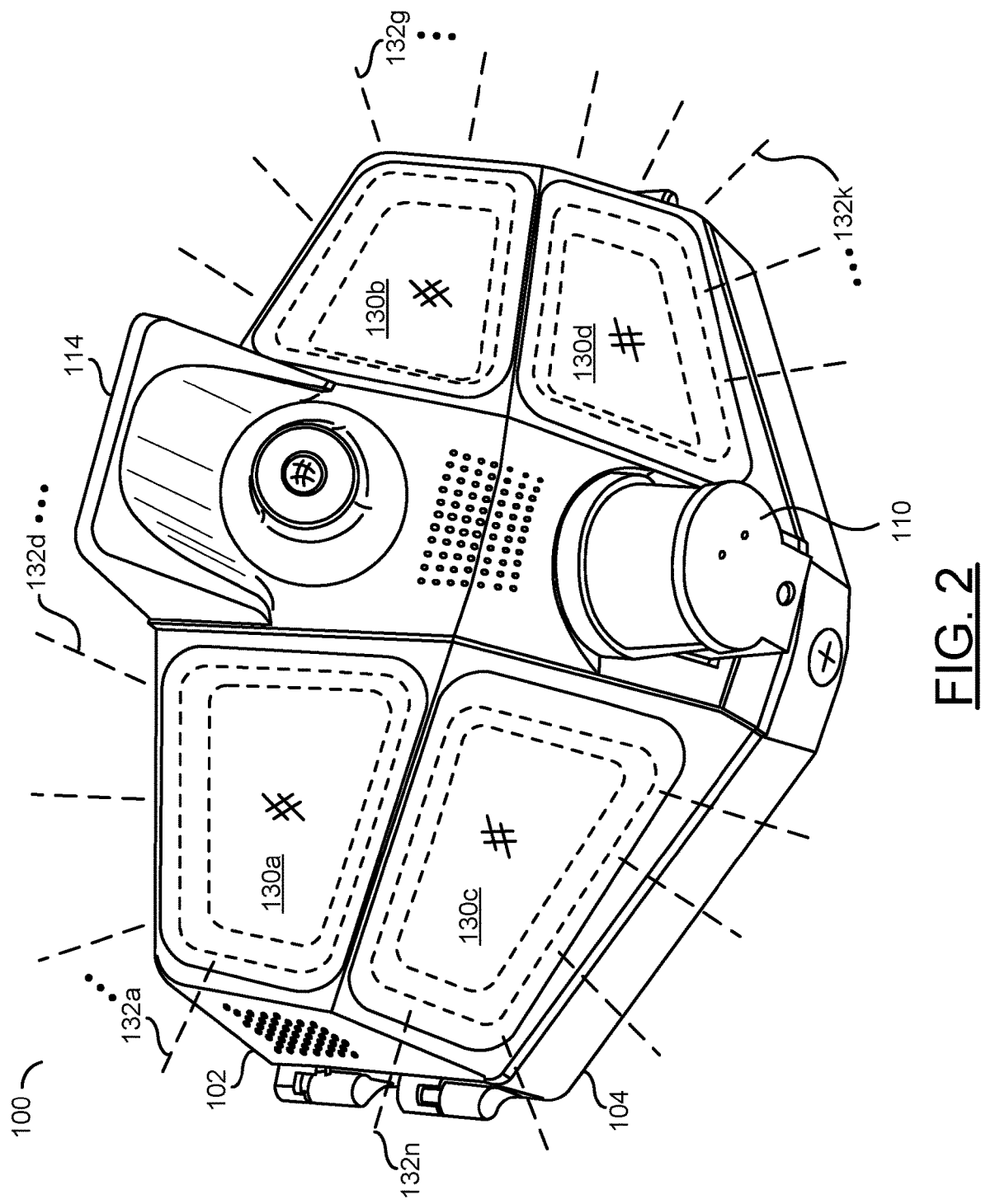
FIG. 2 is a diagram illustrating light panels of a smart security floodlight.

Referring to FIG. 2, a diagram illustrating light panels of a smart security floodlight is shown. The apparatus 100 is shown with the front face panel 106 removed. The housing 102, the back panel 104, the capture device 108, the PIR sensor 110 and/or the lens hood 114 are shown. With the front face panel 106 removed, light panels 130a-130d are shown.

In the example shown, the apparatus 100 may comprise four light panels 130a-130d. The light panels 130a-130b may be located on the upper portion 120a. The light panel 130a may be located adjacent to the capture device 108 on one side. The light panel 130a may be generally directed straight outwards from the apparatus 100 and angled towards one side (e.g., angled to direct light to the right side of the apparatus 100). The light panel 130b may be located adjacent to the capture device 108 on an opposite side of the light panel 130a. The light panel 130b may be generally directed straight outwards from the apparatus 100 and angled towards one side (e.g., angled to direct light to the left side of the apparatus 100). For example, the outwards and slightly downwards angle of the sides of the upper portion 120a may direct the light panels 130a-130b to the left and to the right of the apparatus 100 and out in front of the apparatus 100.

The light panels 130c-130d may be located on the lower portion 120b. The light panel 130c may be located below the light panel 130a and generally directed on a downwards angle. The light panel 130d may be located below the light panel 130b and generally directed on a downwards angle. For example, the outwards and downwards angle of the sides of the lower portion 120b may direct the light panels 130c-130d to the left and to the right of the apparatus 100 and below the apparatus 100.

Dotted lines 132a-132n are shown. The dotted lines 132a-132n may represent the light emitted by the light panels 130a-130d. The light 132a-132n generated by the light panels 130a-130d may be configured to illuminate an area below a level of the apparatus 100. The light 132a-132n generated by the light panels 130a-130d may be configured to illuminate an area in front of the apparatus 100. The light 132a-132n generated by the light panels 130a-130d may be configured to provide lighting to enable the lens 118 to receive light to enable the capture device 108 to generate pixel data that may be used to generate the video frames.

The light panels 130a-130d may comprise LED lighting elements. The light panels 130a-130d may be configured to generate white light. In an example, the apparatus 100 may be configured to control a brightness of the white light (e.g., perform dimming and/or increasing an intensity of the white light). In another example, the apparatus 100 may be configured to control a temperature of the white light (e.g., softer 'natural' white lighting to 'cool' white lighting). In an example, the white light generated by the light panels 130a-130d may be tunable from 3 k to 5 k Kelvin color temperature and generate up to 10000 lumens. The light panels 130a-130d may be configured to generate colored lights. In an example, the light panels 130a-130d may be configured to emit blue colored light and red colored light. In an example, the red and blue colored light may be approximately 920 lumens (e.g., brighter than 1000 lumens in red and blue light may be dangerously bright). For example, the flashing red and blue light may be similar to police lights. The intensity, hue, temperature and/or other characteristics of the light emitted by the light panels 130a-130d may be varied according to the design criteria of a particular implementation.

In some embodiments, each of the light panels 130a-130d may be configured to emit the white, red and blue colored lighting. In some embodiments, the tunable white light may be generated by all four of the panels 130a-130d. In some embodiments, the red and blue colored lights may be generated by only the two light panels 130a-130b on the upper portion 120a of the apparatus 100. For example, implementing the bottom light panels 130c-130d as white light may provide illumination while switching the top panels 130a-130b from white light to the red and blue light may provide a warning and/or deterrent effect. The arrangement of the light panels 130a-130d may be varied according to the design criteria of a particular implementation.

The LED panels 130a-130d may be configured to operate in various modes of operation. In one example, one mode of operation of the light panels 130a-130d may illuminate an area near the apparatus 100. For example, the light panels 130a-130d may each emit white light for illumination. In another example, one mode of operation of the light panels 130a-103d may focus a high intensity light beam on a target. For example, the apparatus 100 may comprise a mechanism for adjusting the direction of the light panels 130a-130d. Video analysis may be implemented to detect an object (e.g., identify a target such as an intruder). The light panels 130a-130d may be directed to follow the movement of the target based on the location of the target detected by analyzing the video frames. In yet another example, one mode of operation of the light panels 130a-130d may strobe colored light. For example, the light panels 130a-130b (e.g., the panels on the upper portion 120a) may generate the red and blue light with a strobe effect. In another example, the white light may provide a strobe effect. For example, the strobe effect of the light 132a-132n along with other deterrent measures (e.g., a siren) may be 99% effective at deterring intruders (e.g., causing potential intruders to leave before damage/theft occurs). The patterns of lighting, the lighting effect and/or the number of modes of operation of the light panels 130a-130d may be varied according to the design criteria of a particular implementation.

Figure 3:
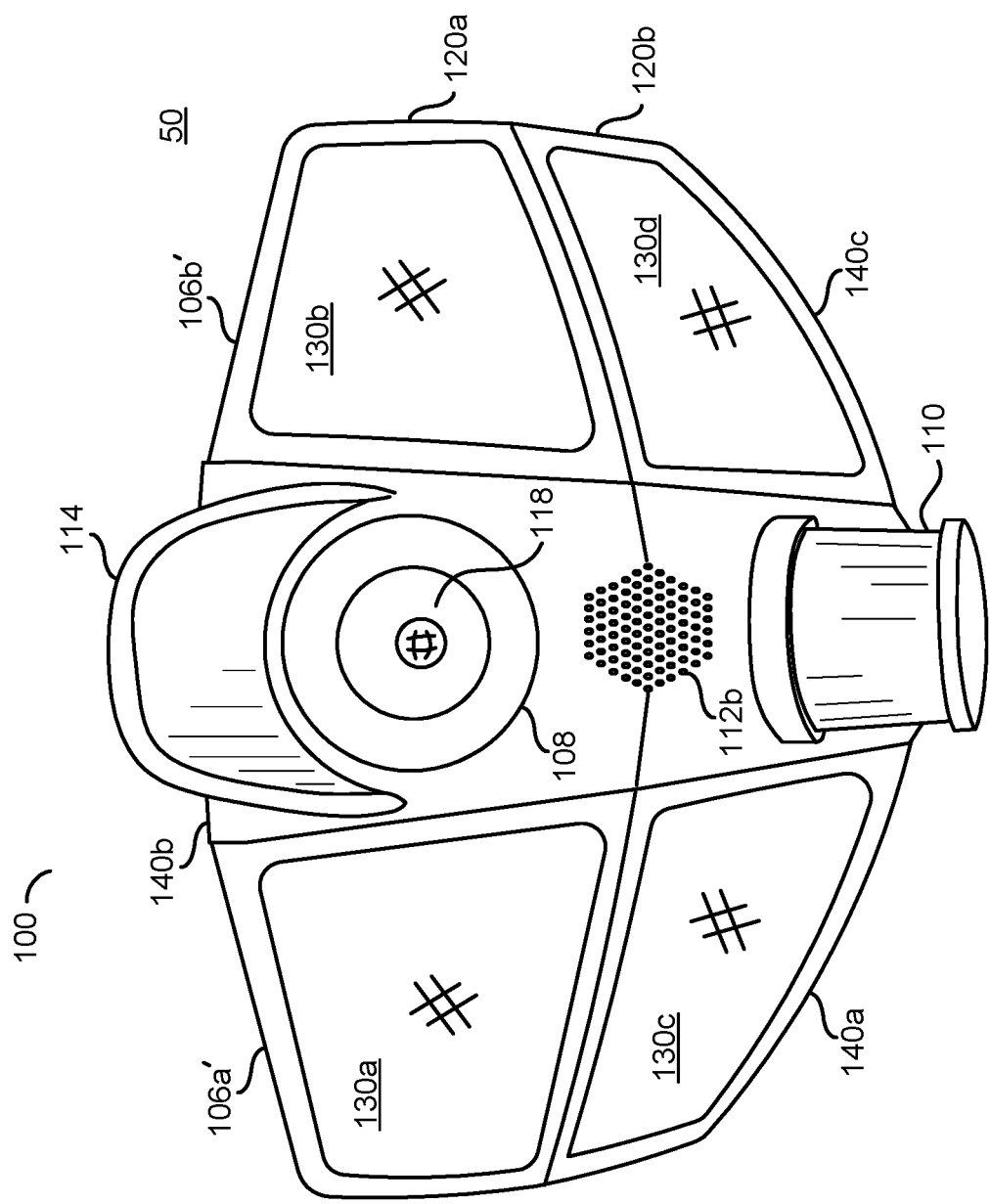
FIG. 3 is a diagram illustrating a front view of the security floodlight.

Referring to FIG. 3, a diagram illustrating a front view of the security floodlight is shown. The apparatus 100 is shown mounted to a wall 50. The front view of the apparatus 100 may show the front face panel 106a'-106b', the capture device 108, the PIR sensor 110, the speaker grille 112b, the lens hood 114, the lens 118, the upper and lower portions 120a-120b and/or the light panels 130a-130d. In the example shown, the front face panel 106a'-106b' may be an angular design (e.g., a swappable visor that may be clipped onto the housing 102 to provide the angular aesthetic).

The housing 102 may comprise a right portion 140a, a center portion 140b and a left portion 140c. The right portion 140a may comprise the light panel 130a and the light panel 130c. The center portion 140b may comprise the capture device 108, the speaker grille 112b, the PIR sensor 110 and the lens hood 114. The left portion 140c may comprise the light panel 130b and the light panel 130d.

The center portion 140b may be generally directed straight outwards (e.g., generally parallel with the wall 50). The upper portion 120a of the center portion 140b may be angled slightly downwards. The lower portion 120b of the center portion 140b may be angled downwards and slope down towards the wall 50.

The right portion 140a may be angled to have a slope from the center portion 140a (e.g., the part of the apparatus 100 that extends farthest from the wall 50) towards the wall 50 to the right of the apparatus 100 (e.g., the part of the apparatus 100 that is closest to the wall 50). The angle of the right portion 140a may project light towards the front and the right side of the apparatus 100. The left portion 140c may be angled to have a slope from the center portion 140a (e.g., the part of the apparatus 100 that extends farthest from the wall 50) towards the wall 50 to the left of the apparatus 100 (e.g., the part of the apparatus 100 that is closest to the wall 50). The angle of the left portion 140b may project light towards the front and the left side of the apparatus 100.

The front face panels 106a'-106b' may be implemented as two separate pieces. In an example, the front face panel 106a' may be configured to cover the right portion 140a (e.g., provide a cover for the light panel 130a and the light panel 130c). Similarly, the front face panel 106b' may be configured to cover the left portion 140c (e.g., provide a cover for the light panel 130b and the light panel 130d). The front face panels 106a'-106b' may not provide a cover for the center portion 140b.

In some embodiments, the front face panels 106a'-106b' may be implemented as two poly-carbonate covers for the light panels 130a-130d. The front face panels 106a'-106b' may hide the light panels 130a-130d, provide shatter proof protection, provide diffraction to improve the light dispersion of the light panels 130a-130d and/or provide a curved aesthetic to the design of the apparatus 100.

The front face panels 106a'-106b' may provide a diffusive covering for the LED panels 130a-130d. The diffusive cover 106a'-106b' for the LED panels 130a-130d may provide a panoramic 180 degree coverage of emitted light from left to right, straight out and to the bottom. In one example, the diffusive cover 106a'-106b' may have a frosted implementation to enable the diffusive effect. In another example, the diffusive cover 106a'-106b' may be implemented having a dispersive pattern in clear poly-carbonate to implement the diffusive effect. In one example, the speaker grille 112b may be large enough for a 2 inch diameter speaker and/or a 0.1 inch diameter microphone.

The capture device 108 may be implemented as a module that may be configured to adjust approximately forty degrees to the right and forty degrees to the left. In some embodiments, the camera module 108 may have integrated infrared LEDs. The camera module 108 may be tilted slightly (e.g., approximately 20-40 degrees) downwards to capture the area below the level of the smart security floodlight 100. Generally, the security floodlight 100 may be mounted from an elevated position (e.g., the wall 50, a lamppost, etc.).

In the example shown, the camera module 108 may be implemented with a pivoting lens 118. In some embodiments, the camera module 108 may be implemented with an aluminum housing. The aluminum housing of the camera module 108 may have a round (e.g., ball) shape. The aluminum ball may be configured to rotate to adjust the direction of the lens 118 (e.g., to tilt downwards). The aluminum ball shaped camera module 108 may be configured to sit in a thin frame of ABS plastic (e.g., white or grey) and the whole front (e.g., a curved surface and cupped surface underneath) may be a one-piece lens. In one example, the aluminum ball housing of the camera module 108 may be embedded in the center portion 140b on the front face of the housing 102 of the smart security floodlight 100. The camera module 108 may be configured to capture pixel data that may be used by the processor of the apparatus 100 to generate high resolution video frames (e.g., 4K (8 Mpixel) and/or 8K (32 Mpixel) video frames). The high resolution video frames may provide sufficient detail to enable digital pan, tilt and/or zoom (PTZ).

Figure 4:
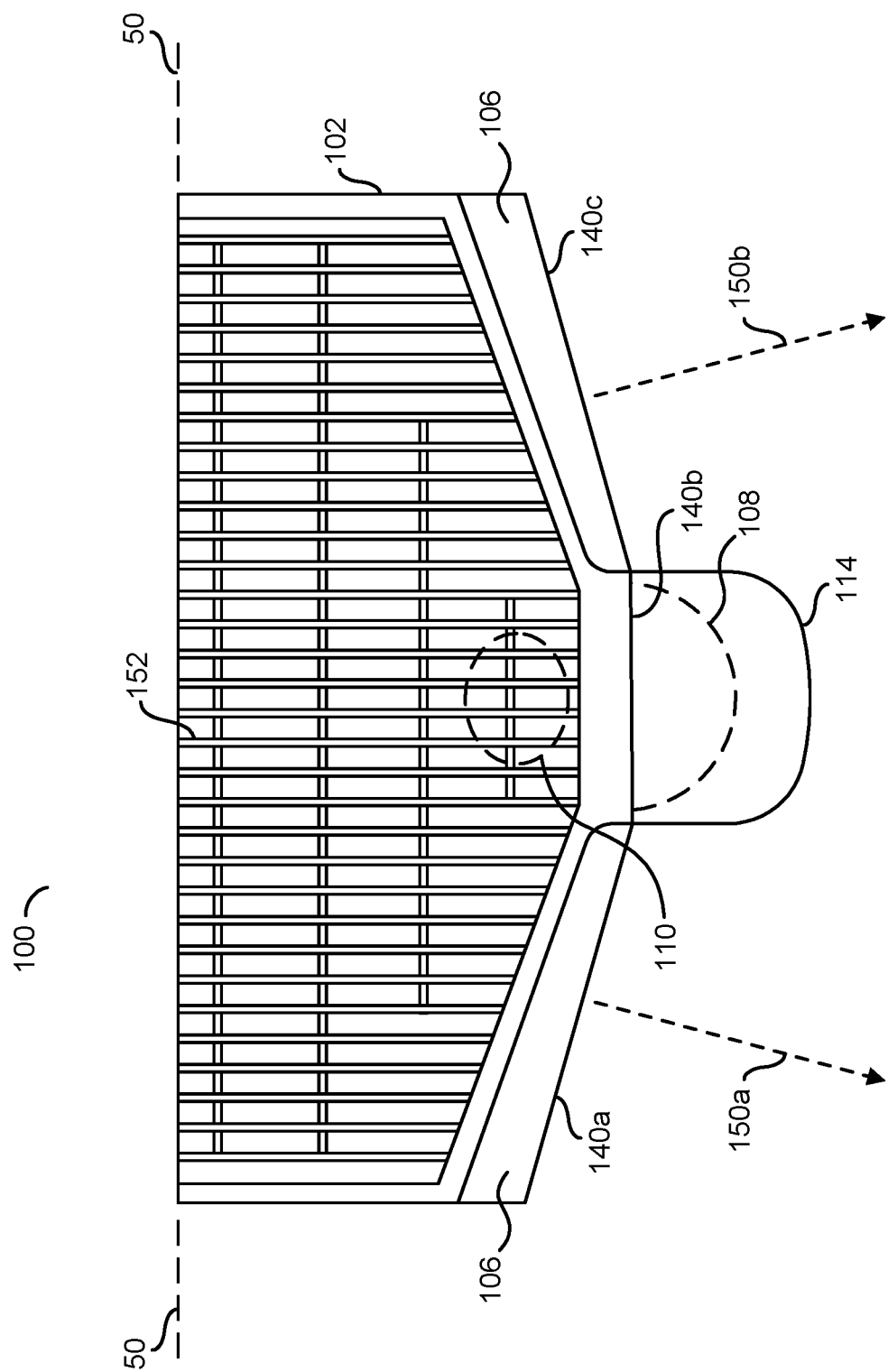
FIG. 4 is a diagram illustrating a top view of the security floodlight.

Referring to FIG. 4, a diagram illustrating a top view of the security floodlight is shown. The apparatus 100 is shown mounted to the wall 50. The top view may show the housing 102 of the apparatus 100 extending outwards from the wall 50. In an example, the smart security floodlight 100 may have an overall size of approximately, 13 inches wide, 8 inches tall and 8 inches deep.

A portion of the front face panel 106 is shown attached to the housing 102. The lens hood 114 is shown extending from the center portion 140b over top of the capture device 108. The location of the PIR sensor 110 attached to the bottom of the apparatus 100 is shown.

Arrows 150a-150b are shown. The arrow 150a may extend from the right portion 140a. The arrow 150b may extend from the left portion 140b. The arrow 150a may represent the direction of the light 132a-132n emitted from the light panel 130a and the light panel 130c on the right portion 140a of the apparatus 100. The arrow 150b may represent the direction of the light 132a-132n emitted from the light panel 130b and the light panel 130d on the left portion 140b of the apparatus 100.

A heatsink 152 is shown on the top of the apparatus 100. The heatsink 152 may comprise metallic fins. The metallic fins of the heatsink 152 may be configured to dissipate heat. For example, the light panels 130a-130d and/or other components of the apparatus 100 may generate heat and the heatsink 152 may ensure a safe operating temperature for the apparatus 100. In an example, the heatsink 152 may be bare aluminum configured to reflect sunlight during the daytime and dissipate heat from a heatsink internal to the housing 102 when the light panels 130a-130d are powered on. In an example, by implementing the heatsink 152, the apparatus 100 may operate at approximately 28 degrees Celsius above ambient temperature after 30 minutes of continuous operation.

Figure 5:
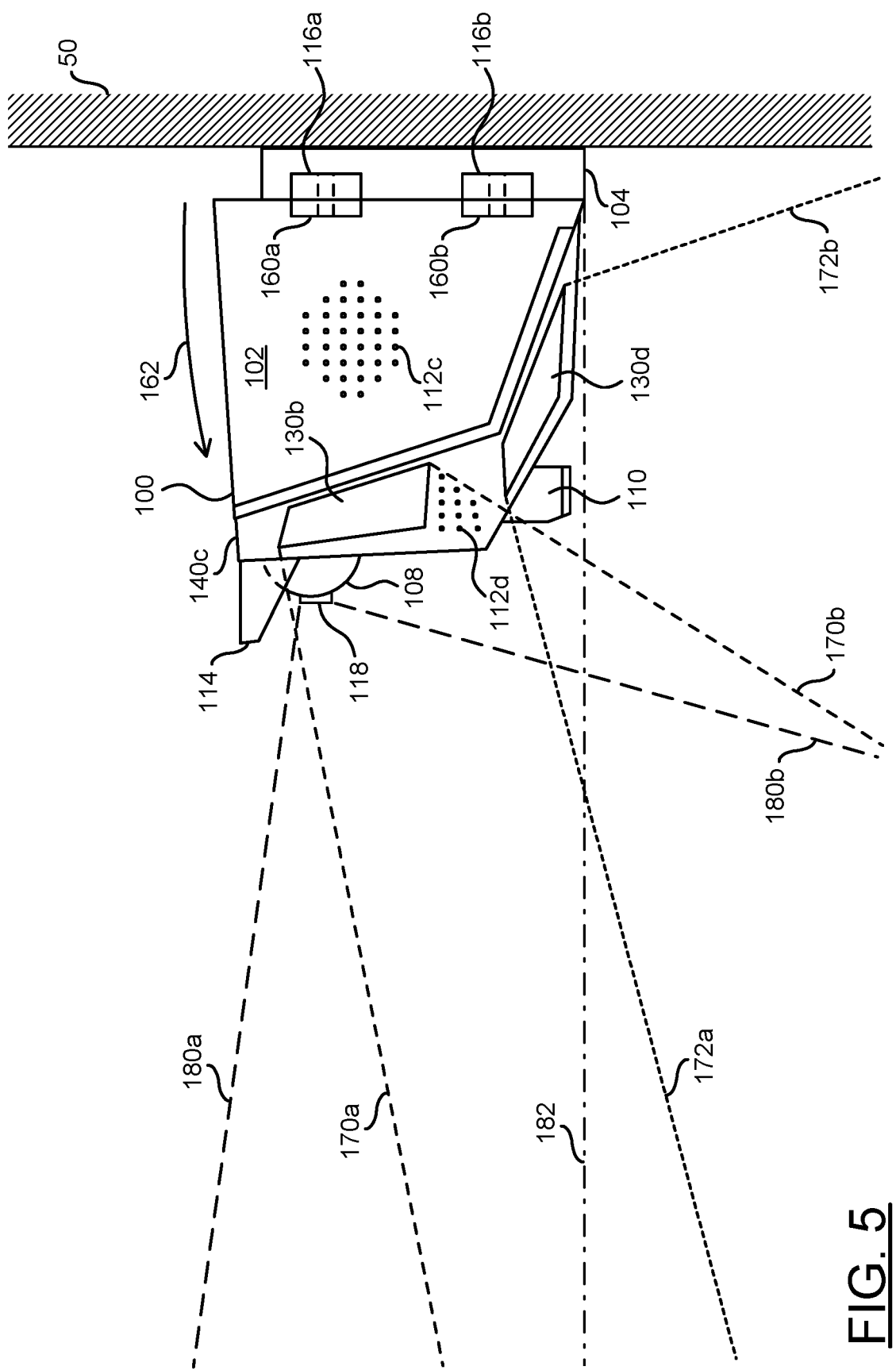
FIG. 5 is a diagram illustrating a side view of the security floodlight mounted to a surface.

Referring to FIG. 5, a diagram illustrating a side view of the security floodlight mounted to a surface is shown. The apparatus 100 is shown mounted to the surface 50. The surface 50 may be a high location (e.g., high up on an outdoor wall). The back panel 104 is shown attached to the wall 50. The back panel 104 may enable the apparatus 100 to be mounted to the wall 50.

A side view of the housing 102 is shown. The side view may provide a view of the left side of the housing 102. The right side of the apparatus 100 may be similar. The speaker grille 112c is shown on the housing 102. The speaker grille 112c may provide an opening for audio generated by the speakers.

The hinges 116a-116b are shown connecting the housing 102 to the back panel 104. Openings 160a-160b are shown on the hinges 116a-116b. The openings 160a-160b may provide screw holes for securing the housing 102 to the back panel 104. In an example, the openings 160a-160b may be configured to accept captive screws.

An arrow 162 is shown above the apparatus 100. The arrow 162 may represent the smooth surface of the housing 102 (e.g., a rope-proof smooth surface). The smooth surface may prevent a rope from hooking onto the smart security floodlight 100 (e.g., prevent the apparatus 100 from being torn down).

The left portion 140c is shown. Since the left portion 140c is angled to the left of the apparatus 100, the left portion 140c may be partly visible from the side view. An additional grille 112*d* is shown. In an example, the grille 112*d* may provide openings for the microphone (to allow input audio to enter the housing 102.

The top left light panel 130*b* is shown directed to the left side of the apparatus 100 and directed slightly downwards. Dotted lines 170*a*-170*b* are shown extending from the light panel 130*b*. The dotted lines 170*a*-170*b* may represent a vertical field of the light emitted by the light panel 130*b*. For example, the light panel 130*b* may generally project the light in front of the apparatus 100 and downwards. The bottom left light panel 130*d* is shown directed to the left side of the apparatus 100 and directed downwards (downwards more than the top light panel 130*b*). Dotted lines 172*a*-172*b* are shown extending from the light panel 130*d*. The dotted lines 172*a*-172*b* may represent a vertical field of the light emitted by the light panel 130*d*. For example, the light panel 130*d* may generally project the light below the apparatus 100 (e.g., below and behind to illuminate the wall 50 under the apparatus 100). The top right panel 130*a* may have a similar field of light emitted as the light panel 130*b*. The bottom right panel 130*c* may have a similar field of light emitted as the light panel 130*d*.

The lens module 108, the PIR sensor 110, the lens hood 114, the lens 118 are shown. Dotted lines 180*a*-180*b* are shown extending from the lens 118. The dotted lines 180*a*-180*b* may represent a vertical field of view of the capture device 108.

A line 182 is shown extending perpendicularly from the wall 50. The line 182 may be even with the bottom of the apparatus 100. The line 182 may be a level of the bottom of the apparatus 100. For example, everything below the line 182 may be an area below the apparatus 100. For example, the field of light emitted 170*a*-170b, the field of light emitted 172*a*-172b may illuminate an area below the level 182. The field of view 180*a*-180*b* of the capture device 108 may capture an area below the level 182.

The capture device 108 may be configured to capture an area in front of the smart security floodlight 100 and below a level of the security floodlight 100 (e.g., below the line 182). Generally, since the apparatus 100 may be mounted from an elevated position, the field of view 180*a*-180*b* may not need to capture an area above the smart security floodlight 100. The vertical field of view (FOV) 180*a*-180*b* may be approximately 60 to 90 degrees. The vertical FOV 180*a*-180*b* may not significantly go above horizontal (e.g., looking at the sky) because the apparatus 100 may be mounted at least 7 feet high looking down. The lens 118 may tilt down about 40 degrees, and the vertical FOV 180*a*-180*b* may tilt down from the horizon from 10 degree to about 90 degree to cover the ground as much as possible. In some embodiments, the capture device 108 may implement all panning, zooming and/or tilting digitally (e.g., without mechanical movement of the camera module 108).

Figure 6:
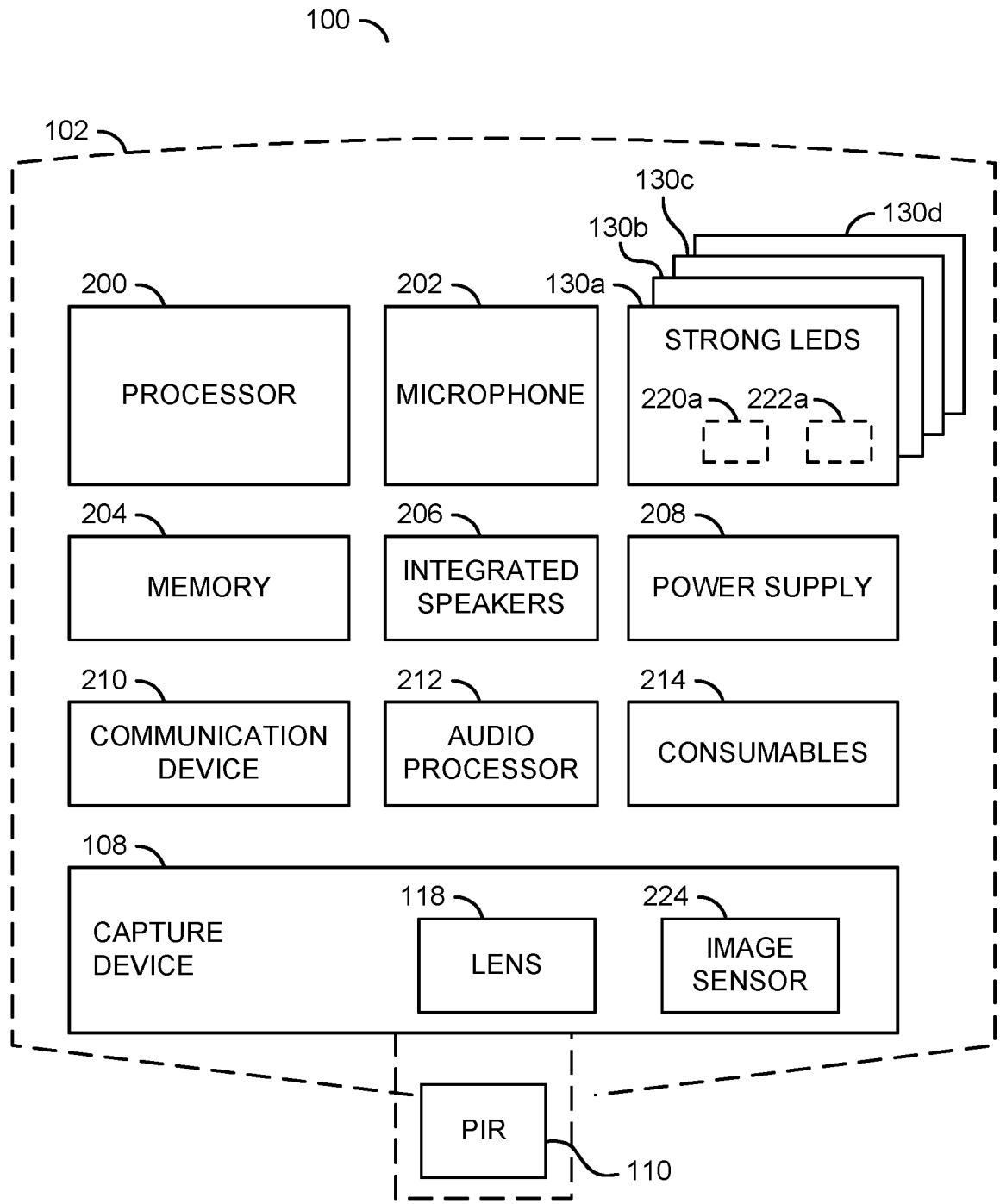
FIG. 6 is a block diagram illustrating components of the security floodlight.

Referring to FIG. 6, a block diagram illustrating components of the security floodlight is shown. The housing 102 of the apparatus 100 is shown. The housing 102 may be hollow to provide a protective and/or decorative enclosure for the components of the apparatus 100. The components of the apparatus 100 may be contained within or partially contained within the housing 102. The housing 102 may have a limited amount of internal space. To provide functionality, the components of the apparatus 100 may need to fit within the size and/or heat dissipation constraints of the hollow housing 102.

The housing 102 may comprise the capture device 108, the PIR sensor 110, the LED panels 130*a*-130*d*, a block (or circuit) 200, a block (or circuit) 202, a block (or circuit) 204, a block (or circuit) 206, a block (or circuit) 208, a block (or circuit) 210, a block (or circuit) 212 and/or a block (or circuit) 214. The circuit 200 may implement the processor. In an example, the processor 200 may be a video processor. The circuit 202 may implement the microphone. The circuit 204 may implement a memory. The circuit 206 may implement the integrated speakers. The circuit 208 may implement the power supply. The circuit 210 may implement the communication device. The circuit 212 may implement an audio processor. The circuit 214 may implement a consumable actuator. The apparatus 100 may implement other components (not shown). The number, type and/or arrangement of the components of the apparatus 100 may be varied according to the design criteria of a particular implementation.

The video processor 200 may be configured to generate video data in response to pixel data received from the capture device 108. The video processor 200 may be configured to generate high resolution video frames. The video processor 200 may be configured to perform the video operations (e.g., digital panning, zooming and tilting (e.g., PZT), digital cropping, video analysis, object detection, behavior detection, object location tracking over a sequence of video frames, etc.). The video analysis performed by the video processor 200 may be configured to detect and/or recognize objects. The video analysis performed by the processor 200 may track movement of an object temporally over a sequence of video frames.

The video processor 200 may be configured to encode and/or decode video frames into various formats (e.g., video formats and/or still image formats). The video processor 200 may be configured to compress and/or stream video data. The video processor 200 may be configured to re-size images and/or video frames for a fixed resolution (e.g., a fixed resolution used by a neural network).

In some embodiments, the video processor 200 may implement a neural network. The neural network may be configured to analyze the video data in real time. The video analysis performed by the neural network may detect, recognize and/or classify objects. For example, the objects may comprise people (e.g., a visitor), animals, inanimate objects (e.g., a delivered package), etc. The video analysis may be configured to learn patterns, recognize objects and/or recognize faces. The processor 200 may be configured to de-warp the video captured (e.g., correct distortions caused by the lens 118).

The processor 200 may be configured to read information from the components of the smart security floodlight 100, write information to the components of the smart security floodlight 100 and/or execute computer readable instructions. In one example, the processor 200 may be a video processor. The processor 200 may be configured to perform video processing operations to generate video frames. The processor 200 may be configured to select still images from the video frames to upload to a remote device (e.g., distributed servers). The processing capability of the processor 200 may be limited due to size constraints, power constraints, cost constraints, etc.

The processor 200 may be configured to detect one or more triggering events. The triggering events may occur when a particular input is determined to be above some pre-determined threshold value. The processor 200 may analyze input detected by one or more of the components of the smart security floodlight 100 to determine whether the detected input is above the pre-determined threshold. In one example, the triggering event may be when the processor 200 determines that the input from the PIR sensor 110 is above a threshold for motion. In another example, the triggering event may be when the processor 200 determines that the incoming audio detected by the microphone 202 is above a particular audio level and/or matches a particular frequency pattern. In an example, when the processor 200 determines that a triggering event has occurred, the processor 200 may adjust the mode of operation of the light panels 130a-130d (e.g., strobe the red/blue lights, track a movement of an identified object with a high intensity light beam, increase the brightness of the white light, etc.). The type of input and/or the threshold value for the particular type of input that results in a triggering event may be varied according to the design criteria of a particular implementation.

In one example, the processor 200 may be configured to analyze the video frames for a particular amount of motion and/or a change in the amount of light to detect a triggering event (e.g., an amount of motion above a threshold amount of motion). In another example, the processor 200 may implement a neural network artificial intelligence module to determine whether the video frame has captured a particular type of object (e.g., a person, an animal, a vehicle, a package, etc.) to detect the triggering event. In an example, the processor 200 may implement a relatively simple neural network module that may be a modified and/or compressed version of a neural network module implemented by a cloud computing service. The compressed simple neural network module implemented by the processor 200 may have a reduced size and/or complexity to enable execution on the processor 200 and/or within the power and/or heat constraints of the smart security floodlight 100.

The microphone 202 may receive audio signals (e.g., input audio). Audio signals detected by the microphone 202 may be used by the processor 200 to generate various control signals (e.g., a triggering event). In one example, audio signals generated by the visitor may be received by the microphone 202 to generate a control signal for the components of the smart security light 100 used to control the light panels 130a-130d, control a door (e.g., opening, closing, and/or locking a door) and/or generate audio from the integrated speakers 206. Audio signals detected by the microphone 202 may be used as an audio password. For example, voice recognition may be used to generate a password. The audio password may be needed to allow the smart security floodlight 100 to generate various control signals. In one example, the microphone 202 may capture the audio input and present the audio input to the communication device 210 for streaming to a smartphone, a remote server and/or a call center. In another example, the microphone 202 may capture the audio input and present the audio input to the audio processing component 212 for encoding (e.g., to be stored by the storage component 204).

The memory (or storage component) 204 may be configured to provide electronic storage for the captured video frames, audio files for playback, computer readable instructions, firmware, etc. The memory 204 may store computer readable data (e.g., images, audio, video, sensor readings and/or other data). In one example, the storage component 204 may be a non-volatile storage medium. In another example, the storage component 204 may be a combination of non-volatile and volatile memory. Data stored in the memory 204 may be compared to various signals from sensor modules implemented by apparatus 100. In one example, the data stored in the memory 204 may be a password. The processor 200 may compare the password with signals from the sensor modules. The comparison may determine whether a triggering event has occurred. The storage component 204 may store audio data (e.g., the pre-recorded audio for playback, the received audio), video data (e.g., the video streams, still images), computer readable instructions and/or other data.

The integrated speakers 206 may generate audio signals. The integrated speakers 206 may be configured to playback audio. The integrated speakers 206 may comprise multiple speakers that may be located near the speaker grilles 112a-112c shown in association with FIGS. 1-5. The integrated speakers 206 may be implemented as more than one speaker. In one embodiment, the integrated speakers 206 may be configured to generate a loud volume sound (e.g., over 110 dB at approximately 10 feet). However, the particular volume generated may be varied to meet the design criteria of a particular implementation.

The power supply (or power adapter) 208 may receive electrical power from the premises. Electrical power from the premises may be presented via the back panel 104. The power adapter 208 may convert the electrical power (e.g., from AC to DC). The converted electrical power may provide a power supply to the various components within the housing 102. The power adapter 208 may perform voltage regulation. In one example, the power adapter 208 may be implemented as a 5V power adapter.

In one example, the power storage component 208 may be a battery (e.g., rechargeable) configured to supply power to the components of the smart security floodlight 100. In another example, the power storage and/or adapter component 208 may be configured to convert an AC power supply to DC power usable by the components of the smart security floodlight 100.

The communication device 210 may be configured to implement wireless communication. The communication device 210 may be configured to implement one or more wireless communications protocols (e.g., Wi-Fi, Bluetooth, ZigBee, ZWave, etc.). The communication device 210 may be configured to receive instructions from a remote (Internet) source. The communication device 210 may be configured to connect to a local network and/or a wide area network. In some embodiments, the communication device 210 may be configured to implement one or more types of communications protocols. For example, the communication device 210 may support a Wi-Fi connection and/or a Bluetooth connection. In some embodiments, the communication device 210 may be distributed as multiple circuits (e.g., a processing chip for each communications protocol). Other types of communications protocols may be implemented according to the design criteria of a particular implementation. In some embodiments, the communication device 210 may implement the Bluetooth connection to connect to a remote device (e.g., a smartphone) to provide an interface for configuring the smart security floodlight 100 (e.g., to allow the user to input local network settings).

The communication device 210 may receive and/or transmit data signals. The communication device 210 may register electromagnetic signals, acoustic signals, and/or other signals. The communication device 210 may provide control signals (e.g., to turn on the LED panels 130a-130d, create sound from one or more of the integrated speakers 206, send alerts to users, send other wireless signals, etc.).

In some embodiments, the communication device 210 may implement the Wi-Fi connection to connect to a cloud service via the internet. The communication device 210 may enable a stream of video data and/or images generated by the processor 200 to the cloud service. In one example, the communication device 210 may find an available server and upload the video stream and/or images to the available server. In another example, the communication device 210 may implement an upload queue and the available server may pull the data from the upload queue.

The communication device 210 may enable the smart security floodlight 100 to communicate with other security floodlights to form a network of security floodlights. The network may provide multi-camera co-ordination (e.g., to cover a large area such as in a car dealer lot, buildings with electrical panels, retail malls, churches, schools, etc.) to create an effective deterrent. In some embodiments, the security floodlight may communicate with UAV drones to track intruders.

In some embodiment, the audio processing component 212 may be a separate processor from the video processor 200. In some embodiments, the audio processing component 212 may be implemented as a component, submodule and/or chiplet of the video processor 200. The audio processor 212 may be configured to encode, decode and/or play back audio. In an example, the audio processing component 212 may be configured to play back pre-recorded audio stored in the storage component 204 (e.g., pre-recorded greetings, alarms, music, etc.). In another example, the audio processing component 204 may be configured to play back audio received from a smartphone and/or from a remote call center in real-time.

In some embodiments, the audio processing component 212 may be configured to stream audio signals from a smartphone, and/or other devices within range of the smart security floodlight 100. The communication module 210 (e.g., a Wi-Fi antenna) may be configured to communicate with the smartphone, and/or other devices to send and/or receive audio signals. In some embodiments, the communication module 210 may comprise a connection port that may be configured to communicate with various devices to send and/or receive audio signals (e.g., via USB). The audio signals may be stored in the memory 204. In one example, the integrated speakers 206 may generate audio signals to attract outdoor wildlife and/or chase away undesired wildlife. The smart security floodlight 100 may capture images of the wildlife. Images may be stored in the memory 204. An alert may be sent to the user via a companion application.

The consumable actuator 214 may be configured to release some type of consumable (e.g., pepper spray, tear gas, a foul smelling substance, etc.). Generally, the consumable may be re-Tillable. Releasing the consumable may be one type of deterrent implemented by the apparatus 100. For example, the foul smelling substance may be released to encourage a loiterer to leave the area. In one example, the consumable actuator 214 may implement a spray for a liquid substance. The type of consumable actuator 214 implemented may be varied according to the design criteria of a particular implementation.

The light panels 130a-130d may comprise respective blocks (or circuits) 220a-220d and/or blocks (or circuits) 222a-222d. The circuits 220a-220d may each implement a LED controller for a respective one of the light panels 130a-130d. The circuits 222a-222d may each implement a pan/tilt (PZ) actuator for a respective one of the light panels 130a-130d. The light panels 130a-130d may comprise other components (not shown). The type and/or arrangement of the components of the light panels 130a-130d may be varied according to the design criteria of a particular implementation.

The LED controllers 220a-220d may each be configured to adjust a timing, color, brightness, etc. of the LEDs 130a-130d. For example, the LED controllers 220a-220d may adjust the color of the LEDs 130a-130d from a white light to red, white and blue (e.g., to provide a deterrence that is similar to a police light). The LED controllers 220a-220d may adjust the LEDs 130a-130d to operate as a strobe light. In an example, control signals generated by the processor 200 may provide instructions for the LED controllers 220a-220d. The LED controllers 220a-220d may be configured to select the mode of operation of the light panels 130a-130d.

The PT actuators 222a-222d may be configured to provide pan and/or tilt adjustments to the LEDs 130a-130d. The PT actuators 222a-222d may be controlled by the LED controllers 220a-220d. The PT actuators 222a-222d may enable the LEDs 130a-130d to provide general illumination. The PT actuators 222a-222d may enable the LEDs 130a-130d to move in order to provide a focused light beam (e.g., place a spotlight on a target location). In one example, the LED panels 130a-130d may be reflected from a focusing mirror controlled by 2 step motors. In another example, a powerful light beam may be directed on an object of interest. In yet another example, a small group of LED elements may be selected from a large array of LED elements in the light panels 130a-130d to aim and focus on the object of interest. The PT actuators 222a-222d may be configured to enable the light panels 130a-130d to be adjusted based on the mode of operation of the light panels 130a-130d.

The capture device 108 is shown comprising the lens 118 and/or a block (or circuit) 224. The circuit 224 may implement an image sensor. The capture device 108 may comprise other components (not shown). In an example, the capture device 108 may comprise a frame buffer and/or other logic. The number, type and/or arrangement of the components of the capture device 108 may be varied according to the design criteria of a particular implementation.

The video processor 200 may generate video frames (e.g., one or more video streams) in response to the pixel data received from the image sensor 224. The image sensor 224 may implement video and/or image capture devices. The image sensor 224 may be configured to receive the light that enters the capture device 108 through the lens 118. In an example, the image sensor 224 may be rectangular with a 16:9 aspect ratio.

The image sensor 224 may be configured to receive incoming light within a truncated rectangular pyramid field of view (e.g., truncated as a result of the glare reduction implemented by the lens hood 114). The image sensor 224 may be configured to convert received light into computer readable data (e.g., raw data and/or pixels that may be processed by the processor 200 to generate video frames). The image sensor 224 may be implemented to enable video data to be recorded.

The lens 118 shape and/or location may correspond with the image sensor 224. The lens 118 may be configured to focus incoming light onto the image sensor 224. The lens 118 may be a wide-angle lens. In an example, the lens 118, the image sensor 224 and/or other circuits may implement the capture device 108. The processor 200 may be configured to generate video frames by performing image signal processing in response to captured pixels transmitted from the image sensor 224. In some embodiments, the image sensor 224 may be configured to generate the video frames (e.g., perform image signal processing) from the captured pixels and present the video frames to the processor 200.

The image sensor 224 may enable the capture of video data using the processor 200. For example, the processor 200 may be configured to generate 720p HD, 1080p, 4 k and/or 8 k video data from the pixel data captured by the image sensor 224. The image data (e.g., pixels) may be used to generate high-resolution video frames along with audio data. The quality of the video frames may be varied according to the design criteria of a particular implementation. Generally, the quality (e.g., resolution, level of detail, color, etc.) of the video frames is enough to support object detection (e.g., facial recognition, motion detection, object identification, tagging, etc.).

In some embodiments, the video processor 200 may be configured to generate time-lapse videos at maximum resolution that may be stored locally in the memory 204 for transmission when there may be more bandwidth available (e.g., night transmission). The video processor 200 may be configured to provide instructions to the LED controllers 220a-220d and/or the PT actuators 222a-222d to focus the spotlight generated by one or more of the modes of operation of the light panels 130a-130d. The video processor 200 may provide artificial intelligent controls to move the LED panels 130a-130d (e.g., instructions to the PT actuators 222a-222d) and/or control the LED panels 130a-130d (e.g., instructions to the LED controllers 220a-220d to adjust brightness, frequency, color, etc.). The video processor 200 may select which audio to output through the speakers 206 (e.g., the 110 dB commercial siren, the conversational AI audio to engage intruders until help arrives, etc.).

In some embodiments, the communication device 210 may be configured to scan for devices in the area of interest. The communication device 210 may detect mobile devices carried by the intruder. For example, mobile devices may transmit a MAC address that may be captured by the communication device 210. Based on the MAC address, the apparatus 100 may be configured to generate a personalized voice down message. The personalized voice down message may comprise information determined based on the MAC address (e.g., the type of device, a network carrier used by the device, a name associated with the device, etc.). For example, the personalized voice message may be "We have detected your smartphone. We know that you are using a Samsung Galaxy S10e and are connected to a Verizon network".

The apparatus 100 may further comprise various sensor modules (e.g., environmental sensors). In an example, the apparatus 100 may comprise an electromagnetic field sensor, an acoustic field sensor, a voice recognition sensor, a facial recognition sensor, a gesture sensor, a weather sensor and/or other sensors. One or more of the sensor modules, or a combination of the sensors modules, may be implemented internally (e.g., within the housing 102) or, alternatively, may be implemented externally (e.g., as a separate sensing device coupled to the apparatus 100). Input received by the sensor modules may be used to generate control signals and/or detect triggering events.

In some embodiments, the apparatus 100 may store the captured video frames (e.g., in the memory 204). In some embodiments, the video frames may be uploaded to storage servers (e.g., a remote device). Generally, the storage servers and/or the memory 204 may have a limited storage capacity. In some embodiments, the apparatus 100 may analyze the captured video frames (e.g., using the processor 200) and/or data from the IR sensor 110 to perform a particular type of detection (e.g., based on a triggering event). For example, the apparatus 100 may detect objects, motion and/or visitors within 3 meters (e.g., 10 feet). Still images generated from the captured video frames may be uploaded to distributed servers. A neural network implemented by the distributed servers may determine whether objects are present in the images uploaded. Based on the feedback from the distributed servers, the apparatus 100 may initiate storage of the video data in storage servers in response to the particular type of detection.

The processor 200 may implement machine learning techniques to improve detection accuracy of visitors and/or objects. For example, the user may be able to provide a correct and/or incorrect label to a detection performed by the processor 200. If the detection is incorrect, the incorrect label may be used by the apparatus 100 to incorporate an incorrect result of the detection into the machine learning techniques. In some embodiments, the machine learning techniques may be implemented in a cloud service (e.g., the analysis is performed using cloud computing resources) based on feedback about whether objects of interest were actually present. Video data and/or correct/incorrect labels may be uploaded and/or stored anonymously (e.g., without personal identification information). The apparatus 100 may be configured to ignore (e.g., not respond to, not track and/or not send notifications in response to) small animals and/or shadows.

The components within and/or partially within the housing 102 may provide the functionality of the apparatus 100. In some embodiments, the components may implement the functionality for a smart security camera. In one example, the integrated speaker 206 and the audio processing device 212 may be configured to generate audio for communicating to a visitor and the microphone 202 may be configured to receive audio (e.g., to enable 2-way communication).

In some embodiments, the processor 200 and/or the audio processor 212 may be configured to perform audio analytics. The microphone 204 may capture audio input. In an example, the audio input may be a response from a visitor. The processor 200 and/or the audio processor 212 may extract words and/or sounds from the audio input to determine the content of the audio input. The audio analytics may be configured to parse the content of the audio input to determine a meaning of and/or understand the audio input. In some embodiments, the audio analytics may transcribe the content of the audio input to provide training data for machine learning. Using the audio analytics to understand the audio input may enable the processor 200 to determine the context and/or generate an appropriate reaction.

The apparatus 100 may be configured to deter potential intruders. In an example, an effectiveness measurement of deterrence of intruders may be determined based on a metric of detecting that the potential intruder(s) has left the FOV 180a-180b of the capture device 108 within approximately 60 seconds and the intruders are not detected afterwards. One example deterrent method implemented by the apparatus 100 may be the processor 200 providing a control signal to the LED controllers 220a-220d to cause the light panels 130a-130d to provide a very bright red/blue colored strobe effect along with the integrated speaker 106 generating sound of a police siren wailing at 110 db.

In an example, the image sensor 224 may be configured to provide data for the processor 200 to generate 4 k resolution video frames. The processor 200 may be configured to generate 4 k resolution video frames at approximately 15 frames per second for recording (e.g., storing in the memory 204). The processor 200 may be also configured to generate lower resolution video frames simultaneously (e.g., video frames at 720 P resolution for streaming via the communication device 210). The processor 200 may be configured to provide digital pan/tilt/zoom features. In an example, the processor 200 may provide a 32λ digital zoom to enable generating 480P lower resolution video frames from the high resolution 4 k video frames.

The integrated speakers 206 may be implemented as multiple speakers. In an example, the integrated speakers 206 may comprise a center, left and right speaker (e.g., generally corresponding with the location of the speaker grills 112a-112c shown in association with FIGS. 1-5). Each of the integrated speakers 206 may implement a 6 W speaker. The integrated speakers 206 may operate in conjunction with the microphone 204 and the communication device 210 to provide full duplex audio communication. The communication device 210 may provide an Ethernet connection, Wi-Fi communication (e.g., longer range wireless) and/or Bluetooth communication (e.g., shorter range wireless).

Figure 7:
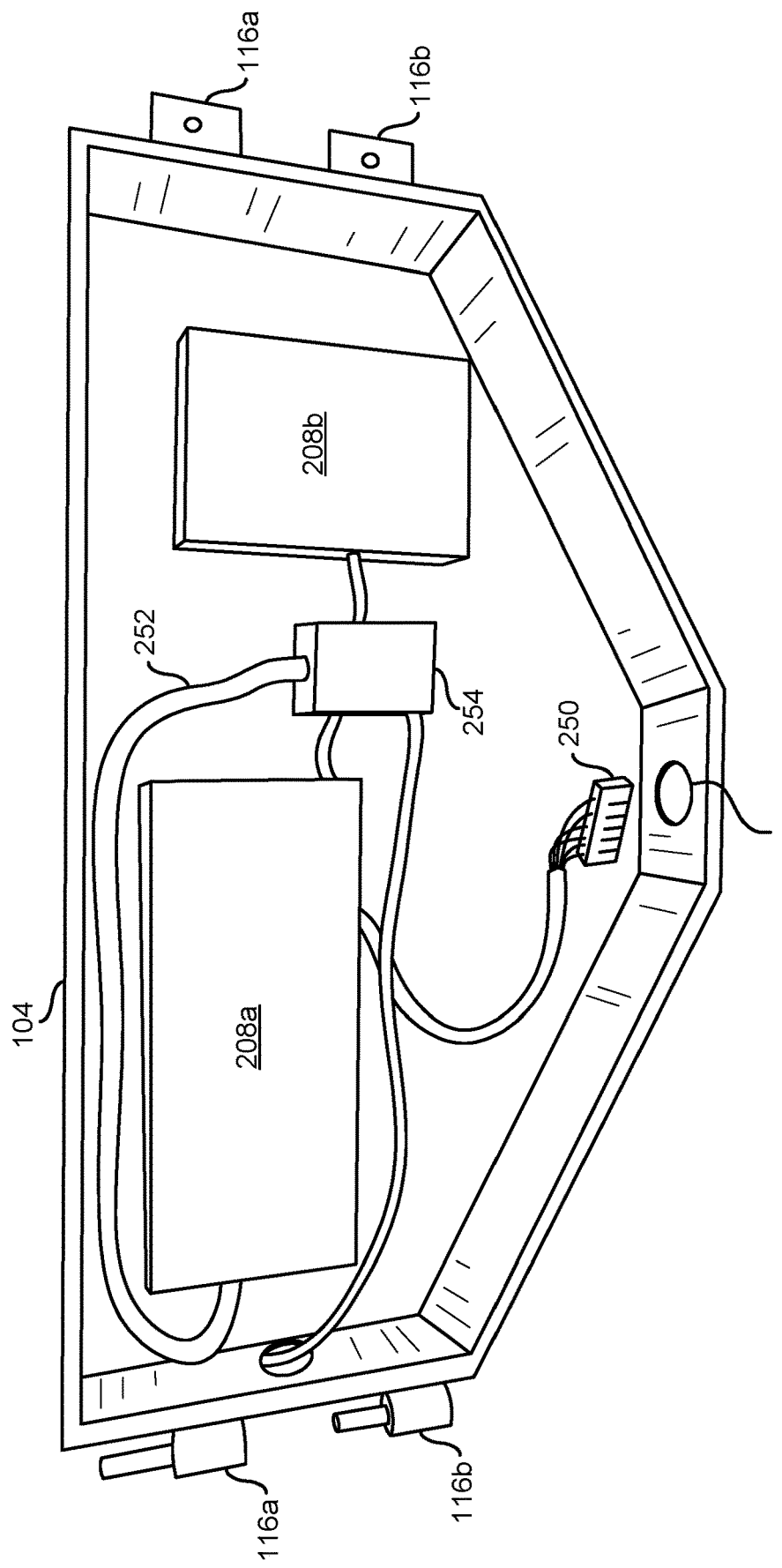
FIG. 7 is a diagram illustrating an example view of a power supply.

Referring to FIG. 7, a diagram illustrating an example view of a power supply is shown. A view within the back panel (or wall pack) 104 is shown. For example, the view of the back panel 104 shown may not be visible when the apparatus 100 is mounted to the surface 50 (e.g., the surface 50 would cover the back panel 104 from the perspective shown). The housing 102 would be located on the opposite face (e.g., in front of) the back panel 104 and the wall 50 would be behind the back panel 104 (e.g., the view shown would be through the wall 50).

The hinges 116a-116b are shown on each side of the back panel 104. The hinges 116a-116b may enable the back panel 104 to swing open when the apparatus 100 is mounted to the surface 50. For example, the back panel 104 may open for easy access to wiring to connect the apparatus 100 to a power source of the premises. The hinges 116a-116b may further enable the apparatus 100 to be securely mounted to the surface 50.

The power adapter 208 is shown as two separate power adapter components 208a-208b. The power adapter component 208a may provide a power supply for the light panels 130a-130d. In an example, the power adapter component 208a may be a 75 W LED power supply (e.g., 120V-277V). In an example, the heat sink fins 152 may help dissipate the heat generated by the power adapter component 208a. The power adapter component 208b may be configured to provide DC power to the components in the housing 102. For example, the power adapter component 208b may be configured to provide voltage regulation to provide a DC voltage (e.g., 5V, 3.3V, etc.). In some embodiments, the power adapter component 208b may provide a power supply for the capture device 108. For example, the power supply component 208b may implement a 10 W power supply for the camera module 108.

A connector 250 is shown, cabling 252 and a junction box 254 are shown. The connector 250 may connect to the power supply of the premises. The connector 250 may connect to the junction box 254. The cabling 252 may connect the junction box 254 to the LED power supply 208a and the power adapter component 208b. While a junction box 254 is shown, the connection between the connector 250, the cabling 252 and/or the power adapter components 208a-208b may be implemented using twist-on wire connectors. The connections between the power supply of the premises, the power adapter 208 and/or the components of the apparatus 100 may be varied according to the design criteria of a particular implementation.

A locking mechanism 256 is shown. The locking mechanism 256 may be configured to securely lock the back panel 104. Locking the back panel 104 using the locking mechanism 256 may prevent tampering and/or unauthorized access to the back panel 104. In one example, the locking mechanism 256 may comprise a locknut. In some embodiments, the locking mechanism 256 may provide an opening for a conduit adapter (e.g., to enable conduits for cabling to be attached to the back panel 104).

The apparatus 100 may be configured to provide easy installation. Generally, the installation of the apparatus 100 may be similar to installation of standard commercial floodlights. For installation, the apparatus 100 may be opened (e.g., open the back panel 104). The back panel 104 may be mounted to the desired location on the surface 50 (e.g., over a junction box that provides a connection to the power supply of the premises and/or any desired location on the wall 50). The housing 102 may be hanged on the hinges 116a-116b to connect the housing 102 to the back panel 104. The housing 102 may be closed (e.g., swung shut over the back panel 104). Screws may be inserted into the openings 160a-160b to secure the housing 102 to the back panel 104 to complete the installation.

Figure 8:
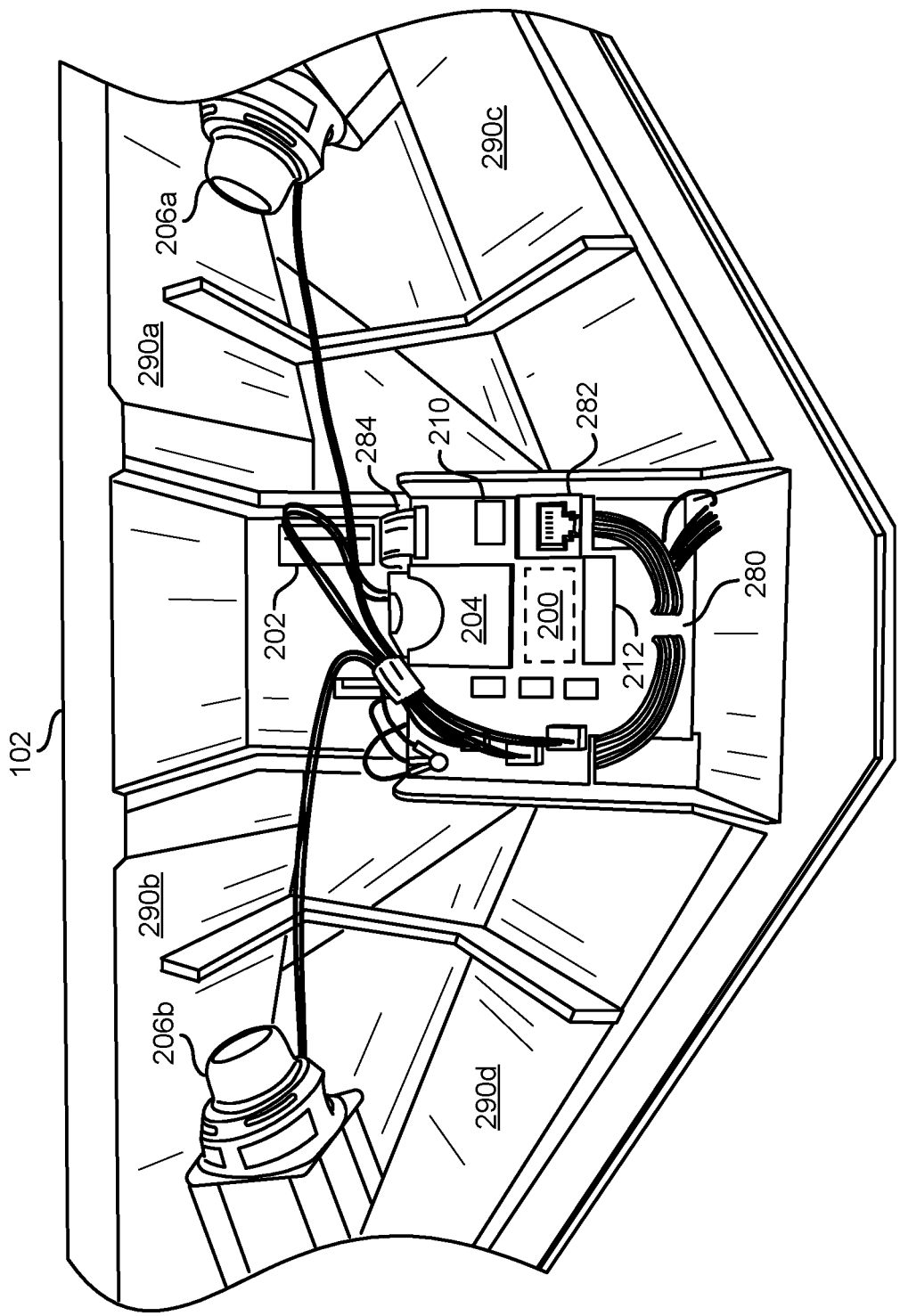
FIG. 8 is a diagram illustrating an example view of components within a housing of the security floodlight.

Referring to FIG. 8, a diagram illustrating an example view of components within a housing of the security floodlight is shown. A view within the housing 102 is shown. For example, the view of the housing 102 shown may not be visible when the apparatus 100 is mounted to the surface 50 (e.g., the surface 50 would cover the back panel 104 from the perspective shown and then the back panel 104 would cover the housing 102). The back panel 104 would be behind the housing 102 (e.g., the view shown would be through the wall 50 and then through the back panel 104).

A circuit board 280 may be implemented within the housing 102. Some of the components 200-224 may be integrated components on the circuit board 280. In the example shown, the processor 200 may be located on the circuit board 280 (e.g., on the underside of the view shown). In the example shown, the memory 204 may comprise a high capacity SD card. For example, a SD card slot may be implemented on the circuit board 280 to expand the capacity of the memory 204. In an example, using the SD card slot for the memory 204 may enable 4 k resolution, 15 fps for live recording (e.g., at approximately 300 GB for 1 week storage at 4 Mbps). The audio processor 212 and the communication device 210 are also shown as integrated components of the circuit board 280.

The circuit board 280 may comprise a communications port 282. In the example shown, the communications port 282 may be an Ethernet port. The Ethernet port 282 may enable a wired communication connection. In an example, the Ethernet port 282 may enable sufficient bandwidth for high speed transfer of the high resolution video frames generated by the processor 200. Generally, the Ethernet port 282 may enable a higher speed transfer than wireless communications. The Ethernet port 282 may be located near the communication device 210. The circuit board 280 may provide a connection from the communication device 210 to the lens hood 114 (e.g., antennae for Wi-Fi and/or Bluetooth may be implemented within the lens hood 114). The SD card slot and the Ethernet port 282 may be easily accessible when the housing 102 is swung open from the back panel 104.

A ribbon cable 284 is shown connected to the circuit board 280. The ribbon cable 284 may provide a connection between the video processor 200 and the capture device 108. The ribbon cable 284 may provide flexibility to enable the camera module 108 to move (e.g., tilt/pan). The ribbon cable 284 may provide a high speed connection to transfer the raw data generated by the image sensor 224.

The microphone 202 and the integrated speakers 206a-206b are shown within the housing 102. A third integrated speaker (e.g., the integrated speaker 206c) may be located below the circuit board 280. The location of the microphone 202 and the integrated speakers 206a-206c may generally correspond to the locations of the speaker grilles 112a-112c shown in association with FIGS. 1-5. In an example, the integrated speaker 206a-206c may produce a commercial siren. In an example, each of the integrated speakers 206a-206c may be a six Watt speaker. The speaker grilles 112a-112c may enable the integrated speaker to clearly emit audio. In one example, the integrated speakers 206a-206c may each be approximately 3 inches in diameter. The audio generated by the integrated speakers 206a-206c may comprise real-time audio transmission (e.g., a two-way radio), pre-recorded audio (e.g., stored audio files), intelligently generated audio (e.g., audio generated on-the-fly using artificial intelligence) and/or deterrent sounds.

Using the microphone 202 to receive audio and the integrated speakers 206a-206c to play audio, a person may have a conversation with the smart security floodlight 100. In one example, the conversation may be with a conversational artificial intelligence (e.g., the smart security floodlight 100 may receive incoming audio, interpret the audio, and procedurally generate speech in response to the input audio). In another example, the conversation may be a remote conversation with another person (e.g., a third-party professional monitoring service, a property owner communicating via a smartphone, etc.).

Heat dissipating panels 290a-290d are shown in the inner surface of the housing 102. The heat dissipating panels 290a-290d may generally correspond to the location of the light panels 130a-130d located on the outside of the housing 102. The heat dissipating panels 290a-290d may each provide a thermal contact with the light panels 130a-130d. The heat dissipating panels 290a-290d may provide heat sinks to remove heat generated by the light panels 130a-130d. In one example, the heat dissipating panels 290a-290d may be implemented as aluminum heat sinks capable of removing heat corresponding to 75 W of power.

Figure 9:
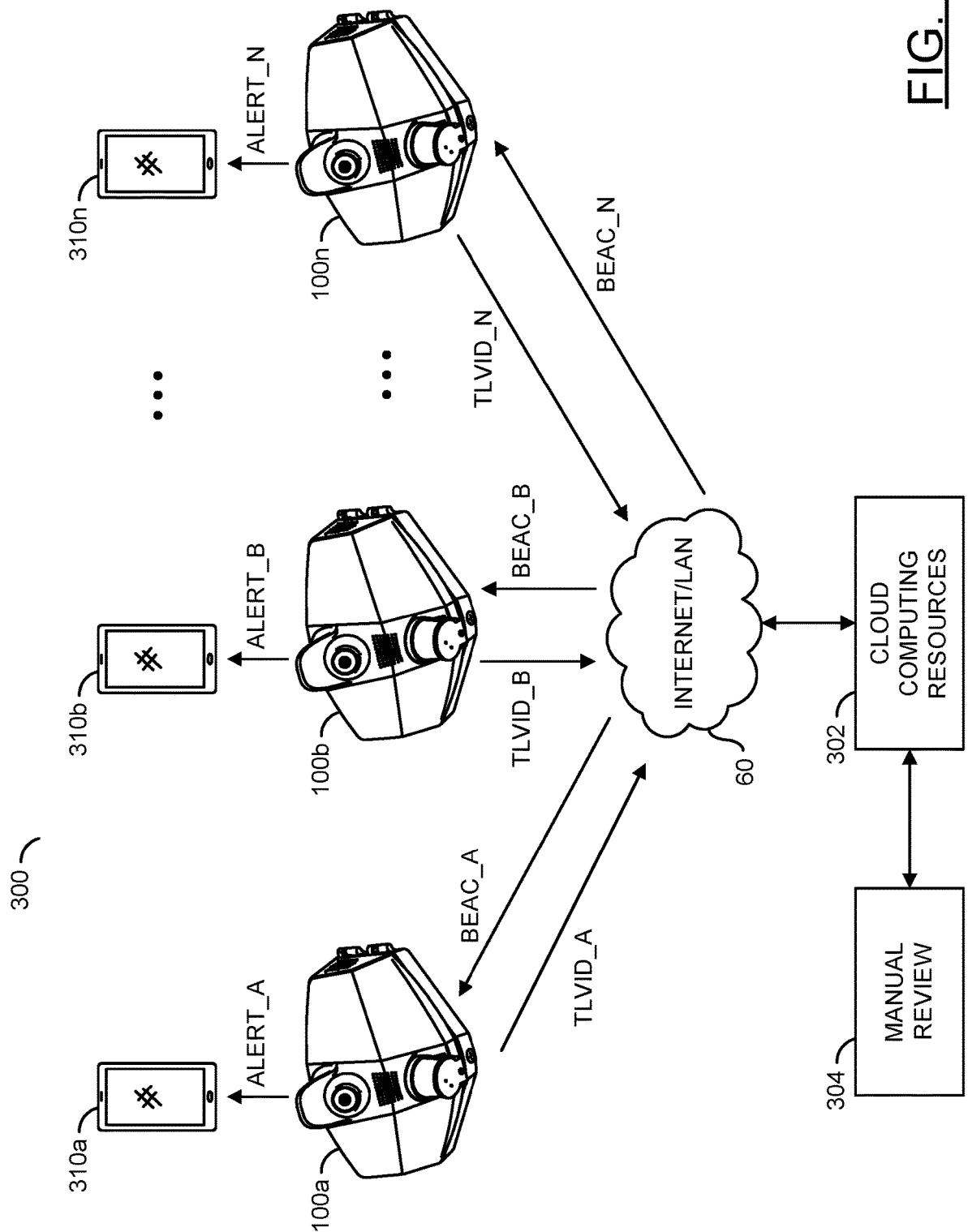
FIG. 9 is a diagram illustrating transmitting captured video for proactive security monitoring.

Referring to FIG. 9, a diagram illustrating transmitting captured video for proactive security monitoring is shown. A system 300 is shown. The system 300 may comprise a number of the smart security floodlights 100a-100n. Each of the smart security floodlights 100a-100n may have an implementation similar to the smart security floodlight 100 described in association with FIGS. 1-8. For example, in the system 300, multiple smart security floodlights 100a-100n may be configured to provide coordinated preventative security and/or video capture at various locations of a premises. The system 300 may be configured to implement a network of multiple smart security floodlights 100a-100n to deliver intelligent deterrence.

The system 300 may further comprise a network 60, a block 302, a block 304 and/or blocks (or circuits) 310a-310n. The network 60 may be a local network (e.g., a LAN network) and/or a wide area network (e.g., the internet). The block 302 may represent cloud (or distributed) computing resources. The block 304 may represent a call center (e.g., human operators that may provide manual review). The circuits 310a-310n may represent remote devices. In the example shown, the remote devices 310a-310n may be smartphones (or tablet computing devices).

The cloud computing resources 302 may be an example of a remote device. The cloud computer resources 302 may be configured to provide processing and/or mass storage for the system 300. The cloud computing resources 302 may implement a more comprehensive version of the neural network implemented by the processor 200 for object detection and/or classification. In one example, the cloud computer resources 302 may be implemented as one or more server computers (e.g., an internet server configured to implement cloud computing). In another example, the cloud computer resources 302 may be implemented as a local hub server (e.g., a server computer located on-site that may be connected to the smart security floodlights 100a-100n and implement cloud computing). In yet another example, the cloud computer resources 302 may be implemented as distributed processing among a network of the smart security floodlights 100a-100n. For example, the smart security floodlights 100a-100n may be configured to implement coordinated computing (e.g., each smart security floodlight 100a-100n may be able to lend processing capability of the respective processors 200, to perform computations together). The processors 200 of each of the smart security floodlights 100a-100n may perform distributed computing to perform calculations together that may not be capable of being performed by one of the smart security floodlights 100a-100n alone (or may take longer to perform alone).

Generally, the cloud computer resources 302 may be located off-site from the smart security floodlights 100a-100n. The cloud computer resources 302 may be configured to store data, retrieve and transmit stored data, process data and/or communicate with other devices. The cloud computer resources 302 may be implemented as part of a cloud computing platform (e.g., distributed computing). In an example, the cloud computer resources 302 may be implemented as a group of cloud-based, scalable server computers. By implementing a number of scalable servers, additional resources (e.g., power, processing capability, memory, etc.) may be available to process and/or store variable amounts of data. For example, the cloud computer resources 302 may be configured to scale (e.g., provision resources) based on demand. The cloud computer resources 302 may implement scalable computing (e.g., cloud computing). The scalable computing may be available as a service to allow access to processing and/or storage resources without having to build infrastructure (e.g., the provider of the system 300 and/or the smart security floodlights 100a-100n may not have to build the infrastructure of the cloud computer resources 302). In the example shown, the cloud computer resources 302 is shown as a single block. However, the cloud computer resources 302 may be implemented as several computing devices (e.g., servers) located in many different locations.

The call center 304 may comprise human resources. The call center 304 may provide off-site support services. The call center 304 may be located remotely from the smart security floodlights 100a-100n. In an example, the call center 304 may be located in another country and/or continent than the smart security floodlights 100a-100n. Services provided by the call center 304 may be a premium add-on service that may enhance the functionality of the smart security floodlights 100a-100n.

The remote devices 310a-310n may be configured to display video, playback audio, receive audio and/or communicate (wired and/or wirelessly). In the example shown, the remote devices 310a-310n may be smartphones (e.g., portable devices that may be carried with an end user). The remote devices 310a-310n may be implemented as desktop computers (e.g., security workstations), laptop computers, netbooks, tablet computing devices, etc. The remote devices 310a-310n may be configured to execute computer readable instructions for a companion application for the smart security floodlights 100a-100n.

The smart security floodlights 100a-100n may be configured to wirelessly communicate the video frames (e.g., one or more video streams) and/or other data. The smart security floodlights 100a-100n are shown generating signals (e.g., ALERT_A-ALERT_N) to the smartphones 310a-310n, receiving signals (e.g., BEAC_A-BEAC_N) and/or generating signals (e.g., TLVID_A-TLVID_N). Other data and/or signals may be generated and/or received by the smart security floodlights 100a-100n. The number, type and/or amount of data communicated by the smart security floodlights 100a-100n may be varied according to the design criteria of a particular implementation.

The signals ALERT_A-ALERT_N may comprise notifications and/or video data. In an example, the processor 200 may be configured to format the video streams to be communicated and/or establish a wireless communication link between the apparatus 100 and the smartphones 310a-310n (e.g., using Wi-Fi, cellular communication such as 3G/4G/LTE/5G, Bluetooth, etc.) implemented by the wireless communication device 210. In another example, data may be communicated between the smart security floodlights 100a-100n and the smartphones 310a-310n for the operation of the companion app (e.g., sensor readings may be communicated to the smartphones 310a-310n, instructions and/or preferences may be communicated to the smart security floodlights 100a-100n, etc.).

The signals TLVID_A-TLVID_N may be configured to communicate the video data generated by the processor 200 to the cloud computing resources 302 via the network 60. In some embodiments, the smart security floodlights 100a-100n may be configured to communicate an entire video stream (e.g., the 4 k video frames if sufficient bandwidth is available). In some embodiments, the smart security floodlights 100a-100n may be configured to scale down and/or crop the video frames to generate lower resolution video frames that may be streamed (e.g., 720P video frames). In some embodiments, the smart security floodlights 100a-100n may be configured to select a portion of the video frames from the video stream to create a time lapse video stream (e.g., one video frame every thirty seconds, one video frame every 1 minute, etc.). The time lapse video stream may provide a general idea of what is happening at the premises without providing a full video stream. For example, most of the time businesses do not have an intruder and/or nothing is happening (e.g., at night). The time lapse video stream may provide an indication that nothing is happening near the smart security floodlights 100a-100n.

The signals BEAC_A-BEAC_N may be communicated by the cloud computing resources 302 to the smart security floodlights 100a-100n. The signals BEAC_A-BEAC_N may be implemented as beacon signals to ensure that the smart security floodlights 100a-100n are capable of communicating data. For example, if an intruder has disabled one or more of the smart security floodlights 100a-100n, then the smart security floodlights 100a-100n would not be able to receive and/or respond to the signals BEAC_A-BEAC_N. In an example, an end user (e.g., the property owner) and/or the authorities may be contacted if the smart security floodlights 100a-100n are not capable of receiving and/or responding to the signals BEAC_A-BEAC_N.

The cloud computer services 302 may be configured to analyze the time lapsed video from the signals TLVID_A-TLVID_N to determine the status of each apparatus 100a-100n individually. The cloud computer services 302 may generate statistics about the status of each of the apparatuses 100a-100n. The statistics may be for each individual apparatus 100a-100n and/or for a group of the apparatuses 100a-100n (e.g., the apparatuses 100a-100n implemented at a particular property, at a particular area of a property, all apparatuses owned by a particular person, etc.). The cloud computer services 302 may be configured to generate reports based on the statistics.

The reports may be generated in response to a user request. The reports may be generated based on a schedule (e.g., weekly, monthly, yearly, etc.). For example, the report may comprise a percentage of uptime of the apparatuses 100a-100n. The uptime may be determined by analyzing the time lapsed data used to determine the status of each of the apparatuses 100a-100n. For example, the uptime may be the amount of time that the apparatuses 100a-100n are working properly (e.g., capturing video, detecting intruders, undamaged, not tampered with, etc.). For example, when the cloud computer services 302 detects too many all black frames, there may be an indication of down time (e.g., one of the apparatuses 100a-100n may not be working properly). The report on uptime may also comprise the diagnosis made by the cloud computer services 302 based on the time lapsed video (e.g., all black frames may indicate that the apparatus has been tampered with, etc.).

In some embodiments, the cloud computer services 302 may receive the video data from the apparatuses 100a-100n to perform the computer vision operations for detecting the intruder. The cloud computer services 302 may provide the results of the computer vision (e.g., whether the intruder has been detected, the location of the intruder in the field of view of the camera, etc.) back to the apparatuses 100a-100n so that the processor 200 may select the appropriate response. The cloud computer services 302 may be configured to generate effectiveness statistics. The effectiveness statistics may comprise whether an intruder left the area of interest after the response, whether the intruder stayed, whether the intruder caused property damage, etc. The cloud computer services 302 may be configured to generate reports based on the effectiveness statistics (e.g., daily, weekly, monthly, etc.). The reports may also be generated in response to a request from a user (e.g., via the companion app implemented on the smartphones 310a-310n). The report may provide the effective deterrence of each apparatus 100a-100n (e.g., a rating of how often the intruder left without causing damages). The cloud computer services 302 may also store the video data that corresponds with when the intruder was detected (e.g., intruder video clips). The report may also comprise the intruder video clips.

Figure 10:
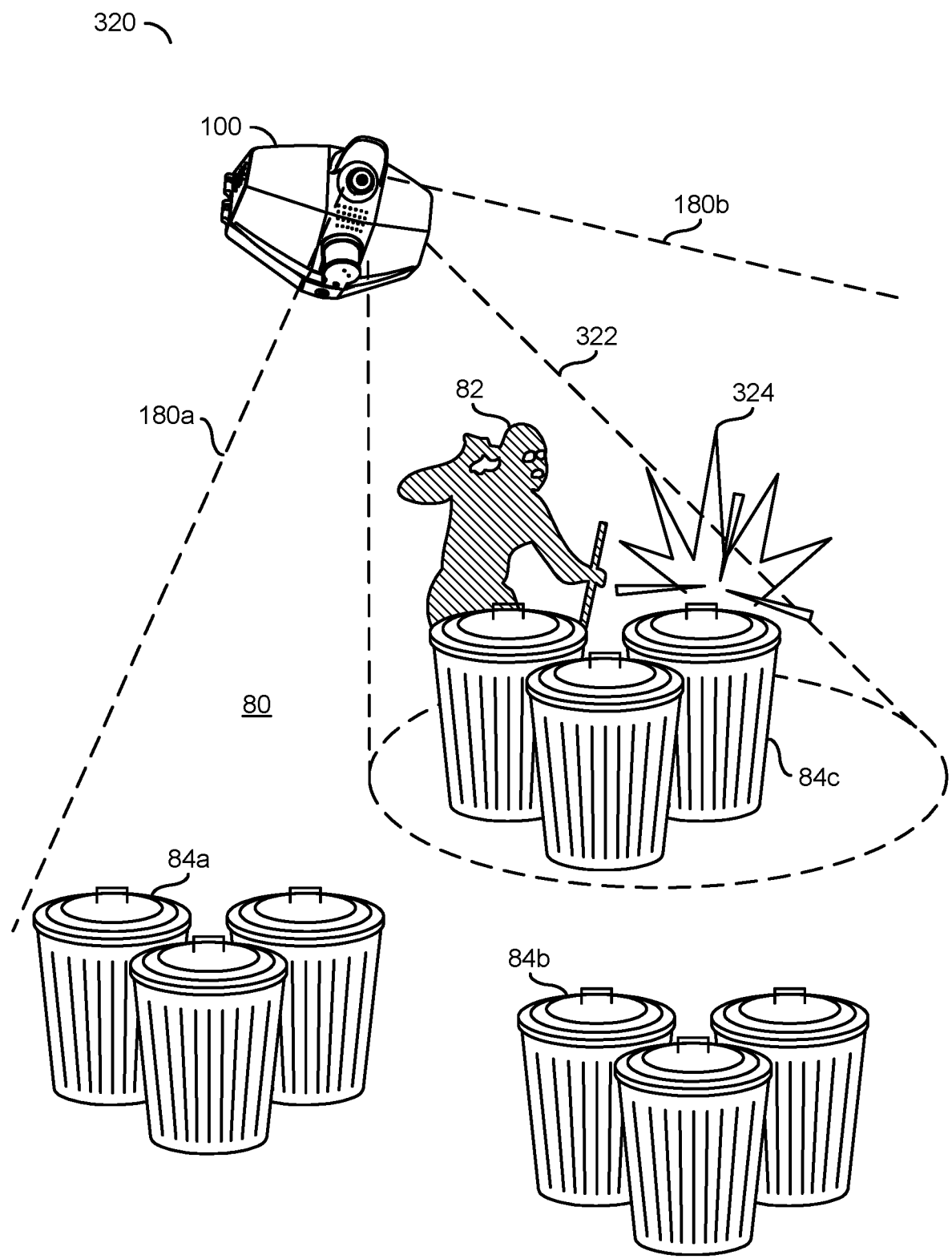
FIG. 10 is a diagram illustrating focusing a spotlight on a detected object.

Referring to FIG. 10, a diagram illustrating focusing a spotlight on a detected object is shown. An example scenario 320 is shown. The example scenario 320 may comprise the smart security floodlight 100. The smart security floodlight 100 is shown mounted from an elevated position (e.g., located high up on a wall in a dark alley to capture the ground below). The smart security floodlight 100 is shown capturing the field of view 180a-180b to generate video frames. The field of view 180a-180b may capture the area 80. The area 80 may be a location below the apparatus 100.

A target 82 may be in the area 80. Various inanimate objects 84a-84c are shown in the area 80. In the example shown, the inanimate objects 84a-84c may be groups of trashcans. The processor 200 of the apparatus 100 may be configured to generate video frames of the area 80 within the field of view 180a-180b, analyze the video frames, detect objects and/or classify the detected objects (e.g., detect and classify the trashcans 84a-84c and the target 82). For example, the video processor 200 may detect and/or classify the target 82 as a burglar (e.g., wearing a ski mask, attempting to hide in the shadows, hiding behind the objects 84c, etc.).

A range of the light 322 is shown. The light generated by the apparatus 100 may provide panoramic lighting with an optional strobe light. For example, the light may be adjustable 180 degrees from left to right and 20-90 degrees from front to bottom. Each LED element in the array of the light elements 130a-130d may be controlled by color, intensity and/or frequency. In the example shown, the range of light 322 may be implemented as a spotlight. The spotlight 322 may be a high intensity light beam focused on (e.g., directed at) the target 82. For example, the focused LED beam 322 may output a 10,000 lumen light on a two foot diameter at 20 feet distance. In one example, the focused LED beam 322 may be focused on a face of the target 82. Focusing the LED beam on the face of the target 82 may cause disorientation and/or provide an indication to the target 82 that well-lit video evidence of the target 82 has been recorded that may provide identification. The focused light beam 322 may be configured to track the target 82. The location of the focused light beam 322 may be adjusted as the intruder 82 moves. In on example, the processor 200 may provide instructions to the LED controllers 220a-220n to change modes of operation from a general illumination mode to a mode of operation that generates the focused light beam 322. The processor 200 may further provide instructions to the PT actuators 222a-222d (e.g., implemented as a 2 step motor for pan and tilt of the light panels 130a-130d) to adjust the location of the focused light beam 322 as the target 82 moves within the area 80.

A shape 324 is shown to represent a sound (e.g., a crash noise). For example, the sound 324 may be the target 82 bumping into the garbage cans 84c. The audio processor 212 may analyze the sound 324 to determine the behavior and/or characteristics of the target 82. The processor 200 and/or the audio processor 212 may be further configured to detect an audio source (e.g., detect the location of the crash sound 324) based on performing directional audio analysis.

The analysis of the video by the processor 200 and/or the audio by the audio processor 212 may be used to determine the characteristics of the target 82, determine the behavior of the target 82 and/or determine the location of the target 82. For example, the processor 200 may implement sensor fusion to combine information from disparate sources (e.g., information determined based on the results of computer vision operations performed on the video frames and information separately determined based on the audio detected, as well as information determined from the PIR sensor 110) into an analysis that may be capable of making inferences that would not be available by analyzing the individual sources of information alone.

The light generated by the apparatus 100 may provide the focused spotlight 322 that may be AI controlled and/or remotely controlled (e.g., using a smartphone app implemented on one or more of the smartphones 310a-310b and/or by commands provided by the call center 304). The focused light beam 322 may operate similar to a spotlight used by patrol cars and/or patrol guards to focus on suspicious visitors on site after business hours. For example, when the target 82 is detected, the smart security floodlight 100 may contact the authorities (e.g., the police). Before a patrol car arrives, the apparatus 100 on site may use the focused beam of light 322 on the object of interest 82. The adjustment to the location of the focused light beam 322 may be controlled by the detection software implemented by the video processor 200 (e.g., by tracking the detected object and updating the location of the light beam 322 to correspond with the new location of the target 82) and/or manually through an app.

In some embodiments, the processor 200 may be configured to perform a self-diagnosis routine for the camera module 108. The self-diagnosis routine may be configured to ensure that the input sensors (e.g., the microphone 202, the camera module 108, the PIR sensor 110, etc.) are operating properly (e.g., have not been tampered with). In one example, the self-diagnosis routine may comprise recording video and check for abnormal images (e.g., blank or black images that indicate the lens 118 has been covered or spray painted, the same image that may indicate that the lens 118 has been tampered with or the video has been looped, etc.), generate and record audio, check audio spectrum, check network stability, etc. The apparatus 100 may be configured to perform the self-diagnosis based on a schedule. In response to performing the self-diagnosis, the processor 200 may generate reports of the results (e.g., all systems okay, sensors need maintenance, system has been tampered with, etc.). The apparatus 100 may generate an emergency alert if the self-diagnosis fails. The self-diagnosis performed by the apparatus 100 perform similar checks and/or diagnosis performed by the cloud computing resources 302 as described in association with FIG. 9.

Figure 11:
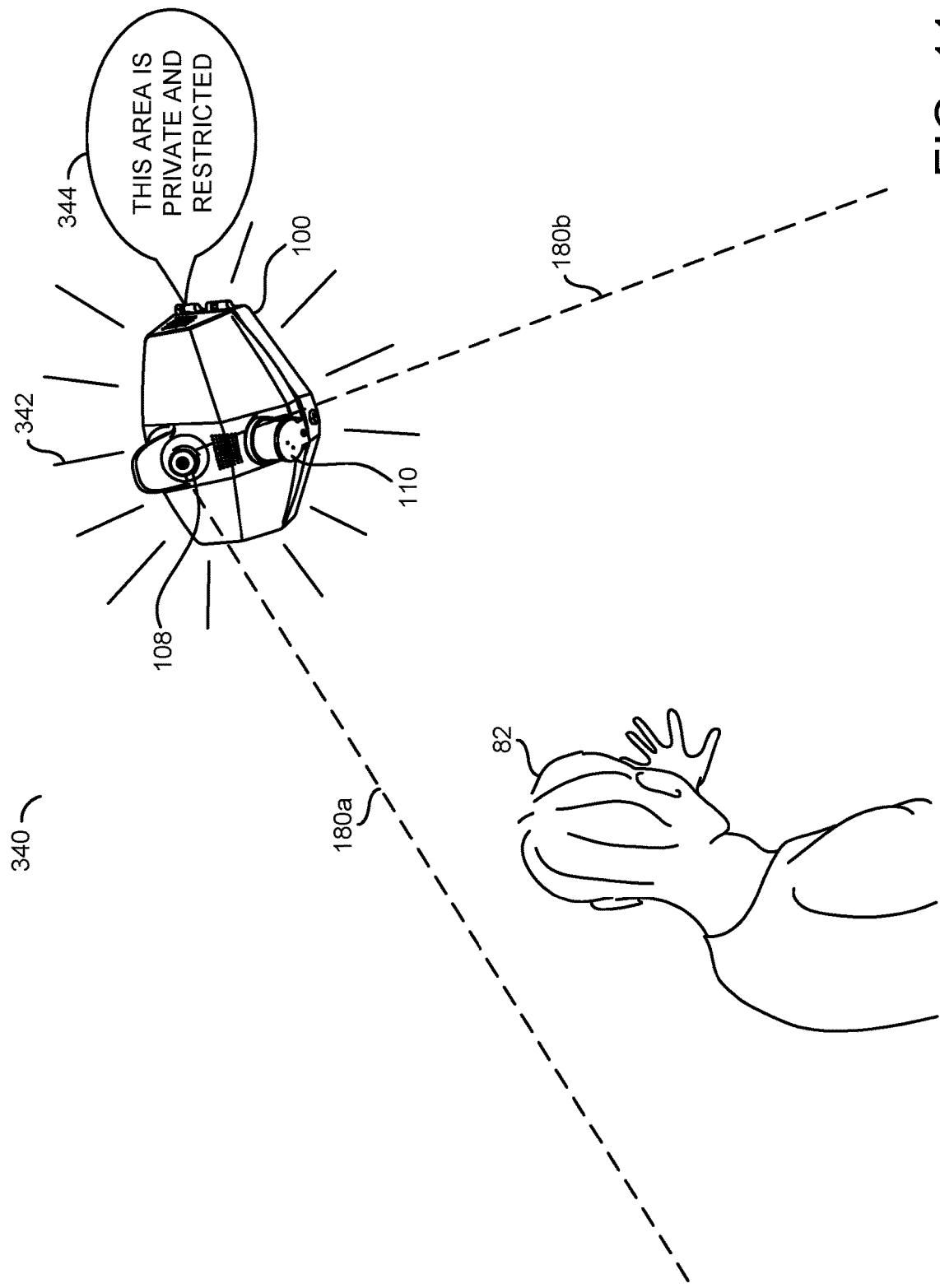
FIG. 11 is a diagram illustrating a high intensity light response to detecting an intruder in an area of interest.

Referring to FIG. 11, a diagram illustrating a high intensity light response to detecting an intruder in an area of interest is shown. An example scenario 340 is shown. In the example scenario 340, the apparatus 100 may be operating the light panels 130a-130d in the mode of operation that generates the colored light strobing effect. Lines 342 are shown. The lines 342 may represent the strobing colored lights configured to shine at the target 82 and/or provide a general indication that some type of event has been detected. The light 342 is generally shown from the perspective of the target 82.

The apparatus 100 may implement the moveable camera module 108. The movable camera module 108 may enable the field of view 180a-180b of the lens 118 to be adjusted. Adjusting the field of view 180a-180b of the capture device 108 may change the area of interest. In one example, the camera module 108 may be configured to be moved manually (e.g., adjusted by hand to be pointed at a particular area of interest). In another example, the camera module 108 may be configured to be moved automatically (e.g., pan, tilt and zoom according to a pre-defined pattern to cover different areas of interest). In yet another example, the camera module 108 may be configured to be moved remotely (e.g., pre-approved personnel may provide controls from a remote location that cause the camera module to pan, tilt and zoom).

The apparatus 100 may implement the PIR sensor 110. The PIR sensor 110 is shown at the bottom of the apparatus. The PIR sensor 110 may be stationary. The PIR sensor 110 may be configured to detect motion in a 360 degree range. For example, the PIR sensor 110 may monitor a larger area of interest than the field of view 180a-180b of the camera module 108. In an example, the PIR sensor 110 may be configured to detect intruders based on motion detection in blind spots of the camera module 108.

The apparatus 100 may comprise the integrated speakers 206. The integrated speakers 206 may be configured to playback pre-recorded audio and/or playback streamed audio input. In one example, security personnel may talk into one of the smartphones 310a-310n that implements the companion app for the apparatus 100. The companion app may stream the audio of the security personnel to the apparatus 100. The apparatus 100 may playback the audio from the security personnel using the integrated speakers 206. In another example, the apparatus 100 may store pre-recorded audio files in the memory 204. The apparatus 100 may intelligently select one or more of the pre-recorded audio files for playback.

A speech bubble 344 is shown. The speech bubble 344 may represent the audio generated by the integrated speakers 206. For example, in response to detecting an intruder (e.g., the target 82), an audio file may be selected to playback by the processor 200 and a voice recording may be played by the speakers 206. In the example shown, the audio 344 may comprise a voice recording of "This area is private and restricted". The pre-recorded audio files may comprise audio other than pre-recorded speech. For example, the integrated speakers 206 may playback an alarm sound. The audio processor 212 may be configured to generate other sounds (e.g., alarms, distorted voices of the streamed audio from the security personnel, dogs barking, police sirens, etc.).

The apparatus 100 may generate the high intensity light 342. The high intensity light 342 may be configured to flash to provide a strobe effect. In one example, the high intensity light 342 may output at 1000 lumens in various colors. The high intensity light 342 may be configured to surprise, scare and/or disorient the target 82. For example, the target 82 is shown attempting to cover his face and/or shield his eyes in response to the bright/strobing light. In one example, the high intensity light 342 may be a white light. In another example, the high intensity light 342 may be a red light. In yet another example, the high intensity light 342 may be a blue light. For example, the strobe effect may comprise alternating between red and blue light similar to police lights. The strobing lights 342 may provide a preventative and/or deterring effect by scaring and/or disorienting the target 82 and/or by alerting others (e.g., the flashing lights may provide a beacon effect).

Figure 12:
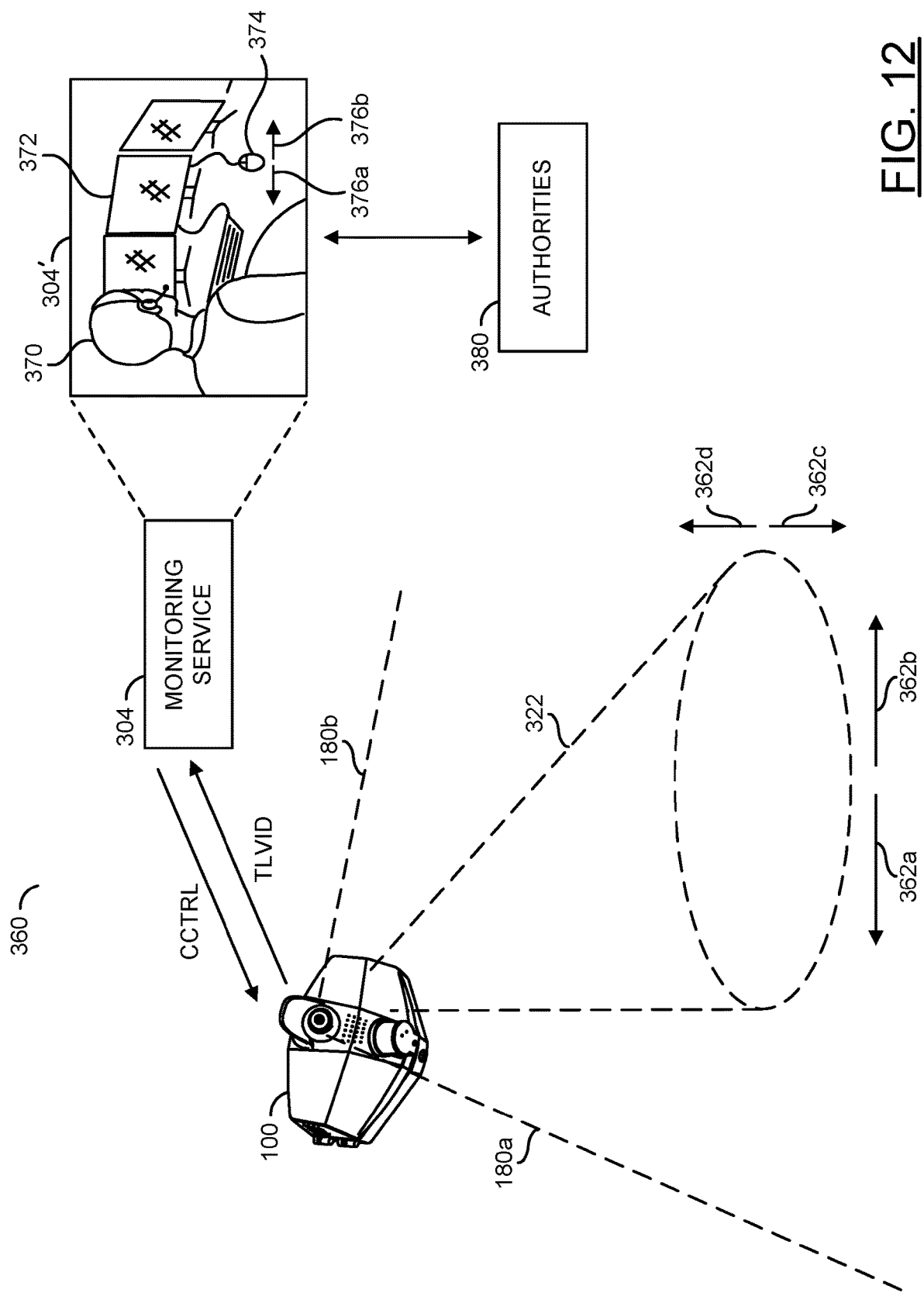
FIG. 12 is a diagram illustrating a security floodlight connected to a remote monitoring service.

Referring to FIG. 12, a diagram illustrating a security floodlight connected to a remote monitoring service is shown. A scenario 360 is shown. The scenario 360 may be representative of a portion of the system 300 shown in association with FIG. 9. The apparatus 100 is shown capturing the field of view 180a-180b. The apparatus 100 is shown operating in the mode of operation that generates the focused light beam 322.

Directional arrows 362a-362d are shown. The directional arrows 362a-362d may be an illustrative representation of the movement of the focused light beam 322. The movement 362a-362d of the focused light beam 322 may enable the apparatus 100 to adjust the location of the focused light beam 322. The movement 362a-362d of the focused light beam 322 may enable the apparatus 100 to track the intruder 82 using the focused light beam 322. The movement 362a-362d may be generated by the PT actuators 222a-222d adjusting the light panels 130a-130d. In one example, the movement 362a-362d may be performed intelligently (e.g., in response to the processor 200 detecting and tracking the movement of the target 82). In one example, the movement 362a-362d may be performed in response to input (e.g., input from a companion app, input received from the monitoring service 304, etc.). The range of the movement 362a-362d may be varied according to the design criteria of a particular implementation.

The apparatus 100 may be connected wirelessly to the third party monitoring service 304 (e.g., a security service). The apparatus 100 is shown providing the signal TLVID (e.g., one of the signals TLVID_A-TLVID_N shown in association with FIG. 9). The apparatus 100 is shown receiving a signal (e.g., CCTRL). For example, the signal CCTRL may comprise input controls for moving the capture device 108 and/or the focused light beam 322. The apparatus 100 and the monitoring service 304 may communicate other signals (e.g., audio messages for playback). The number, type and/or format of the signals communicated between the apparatus 100 and the monitoring service 304 may be varied according to the design criteria of a particular implementation.

An example view of the third party monitoring service 304' is shown. A service agent 370 is shown at the third party monitoring service 304'. Computer monitors 372 are shown and an input device 374 are shown with the service agent 370.

In one example, the wireless communication from the apparatus 100 may transmit the video frames generated by the apparatus 100 to the monitoring service 304. In one example, the video frames transmitted may be the lower resolution video frames. The video frames may be displayed on the computer monitors 372 to enable the service agent 370 to watch the field of view 180a-180b in near real-time (e.g., a live video stream with limited latency). The service agent 370 may provide real-time monitoring.

Directional arrows 376a-376b are shown. The directional arrows 376a-376b may represent input provided to the input device 374. In an example, the service agent 370 may provide the input 376a-376b. While the input device 374 is shown as a computer mouse, other types of input devices may be used to provide the input 376a-376b (e.g., keyboard input, voice commands, a joystick, a gamepad, virtual reality controls, etc.). The input 376a-376b may be communicated from the monitoring service 304 to the apparatus 100 as the signal CCTRL.

The service agent 370 may remotely control various features of the smart security floodlight 100 (e.g., manual control). For example, using the input device 374, the service agent 370 may move a location of the focused light beam 322. For example, the movement 362a-362d of the focused light beam 322 may correspond to the input 376a-376b provided by the service agent 370. In another example, the service agent 370 may move the camera module 108. For example, the input 376a-376b may cause the camera module to rotate, pan and/or tilt in order to adjust the field of view 180a-180b. In yet another example, the service agent 370 may access the deterrent tools of the apparatus 100 such as the 110 dB siren, the consumable actuators 214 and/or use two-way audio communication to speak to a visitor. The manual controls 376a-376b provided to the smart security floodlight 100 may be carried out by the monitoring service personnel 370. The monitoring service personnel 370 may interact with one or more of the security floodlights 100a-100n in the multi-device implementation 300.

A block 380 is shown. The block 380 may represent authorities (e.g., police services, fire and rescue services, ambulance services, etc.). The service agent 370 may be able to contact the authorities 380. For example, the service agent 370 may be able to view the video data received from the apparatus 100 on the monitors 372 to determine whether a situation has become serious enough to involve the authorities 380. For example, the computer vision detection and the manual monitoring by the monitoring service 304 may provide layers of false positive testing before the authorities 380 may be contacted. In one example, the deterrence features (e.g., the focused light beam 322, the strobe effect 342, the audio message 344, etc.) of the apparatus 100 may provide deterrence and/or preventative measures to encourage the target 82 to leave the area 80. If the deterrence and/or preventative measures of the apparatus 100 do not result in the target 82 leaving, the service agent 370 may intervene (e.g., manual control of the deterrence and/or preventative measures of the apparatus 100, providing two-way audio communication, etc.). If intervention by the service agent 370 does not result in the target 82 leaving, then the authorities 380 may be contacted. The criteria for escalating responses (e.g., from the apparatus 100, to the service agent 370 and then to the authorities 380) may be varied according to the design criteria of a particular implementation.

Figure 13:
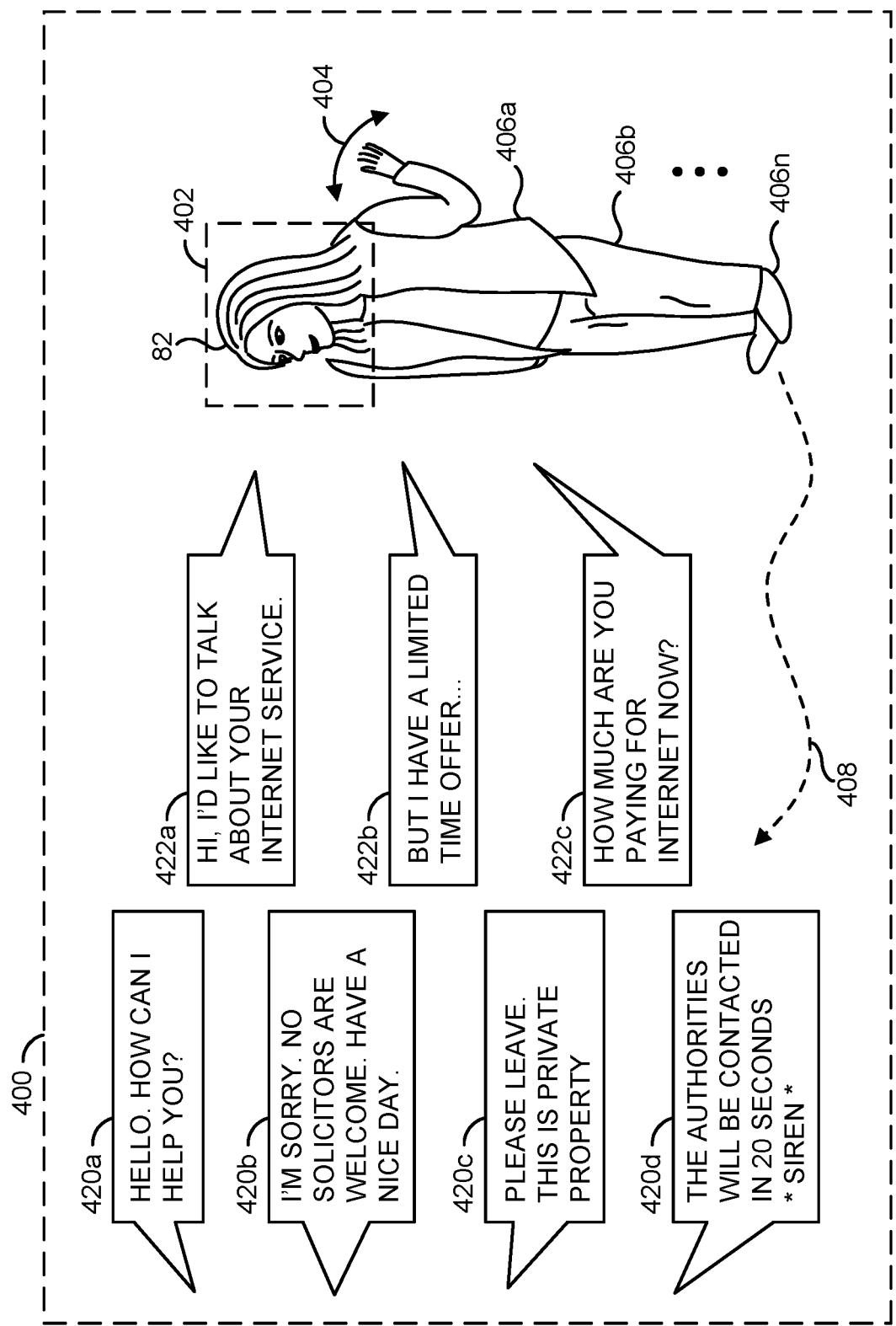
FIG. 13 is a diagram illustrating performing computer vision to detect an object and track the movement of an object.

Referring to FIG. 13, a diagram illustrating performing computer vision to detect an object and track the movement of an object is shown. An example video frame 400 is shown. The example video frame 400 may be an example video frame captured by one of the smart security floodlights 100a-100n. The example video frame 400 may be generated by the processor 200 from pixel data captured by the capture device 108 comprising the lens 118 and the image sensor 224. In an example, the video frame 400 may be shown as part of a video stream communicated to a companion app on the smartphones 310a-310n. In another example, the video frame 400 may be shown as part of a video stream communicated to the cloud computing resources 302 and/or the monitoring services 304.

The example video frame 400 may comprise the area 80 captured by the field of view 180a-180b. The example video frame 400 may be an example of the high resolution video frame and/or the low resolution video frame generated by the processor 200. In some embodiments, the example video frame 400 may be an example of a video frame stitched together from video frames captured by more than one of the smart security cameras 100a-100n.

The example video frame 400 may comprise a view of the target 82. A dotted box 402 is shown. The dotted box 402 may represent computer vision analysis performed by the processor 200 on the example video frame 400. The dotted box 402 is shown around the face of the target 82. However, the computer vision analysis (or computer vision operations) may be performed on all portions of the target 82 (e.g., face, body, feet, clothing, gestures, etc.).

A curved double-ended arrow 404 is shown. The arrow 404 may represent the movement of the hand of the target 82. The arrow 404 may represent gesture analysis performed as part of the computer vision analysis of the example video frame 400. While one example video frame 400 is shown, the computer vision analysis may be performed on a sequence of video frames (e.g., to capture gestures, track the location of the target 82 over time, determine the behavior of the target 82, etc.). The gesture analysis 404 may comprise tracking movement patterns of various body parts (e.g., hands, feet, head, fingers, etc.) to determine behavior and/or non-verbal communication. In the example shown, the gesture 404 detected may be the target 82 waving. The computer vision analysis may determine that the target 82 is making a friendly introduction.

In another example, the gesture detected may be the target 82 nodding his/her head. The nodding gesture may indicate a 'yes' response. Similarly, detecting a shaking head gesture may be detected as a 'no' response. The types of gestures detected and/or the inferences made in response to the detected gestures may be varied according to the design criteria of a particular implementation.

Characteristics 406a-406n of the target 82 are shown. The characteristics 406a-406n may be determined by the processor 200 in response to the computer vision analysis 402 performed on the example video frame 400. The characteristics 406a-406n may comprise descriptive and/or identifying attributes of the target 82. In the example shown, the characteristic 406a may represent a shirt worn (e.g., style of clothing (e.g., a jacket worn over a shirt), a color of the clothing, etc.). In the example shown, the characteristic 406b may represent pants worn (e.g., the color of the pants, whether pants or shorts are worn, brand of pants worn, etc.). The characteristics 406a-406n may comprise physical characteristics about the target 82. In an example, the characteristics 406a-406n may comprise a height, estimated weight, body type, hair color, skin color, gait, etc. The types of characteristics 406a-406n detected may be varied according to the design criteria of a particular implementation.

In some embodiments, the computer vision analysis of the example video frame 400 (and a sequence of video frames that includes video frame generated prior to and after the video frame 400) may be performed by the processor 200. The processor 200 may perform the computer vision analysis to generate results of the computer vision analysis (e.g., the object detection 402, the gesture detection 404, the detection of the characteristics 406a-406n, etc.) and use the results to make decisions. In some embodiments, the example video frame 400 (and a sequence of video frames that include video frames generated prior to and after the video frame 400) may be generated by the processor 200 and uploaded by the communications module 210 to the remote server 302. The remote server 302 may perform the computer vision analysis to generate the results of the computer vision analysis. The remote server 302 may communicate the results of the computer vision analysis to the apparatus 100, and the processor 200 may make decisions based on the results received.

A dotted line 408 is shown. The dotted line 408 may represent the movement of the target 82 over time. For example, the processor 200 may perform the computer vision analysis on the sequence of video frames that include the video frame 400 and video frames captured before and after the video frame 400. The processor 200 may determine a location of the target 82 in each video frame. Based on the location of the target in each video frame, the processor 200 may determine the location of the target 82 in the area 80. For example, the processor 200 may be configured to translate the location of the target 82 in the video frame 400 to a real-world location in the area 80. In some embodiments, the processor 200 may detect the location of the focused light beam 322 in the video frame 400 and provide the movement 362a-362d for the focused beam 322 to align the location of the focused beam 322 in the video frame 400 with the location 408 of the target 82 in the video frame 400.

The apparatus 100 may be configured to track the target 82 using the high intensity light beam 322. The apparatus 100 may adjust the location of the high intensity light beam 322 in response to the target movement 408. For example, the apparatus 100 may comprise an actuator that may be controlled by the processor 200 (e.g., the PT actuators 222a-222d) to direct and/or focus the light beam 322 on a particular location (e.g., on the target 82). In one example, the high intensity light beam 322 may be directed to track the target 82 based on the target movement 408 (e.g., the location of the intruder in the area of interest 80). In another example, the high intensity light beam 322 may be aimed to target a face of the target 82 (e.g., to blind and/or disorient the intruder, similar to police tactics). In some embodiments, the tracking 408 of the target 82 using the high intensity light beam 322 may be performed automatically by the apparatus 100 based on detecting the location of the intruder in response to computer vision operations performed on the video data. In some embodiments, the tracking of the intruder using the high intensity light may be performed manually (e.g., by remote control of the direction of the high intensity light using the input 376a-376b from the service personnel 370).

Speech bubbles 420a-420c are shown. Response speech bubbles 422a-422c from the target 82 are shown. The speech bubbles 420a-420d may represent reactions, deterrents and/or preventative measures generated by the smart security floodlight 100. In an example, the speech bubbles 420a-420d may represent audio messages presented by the integrated speakers 206. The audio messages 420a-420d and the responses 422a-422c may be represented visually on the example video frame 400 as a representative example. However, the audio messages 420a-420d and the responses 422a-422c may be audio only and not actually be visible in the video frame 400. In some embodiments, the processor 200 and/or the remote device 302 may be configured to transcribe (e.g., perform speech-to-text operations) the audio messages 420a-420d and the responses 422a-422c in order to display the audio messages 420a-420d and the responses 422a-422c as text on the video frame 400 and/or attach the audio messages 420a-420d and the responses 422a-422c as metadata with the video frame 400. While four audio 420a-420d are shown, the processor 200 may generate any number of audio messages (e.g., 420a-420n) to provide the conversational AI.

The processor 200 may analyze the results of the computer vision analysis 402 to select the audio messages 420a-420n. In the example shown, the processor 200 may determine that the target 82 is a friendly visitor. For example, the target 82 is shown waving (e.g., based on the gesture 404). In response to the non-threatening target 82, the audio message 420a may be output by the speaker 206. In the example shown, the audio message 420a may be a friendly introduction (e.g., "Hello, how can I help you?"). The audio message 420a may be selected in response to the determinations made about the target 82. In another example, if the target 82 appeared to be a burglar (e.g., wearing a ski mask, attempting to hide from the smart security floodlight 100, checking multiple entrances, etc.), then the audio message 420a may be selected to deter the target 82 (e.g., "Please leave or the police will be called").

The smart security floodlight 100 may monitor the response(s) 422a-422n of the target 82 to the audio messages 420a-420d. The response may be monitored to determine the reaction to perform. The response is shown as the audio response 422a (e.g., audio analysis). However, analysis of the response of the target 82 may further comprise continued computer vision analysis (e.g., the object detection 402, determining the behavior of the target 82, the characteristics 406a-406n, etc.), the PIR sensors 110, analysis of wireless signals, etc. Generally, criteria used to select additional audio messages 420a-420d and/or other deterrence methods (e.g., changing the mode of operation of the light panels 130a-130d, activating the consumables 214, etc.) may be selected similar to the criteria used to select the initial audio message 420a.

In the example shown, the response 422a may be a vocal response by the target 82 (e.g., "Hi. I'd like to talk about your internet service"). The processor 200 (or the remote server 302) may analyze the audio to determine the context of the response 422a. The processor 200 may determine that the speech response 422a corresponds to a solicitor. Other evidence may be analyzed (e.g., a name tag may be detected, a company logo, a clip board or electronic device, etc.). In the example shown, the processor 200 may classify the target 82 as a solicitor. Based on the classification, the processor 200 may determine the appropriate reaction. Preferences for the reactions may be defined using the companion app. In an example, an end user may want to talk to solicitors and the reaction may be to inform the target 82 to wait and the smart security floodlight 100 may notify the user (e.g., the property owner) to answer the door via the companion app on the smartphones 310a-310 (e.g., via the signals ALERT_A-ALERT_N). In another example, the user may set the preference to not be bothered by solicitors.

In the example shown, the reaction 420b may be a message that informs the target 82 to leave. Since the target 82 has been detected as non-threatening, the apparatus 100 may perform a polite reaction initially. In the example shown, the reaction 420b may be an audio message (e.g., a polite request such as "I'm sorry. No solicitors welcome. Have a nice day."). The apparatus 100 may monitor the response of the target 82 to the reaction 420b.

For example, if the target 82 complies with the reaction 420b (e.g., leaves the area 80) then no further reactions may be performed. In the example shown, the target 82 may provide an additional response 422b. The additional response 422b may be a continued sales pitch (e.g., "But I have a limited time offer").

The processor 200 may analyze the response 422b (e.g., using video analysis and/or audio analysis). The processor 200 may determine to escalate the next reaction. For example, the initial reaction 420b may have been a polite reaction, the escalated reaction 420c may be more direct (or stern). In the example shown, the escalated reaction 420c may be an order (e.g., a stern request such as "Please leave. This is private property."). For example, the apparatus 100 may be less polite by interrupting the response 422b.

The apparatus 100 may monitor the response of the target 82 to the reaction 420c. For example, if the target 82 complies with the reaction 420c (e.g., leaves the area 80) then no further reactions may be performed. In the example shown, the target 82 may provide an additional response 422c. The additional response 422c may be to ignore the reaction 420c and keep continuing the sales pitch (e.g., "How much are you paying for internet now?").

The processor 200 may analyze the response 422c (e.g., using video analysis and/or audio analysis). The processor 200 may determine to escalate the next reaction. For example, the escalated reaction 420c may have been less polite than the audio message 420b, so the next escalated reaction 420d may be a warning. In the example shown, the escalated reaction 420d may be a warning with an alarm (e.g., a statement that the authorities 380 have been, or may be, contacted such as, "The authorities will be contacted in 20 seconds" along with a siren sound).

The apparatus 100 may monitor the response of the target 82 to the reaction 420d. For example, if the target 82 complies with the reaction 420d (e.g., leaves the area 80) then no further reactions may be performed. Additional responses may be performed by the target 82 and additional reactions (e.g., additional audio messages) may be performed by the apparatus 100 based on the particular circumstances. In an example, other reactions may comprise adjusting the modes of operation of the light panels 130a-130d, activating the consumables 214, contacting the monitoring service 304 for intervention by an agent 370 and/or contacting the authorities 380.

In some embodiments, the conversational AI may be configured to provide a verbal description of the target 82 (e.g., to make sure that the target 82 knows they have been seen). The verbal description may be provided as one of the audio messages 420a-420n. The verbal description may be generated based on the detected characteristics 406a-406n (e.g., "Please be aware you are trespassing and your presence has been noted. We have reported to the police a 6 foot man wearing green jacket and gray pants.").

The conversational AI may continue to monitor the behavior of the target 82 and/or the context of the scenario. Continually monitoring the behavior of the target 82 (e.g., providing the audio messages 420a-420n and/or other deterrent measures and then monitoring how the target 82 responds) may enable the apparatus 100 to determine an effectiveness of the reactions (e.g., whether the target 82 has left the area 80 and has not returned.

Figure 14:
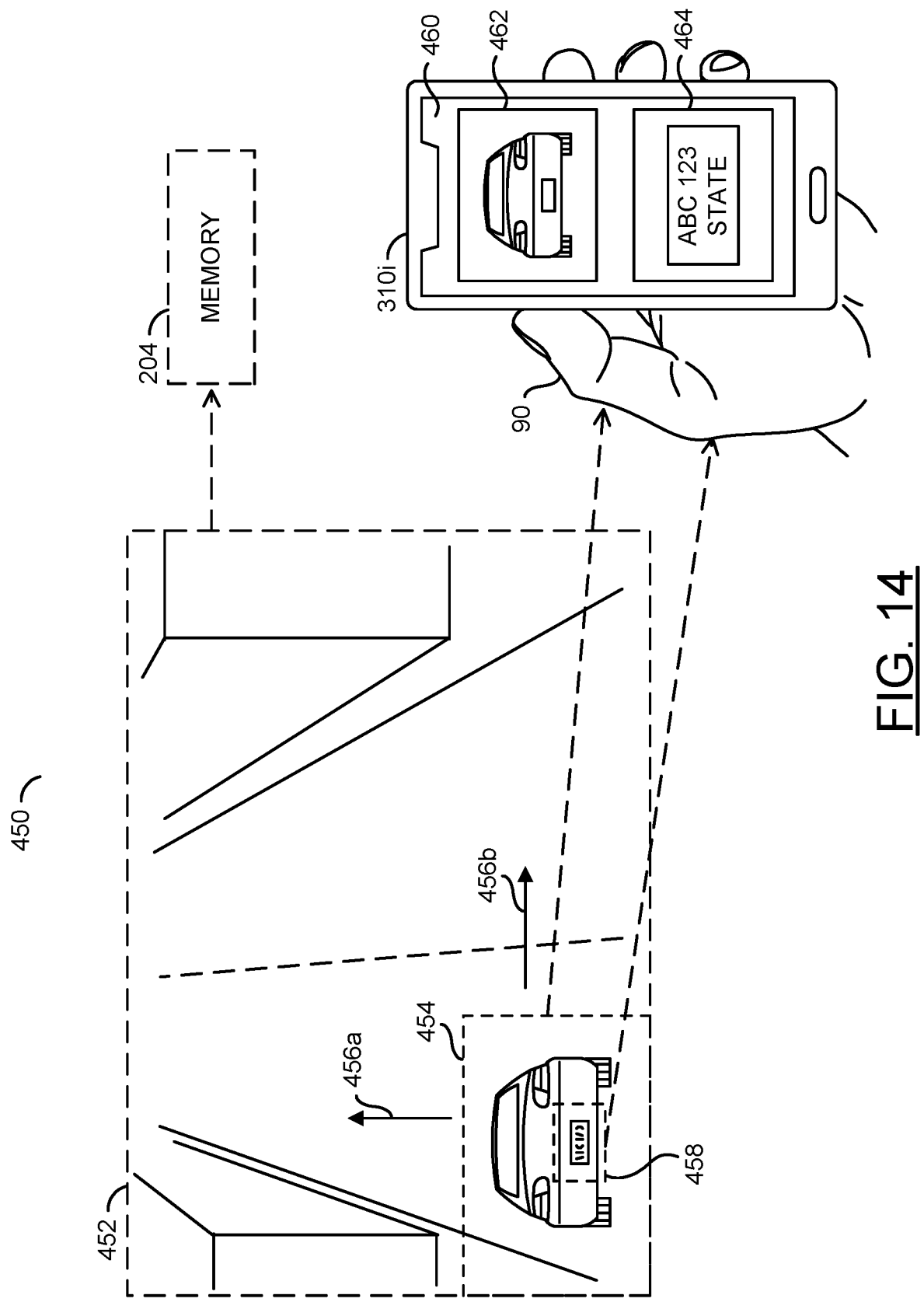
FIG. 14 is a diagram illustrating using video operations to capture a high resolution video frame, detect an object and communicate a lower resolution video frame to a user device.

Referring to FIG. 14, a diagram illustrating using video operations to capture a high resolution video frame, detect an object and communicate a lower resolution video frame to a user device is shown. An example high resolution video frame 452 is shown. The processor 200 may be configured to generate the high resolution video frames such as the video frame 452. For example, the high resolution video frame 452 may capture video data of the entire field of view 180a-180b of the capture device 108. The high resolution video frame 452 may be stored locally in the local storage module 204. For example, the high resolution video frame 452 may be a 4K (8 Mpixel) and/or 8K (32 Mpixel) video frame. The processor 200 may be configured to perform digital PTZ on the high resolution video frame 452.

A dotted box 454 is shown on the high resolution video frame 452. The dotted box 454 may represent object detection performed by the processor 200. The dotted box 454 may correspond to an object (e.g., a vehicle) detected in a bottom left corner of the high resolution video frame 452. The dotted box 454 may be a sub-region of the high resolution video frame 452.

Arrows 456a-456b are shown. The arrows 456a-456b may indicate that the sub-region 454 may be panned horizontally and/or vertically by the processor 200 (e.g., digital panning) to adjust the location of the sub-region 454. The processor 200 may provide further object detection within the sub-region 454. In the example shown, another dotted box 458 is shown within the sub-region 454. The dotted box 458 may represent the object detection performed by the processor 200. The object detection 458 may comprise the detection of a license plate on the detected vehicle 454. The processor 200 may be further configured to perform optical character recognition (OCR) on the detected license plate 458.

Capturing 4K or higher resolution video 452 may provide sufficient details for the video processor 200 to enable detection of various objects (e.g., faces and/or license plates). However, 4K video frames or higher may be too much data to upload to Internet 60 (e.g., wireless bandwidth may be limited) while providing a live and/or real-time video stream. Since the 4K or higher video may be needed for zoomed details for the video processor 200 to detect, the video processor 200 may be configured to crop a portion of the high resolution video 452 frame to create a low resolution video frame. The lower resolution video frames may be uploaded using the communication device 210.

The smartphone 310i is shown. The smartphone 310i may be held by an end user 90. A companion app 460 is shown displayed on the smartphone 310i. The companion app 460 may be configured to communicate with the apparatus 100 via an application programming interface provided by the apparatus 100. The companion app 460 may be configured to enable the end user 90 to communicate instructions and/or commands to the apparatus 100 (e.g., select one of the modes of operations of the light panels 130a-130d, playback audio spoken into the smartphone 310i to provide two-way communication in real-time, activate one or more of the consumables 214, control a movement of the focused light beam 322, etc.). The companion app 460 may be configured to receive data from the apparatus 100. For example, the companion app 460 may receive the data from the apparatus 100 and format the data into a human viewable format.

The companion app 460 is shown displaying a video frame 462 and a video frame 464. The video frame 462 and the video frame 464 may each be a lower resolution video frame. For example, the processor 200 may be configured to digitally crop the sub-region 454 to generate the lower resolution video frame 462 and communicate the lower resolution video frame 462 for display on the companion app 460. Similarly, the processor 200 may be configured to digitally crop the sub-region 458 to generate the lower resolution video frame 464 and communicate the lower resolution video frame 464 for display on the companion app 460.

For example, the zoomed details of the sub-region 454 and/or the sub-region 458 may be displayed at a lower resolution such as 480 P (e.g., 24× zoom). In another example, a lower resolution such as 720 P may provide an un-zoomed view displayed for navigation to perform PTZ by AI and/or provide feedback for human control. In the example shown, the cropped lower resolution video frame 462 of the detected vehicle and the cropped lower resolution video frame 464 of the detected license plate are shown communicated wirelessly to the smartphone 310i.

The high resolution video frame 452 may provide information for the video processor 200 to use to perform real-time object detection. The high resolution video frame 452 may be stored locally in the memory 204. In one example, the high resolution video frame 452 may be stored locally for generating an intelligent time lapse video. In an example, the high resolution video frame 204 may be communicated to the cloud computing resources 302 for long-term storage at a low priority (e.g., not communicated in real-time to conserve bandwidth). The full 4K (or 8K) video frame 452 may be stored locally (e.g., for a time-lapse video). The full video frame 452 may be uploaded during off-hours. Generally, there may not be enough bandwidth to live stream 4K video or above.

The cropped lower resolution video frames 462-464 may be communicated to enable real-time remote monitoring. While the lower resolution video frames 462-464 are shown communicated to the smartphone 310i, the lower resolution video frames 462-464 may be also communicated to the monitoring service 304 for manual review. The lower resolution (720P) full frames 462-464 may be provided as a live stream to the mobile device 310i and/or a monitoring station 304 and provide navigation to zoom. The zoomed video frame 464 (e.g., 480P at 24× digital zoom from 4K) may show a license plate and may be live streamed to a mobile device 310i and/or monitoring station 304.

Figure 15:
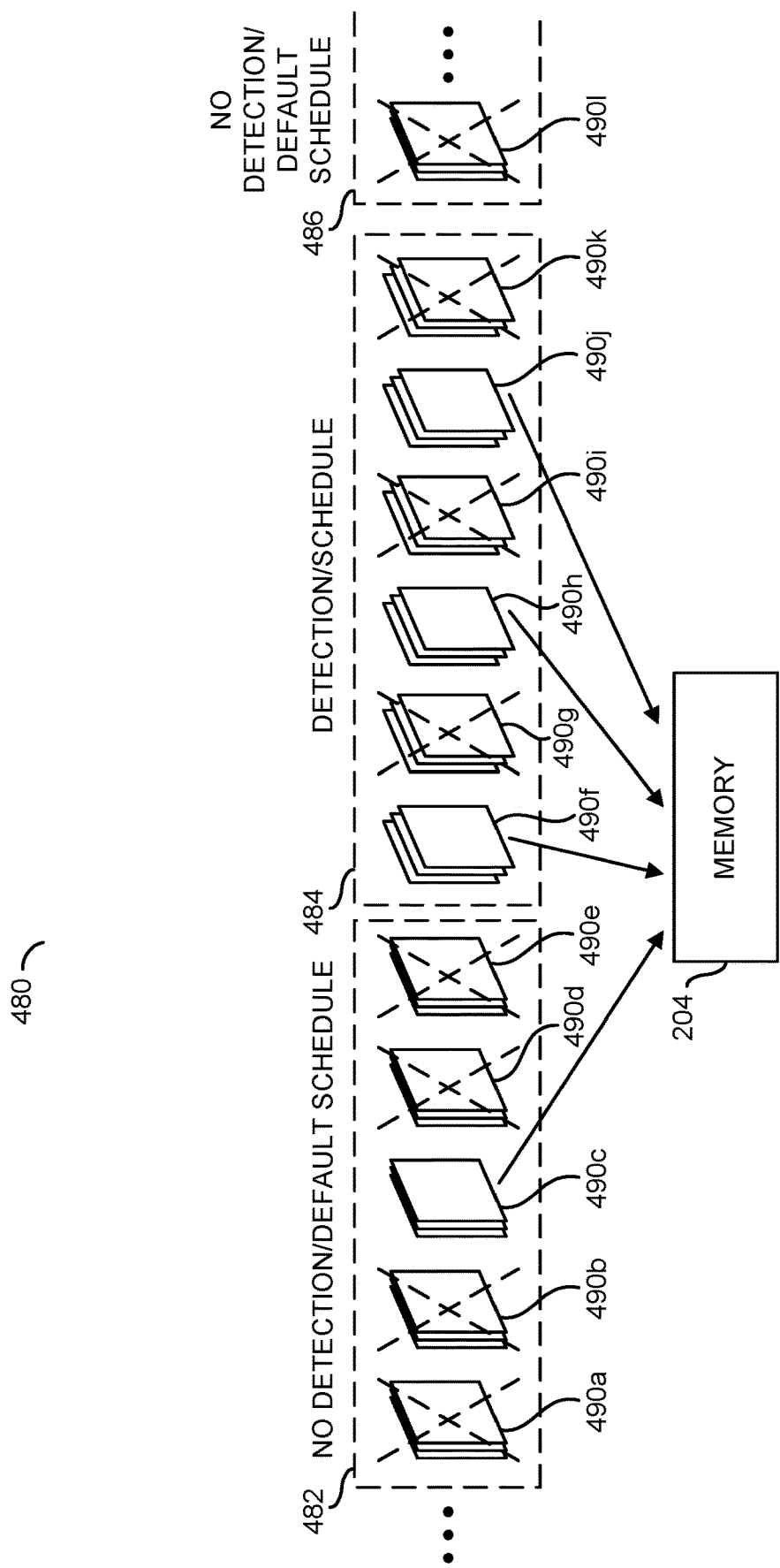
FIG. 15 is a diagram illustrating a smart time-lapse feature of the security floodlight.

Referring to FIG. 15, a diagram illustrating a smart time-lapse feature of the security floodlight is shown. A representation 480 of captured video frames for a time-lapse video is shown. Blocks of time 482-486 are shown. The block of time 482 may represent a time (e.g., a range of hours, a range of days, a range of minutes, etc.) that the processor 200 is configured to operate with no detection and/or according to a default schedule for communicating video frames. The block of time 484 may represent a time that the processor 200 is configured to operate with detection and/or according to a schedule for communicating video frames. Similar to the block of time 482, the block of time 486 may represent a time that the processor 200 is configured to operate with no detection and/or according to a default schedule for communicating video frames. The memory 204 may store various schedules for selecting modes of operation of the processor 200 (e.g., schedules for performing various types of deterrence methods, schedules for generating time lapse videos, schedules for detecting loiterers, etc.).

Sequences of video frames 490a-490l are shown. The sequences of video frames 490a-490l may be video frames generated by the processor 200. In the example shown, the video frames 490a-490e may be in the block of time 482. The video frames 490a-490e may be captured by the camera 108 during a default operating schedule (or a time when no object has been detected by the video analysis performed by the processor 200). In the example shown, the video frames 490f-490 k may be in the block of time 484. The video frames 490f-490 k may be captured by the camera 108 during a time when the recording schedule has changed and/or when an object (e.g., the target 82) has been detected by the processor 200. The video frames 490l may be in the block of time 486, in which the apparatus 100 may operate similar to the operation in the block of time 482.

Time-lapse videos may be a popular feature for security devices. For example, time-lapse videos are popular in the construction (e.g., to show how a structure has been built over time) and/or for weather reports. The smart security floodlight 100 may be configured to generate a time-lapse video at maximum resolution (e.g., using the high resolution video frames similar to the high resolution video frame 452). The high resolution video frames may be stored locally in the memory 204. Since the time-lapse video comprises a small sample of the total amount of video frames captured, the high resolution video frames may be transmitted (e.g., at night during when data transmission is generally lower). The time-lapse video may be useful in security video to find suspicious activities not captured by short video, such as intruders casing a property at daytime, and then returning to intrude at nighttime.

For example, for a time-lapse video one video frame from a group of video frames may be stored at particular time intervals (e.g., one video frame is stored at a frame rate of one video frame per minute, one video frame per hour, one video frame per day, etc.). For example, when an object is detected (or a schedule for uploading video frames changes), the frame rate for storing the video frames may be increased. For example, when an interesting object is detected, more video frames may be stored by the memory 204. After the object is no longer detected (or the schedule changes again), another frame rate may be selected (e.g., back to default, in the example shown).

To reduce the amount of data to be transmitted and/or stored, the video processor 200 may be configured to capture the time-lapse video data at varying rates. For example, frame rate selection may be adjusted on a schedule (e.g., hourly based on user knowledge of expected activities such as higher frame rates during business hours when more people will be at the property and lower frame rates when the business is closed). The video processor 200 may further enable resolution selection, up to the highest available. In some embodiments, the object detection implemented by the video processor 200 may be configured to remove uninteresting video frames (e.g., no objects detected) and/or alter the frame rate for the time-lapse video.

For example, without object detection a time-lapse video may be 1 frame per minute for 24 hours (e.g., 24×60=34,560 frames) with a playback at 15 fps in 38 minutes for one day of video. The intelligent time-lapse implemented by the smart security floodlight 100 may adjust the rate of video frame storage based on object/motion detection. For example, when there is nothing detected 1 frame per 5 minutes of video may be stored, then when something interesting is detected 1 frame per 0.5 seconds may be stored. For 24 hours of coverage the intelligent time-lapse video may be about 8 minutes playback (e.g., with nothing detected) to approximately 20 minutes of playback with about 90 minutes of motion content.

In some embodiments, the intelligent time-lapse video may adjust the frame rate based on a schedule. Each scheduled time slot for the intelligent time-lapse video may specify a video frame rate (e.g., the rate that the frames are being stored). In one example, the time slots may be hourly. For example, from 1am to 2 am the frame rate may be 1 frame per minute. Then from 2 am to 3 am the frame rate may be 1 frame per every five minutes. The scheduled frame rate and/or the time slot for the scheduled frame rate may be varied according to the design criteria of a particular implementation. The scheduled frame rates may be combined with the object detection (e.g., detecting an object during one of the time slots may alter the frame rate temporarily).

In the example shown, during the time block 482 when the processor 200 is using the default schedule (or no object has been detected), then fewer video frames may be stored by the memory 204. In the example shown, the group of video frames 490c are stored, but the video frames 490a-490b and the video frames 490d-490e are not stored. The schedule may change for the time block 484. For example, the time block 484 may correspond to business hours and/or when an object has been detected. More video frames may be stored by the memory 204 during the time block 484. In the example shown, the groups of video frames 490f, 490h and 490j may be stored, and the video frames 490g, 490i and 490k may not be stored.

The time lapse video may provide a sped up version of the video frames 490a-490l. The time lapse video may not comprise all the video data generated by the processor 200. The time lapse video may provide a general overview of the content in the captured video frames. In some embodiments, the time lapse video may be communicated to the cloud computing resources 302. The cloud computing resources 302 may analyze the time lapse video to confirm an operating status of the apparatus 100. For example, by analyzing the time lapse video, the cloud computing resources 302 may detect all black frames, which may indicate that the lens 118 has been tampered with.

Figure 16:
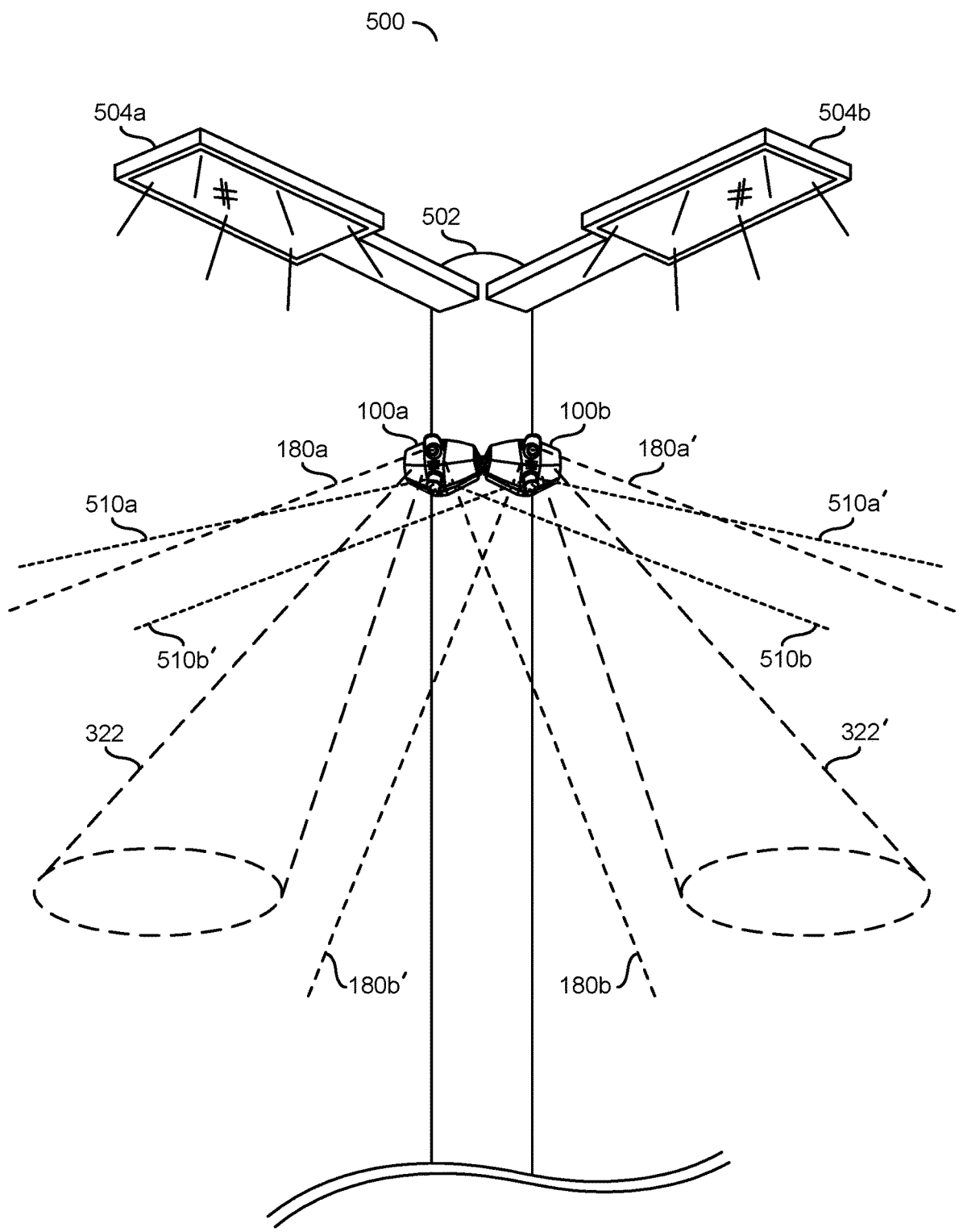
FIG. 16 is a diagram illustrating multiple security floodlights mounted to a lamp post.

Referring to FIG. 16, a diagram illustrating multiple security floodlights mounted to a lamp post is shown. A scenario 500 is shown. The scenario 500 may comprise a lamp post 502 and multiple smart security devices 100a-100b. The lamp post 502 may provide an elevated position to enable the smart security floodlights 100a-100b to capture an area below the level of the smart security floodlights 100a-100b. In one example, the surfaces (or diameter) of the lamp post 502 may be 10 inches wide and the smart security floodlights 100a-100b may be 16 inches wide. The perspective of the scenario 500 may show two of the smart security floodlights 100a-100b. However, more smart security floodlights 100a-100n may be located on each surface (e.g., four for a square lamp post) of the lamp post 502.

Lights 504a-504b are shown attached to the lamp post 502. The lights 504a-504b may provide illumination (e.g., for a parking lot). The lights 504a-504b may supplement the lighting provided by the smart security floodlights 100a-100b. In some embodiments, the lights 504a-504b may be motion activated, while the illumination provided by the smart security floodlights 100a-100b may be always on. In an example, the lens hood 114 may be configured to block the stray light emitted by the lights 504a-504b from causing glare in the video frames captured by the capture devices 108 of the smart security floodlights 100a-100b.

The field of view 180a-180b of the apparatus 100a is shown. The field of view 180a'-180b' of the apparatus 100b is shown. The focused light beam 322 of the apparatus 100 is shown. The focused light beam 322' of the apparatus 100b is shown. Dotted lines 510a-510b are shown extending from the apparatus 100a. The dotted lines 510a-510b may represent the field of view of the PIR sensor 110 of the apparatus 100a. Dotted lines 510a'-510b' are shown extending from the apparatus 100b. The dotted lines 510a'-510b' may represent the field of view of the PIR sensor 110 of the apparatus 100b. Generally, the field of view 510a-510b of the PIR sensor 110 may be wired than the field of view 180a-180b of the camera module 108.

The light panels 130a-130d may implement panoramic lighting with strobe light 342 and/or the focused light beam 322. For example, the illumination provided by the light panels 130a-130d may provide 180 degree illumination from left to right and 90 degree illumination from front to bottom. In one example, the lighting may be an equivalent illumination of a 20 Watt incandescent light bulb or higher. The light panels 130a-130d may provide an array of LEDs for general lighting with dimmer control and capable of luminance of a strobe light that may have significantly more than general lighting (e.g., over 1,500 Lumens). The lighting may have RGB color control to mimic a police siren.

The cameras 108 may have a wide angle view in the horizontal direction. For example, the horizontal FOV 180a-180b may be approximately 120 degrees to 160 degrees for each of the smart security floodlights 100a-100n. The PIR sensor 110 may be configured to tilt down by approximately 20 degrees. The PIR sensor 110 may provide 270 degree coverage. Since the PIR sensor 110 provides approximately 270 degrees of coverage, the PIR sensor 110 may be implemented as a stationary module (e.g., no need to rotate left/right or tilt up/down).

Figure 17:
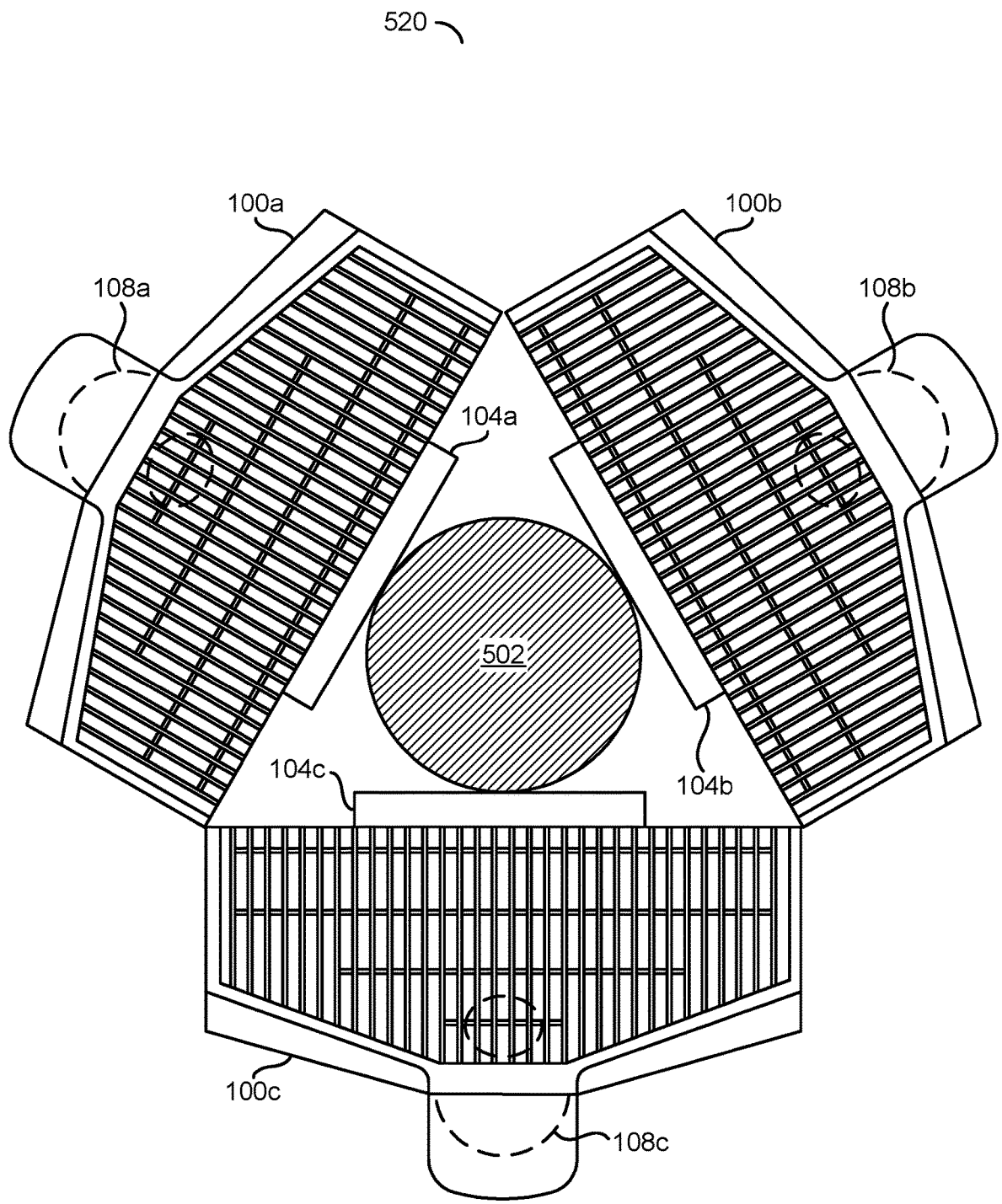
FIG. 17 is a diagram illustrating a top down view of multiple security floodlights mounted to a lamp post.

Referring to FIG. 17, a diagram illustrating a top down view of multiple security floodlights mounted to a lamp post is shown. A scenario 520 is shown comprising smart security lights 100a-100c mounted to the lamp post 502. Mounting the smart security floodlights 100a-100c on each surface of the lamp post 502 may ensure a full 360 degree view of an area is captured in the video frames.

In the example shown, the lamp post 502 may be a circular shape and three of the smart security floodlights 100a-100c are shown attached to the lamp post 502. The camera 108a of the apparatus 100a may capture a field of view on one direction, the camera 108b of the apparatus 100b may capture a field of view in another direction and the camera 108c of the apparatus 100c may capture a field of view in yet another direction to provide a full 360 degree field of view around the lamp post 502. The back panels 104a-104c may be extended to enable the smart security floodlights 100a-100c to reach the lamp post 502 for mounting, while providing sufficient space for the smart security floodlights 100a-100c to attach to the lamp post 502 without interfering with the space for the other smart security floodlights 100a-100c.

Figure 18:
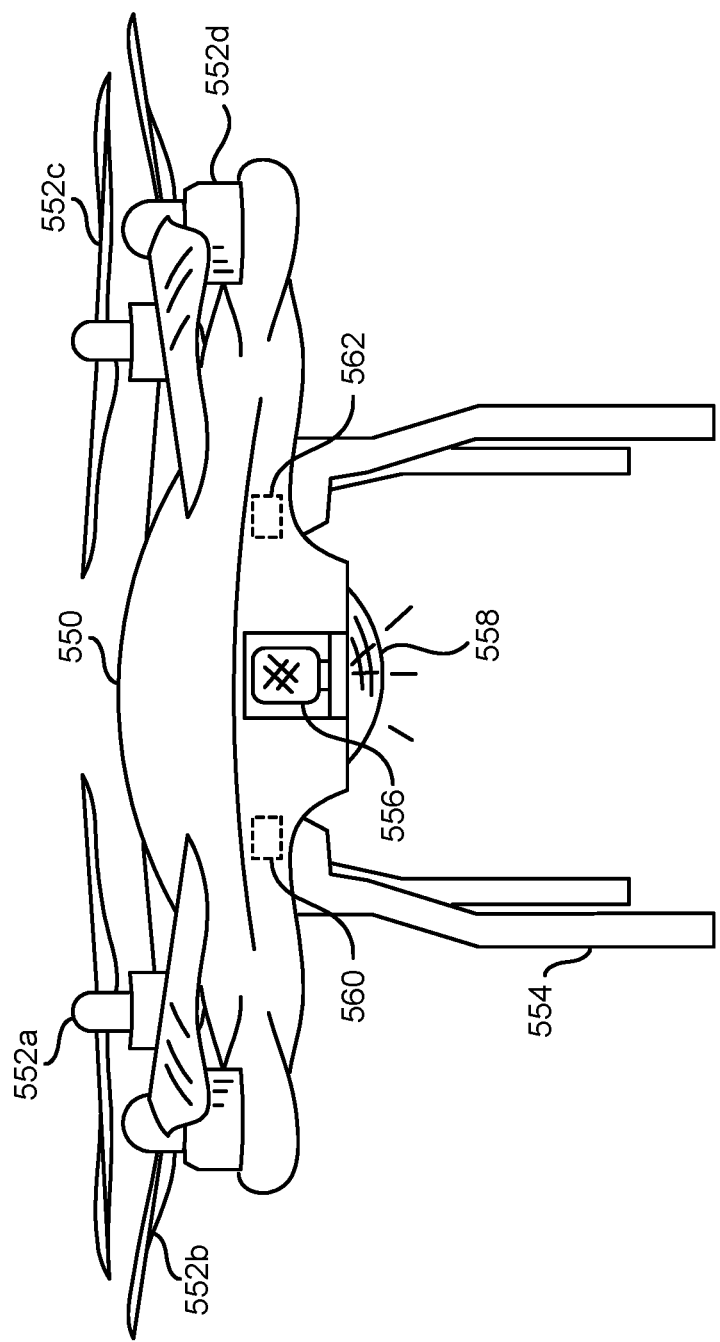
FIG. 18 is a diagram illustrating a drone device controllable by the security floodlight.

Referring to FIG. 18, a diagram illustrating a drone device controllable by the security floodlight is shown. A drone (e.g., an unmanned aerial vehicle) 550 is shown. In some embodiments, the smart security floodlight 100 may be configured to control the UAV drone 550. The drone 550 may be implemented as part of the system 300 to supplement the features of the smart security floodlights 100a-100n. For example, while the camera modules 108 of the smart security floodlights 100a-100n may be configured to adjust the field of view 180a-180b, the smart security floodlights 100a-100n may be stationary devices (e.g., mounted to the wall 50), which may limit the range of the field of view 180a-180b. The drone 550 may supplement the smart security floodlights 100a-100n by providing mobility.

The drone 550 may comprise propellers 552a-552d. The propellers 552a-552d may be configured to enable movement of the drone 550. For example, the propellers 552a-552d may provide lift for the drone 550 to enable the drone 550 to hover at a particular altitude and/or location. The propellers 552a-552d may enable the drone 550 to move from location to location. In an example, the propellers 552a-552d may enable the drone 550 to fly to one or more of the smart security floodlights 100a-100n and/or enable the drone 550 to follow the target 82 when the target 82 leaves the field of view 180a-180b of one or more of the smart security floodlights 100a-100n.

The drone 550 may comprise landing gear 554. The landing gear 554 may enable the drone 550 to dock and/or remain idle when not in use. In some embodiments, the drone 550 may be configured to use the landing gear 554 to dock on the smart security floodlights 100a-100n. For example, the smart security floodlights 100a-100n may provide a landing platform for the drone 550 and/or provide a port to recharge a battery of the drone 550.

The drone 550 may comprise a mobile camera 556 and/or a light 558. The mobile camera 556 may enable the drone 550 to capture video frames. In an example, since the drone 550 is mobile, the mobile camera 550 may be configured to capture video data of areas that are out of the field of view 180a-180b of the smart security floodlights 100a-100n. The light 558 may provide illumination. The illumination generated by the light 558 may provide lighting to enable the mobile camera 556 to capture video frames. The illumination generated by the light 558 may enable the drone 550 to provide a spotlight on the target 82.

The drone 550 may comprise a block (or circuit) 560 and/or a block (or circuit) 562. The circuit 560 may be a processor, a microcontroller, a system-on-chip (SoC), etc. The circuit 562 may comprise a wireless communication device. The drone 550 may comprise other components (not shown). The number, type and/or arrangement of the components of the drone 550 may be varied according to the design criteria of a particular implementation.

The SoC 560 may be configured to control the components of the drone 550. For example, the SoC 560 may be configured to control the propellers 552a-552d to provide a flight path for the drone 550. The SoC 560 may be configured to generate video frames from data generated by the mobile camera 556. The SoC 560 may be configured to control an activation and/or brightness of the light 558. The SoC 560 may be configured to execute computer readable instructions. For example, the computer readable instructions executed by the SoC 560 may be configured to implement obstacle avoidance and/or autonomous flight. For example, the drone 550 may not need to implement real-time controls. The autonomous flight implemented by the SoC 560 may enable the drone 550 to operate without crashing and/or comply with regulations (e.g., FAA regulations).

The wireless communication device 562 may be configured to communicate with one or more of the smart security floodlights 100a-100n. In an example, the wireless communication device 562 may be configured to implement a Wi-Fi communication with the communication device 210. The wireless communication device 562 may be configured to communicate video frames generated by the SoC 560 to the smart security floodlights 100a-100n. The wireless communication device 562 may be configured to receive commands communicated by the smart security devices 100a-100n.

The drone 550 may communicate data to/from the smart security devices 100a-100n. The smart security devices 100a-100n may communicate (e.g., forward, relay, etc.) the data from the drone 550 to the central monitoring service 304. The central monitoring service 304 may provide commands to the drone 550 via the smart security devices 100a-100n. For example, the security personnel 370 may provide a command for the drone 550 to the smart security devices 100a-100n, and the smart security devices 100a-100n may communicate (e.g., forward, relay, etc.) the command from the central monitoring service 304 to the drone 550. In some embodiments, the smart security devices 100a-100n may operate as a communications tether for the drone 550.

In some embodiments, the smart security floodlights 100a-100n may provide authorization for the security personnel 370 to send commands to the drone 550. For example, the drone 550 may not execute commands that have not been received from the smart security floodlights 100a-100n. The smart security floodlights 100a-100n may provide an authorization and/or authentication of commands received and sent to the drone 550.

The smart security floodlights 100a-100n may operate as an intermediary remote controller for the drone 550. In some embodiments, the commands received and/or authenticated by the smart security floodlights 100a-100n may be sent by the remote monitoring service 304. In some embodiments, the commands received and/or authenticated by the smart security floodlights 100a-100n may be sent by the cloud computing resources 302. In an example, the smart security floodlights 100a-100n may communicate the video data from the drone 550 to the cloud computing resources 302, and the cloud computing resources 302 may perform the computer vision analysis on the video frames from the drone 550 to determine which commands to issue. In an example, the commands issued by the cloud computing resources 302 and/or the remote monitoring service 304 may comprise initiating the launch of the drone 550, returning to the docking station, recording video, generating a voice down command, generating a bright light and/or generating a strobe light effect.

The drone 550 may be configured to avoid obstacles, fly to a location of one of the smart security floodlights 100a-100n and/or return to the docking station without being controlled manually. The commands may provide manual control. In an example, the manual control may initiate the launch of the drone 550. Generally, the security personnel 370 may verify an issue by viewing the video data generated by the smart security devices 100a-100n. After the issue has been verified, the security personnel 370 may issue the command to launch the drone to the location where the issue was identified (e.g., the location of the smart security floodlights 100a-100n that detected the target 82).

In an example, the smart security floodlights 100a-100n may be configured to use a wireless connection (e.g., Wi-Fi with a latency range of approximately 0.1 seconds to 10 seconds) to provide control instructions to the drone 550. The security personnel 370 may be capable of connecting with the drone 550 via the smart security floodlights 100a-100n. The drone 550 may be configured to stream the video frames captured by the mobile camera 556 to the central monitoring service 304 via the smart security floodlights 100a-100n. For example, the video streamed from the drone 550 may be viewable on the computer monitors 372 via the signal TLVID. In some embodiments, the central monitoring service 304 may be located relatively close to the smart security floodlights 100a-100n (e.g., in the same city). In some embodiments, the central monitoring service 304 may be located very far from the smart security floodlights 100a-100n (e.g., in another country, on another continent, etc.).

Generally, the controls communicated by the central monitoring service 304 may not comprise real-time maneuvering. The drone 550 may fly autonomously and avoid obstacles. In an example, the drone 550 may implement an autonomous camera drone. The non-real-time commands that may be received by the drone 550 and executed by the SoC 560 may comprise instructions that may be performed despite the latency inherent to the wireless and/or long-distance communication (e.g., when there is at approximately a latency of 0.1 seconds to 10 seconds). In an example, the commands may comprise: launching the drone 550 (e.g., to verify the target 82 detected by the smart security cameras 100a-100n in order to prevent false alarms), fly to a particular one of the smart security floodlights 100a-100n (e.g., indicate which of the smart security floodlights 100a-100n that the target 82 is closest to so that the drone 550 may help pinpoint the location of the target 82), change the target 82, confirm the target 82, return home (e.g., land at the docking location), take a high resolution image using the mobile camera 556, start video recording using the mobile camera 556, stop video recording, generate audio (e.g., make a loud announcement if a speaker is implemented), etc.

The drone 550 may implement an effective deterrent feature to supplement the deterrence and/or preventative features of the smart security floodlights 100a-100n. The drone 550 may be configured to hover around the target 82, direct the mobile camera 556 at the target 82, flash the light 558, generate audio alerts, etc. The drone camera 556 may capture pictures of objects of interests such as faces, license plates, etc. The drone camera 556 may track the target 82 within a limited range (e.g., a safe area where returning to the docking station is possible). In some embodiments, the drone 550 may be configured to note GPS co-ordinates. By following the target 82, the drone camera 556 may capture a close-up picture of a face of the target 82 and/or read a license plate of a getaway car.

In some embodiments, the smart security floodlights 100a-100n may provide a landing pad for the drone 550. The landing pad may be fenced to protect the drone 550. The landing pad may further provide a charging station to provide power to the drone 550. In some embodiments, the landing pad may be implemented on a flat rooftop of the property (e.g., on top of a large commercial building). The landing pad may provide a waterproof station for charging and/or housing the drone 550.

The professional central monitoring personnel 370 may decide an appropriate time to launch the drone 550 for intelligent mobile deterrence. The security personnel 370 may launch the drone based on video verification of the target 82 and/or initial voice engagement with target 82 performed by the smart security floodlights 100a-100n. One purpose for using the security personnel 370 to launch the drone 550 may be to mitigate FAA regulator concerns and/or concerns of neighbors of autonomous decisions to launch a flying device.

The drone 550 may operate with remote manual control by issuing commands over the Internet connection 60 with noticeable latency, instead of autonomous flying. Maneuvering of the drone 550 may be limited by internet response time. The drone 550 may operate autonomously akin to the Level 3 Autonomous driving protocol. For example, the Level 4 autonomous driving may not be necessary for intelligent mobile deterrence (e.g., higher cost with diminishing returns on effective deterrence).

The smart security floodlight 100 may operate as the remote controller for the drone 550. The smart security floodlight 100 may operate the drone 550 in response to commands received through the Internet 60 from the central monitoring center 304. The smart security floodlight 100 may provide near real time (e.g., approximately 1 second of latency) remote controls to the drone 550 (e.g., by relaying commands received from the central monitoring center 304). The communication from the smart security floodlight 100 to the drone 550 may be implementing using a Wi-Fi connection. The commands may be issued from a remote location (e.g., the security personnel 370 issuing the commands does not need to be on-site with the apparatus 100 and/or the drone 550). The security personnel 370 may determine whether to launch the drone 550 based on the audio and/or video provided by the apparatus 100. For example, the audio and/or video verification by the security personnel 370 may comprise determining whether the target 82 is actually an intruder (e.g., as opposed to a regular visitor). The verification may be performed at a different site and/or in a different country.

In some embodiments, the SoC 560 may be configured to modulate the motor RPMs of the propellers 552a-552d at audio rates to serve also as lightweight audio transducers. Generally, modulating the propellers 552a-552d may perform better with lightweight (e.g., under 250 g) drones with smaller diameter propellers 552a-552d. In an example, when Blade Passing Frequency (BPF) is equal to 2 or 4 blades times the RPM divided 60 covers at least the fundamental vocal frequency range from 85 to 250 Hz. The RPM of the propellers 552a-552d may be at least 85 to 250 Hz times divided by 2 or 4 blades may equal 1200 to 7500 RPM (e.g., the range of typical hovering RPMs for drones). A combination of several different propeller diameters could serve as "woofer" and "tweeter" transducers to cover more of the vocal audio range (e.g., up to approximately 3 kHz). Using the propellers 552a-552d as lightweight audio transducers may reduce the total mass of the drone 550 (e.g., speakers have heavy permanent magnets which greatly increase drone weight and limit flying time).

Figure 19:
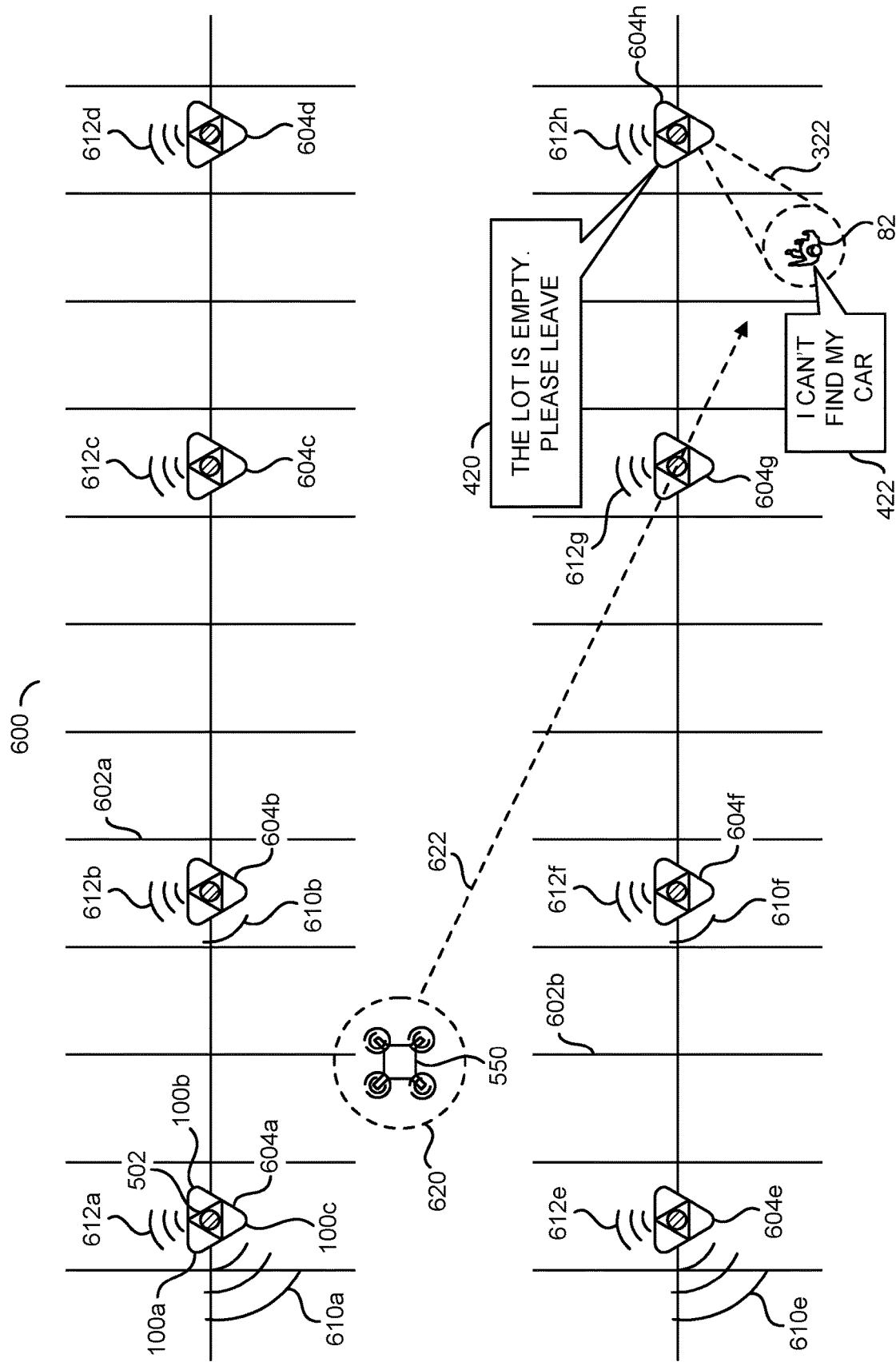
FIG. 19 is a diagram illustrating a network of security floodlights monitoring a parking lot.

Referring to FIG. 19, a diagram illustrating a network of security floodlights monitoring a parking lot is shown. An example scenario 600 is shown. The example scenario 600 may comprise an implementation of the system 300 in a commercial scenario. In the example scenario 600, a large commercial property comprising a parking lot is shown. The parking lot may comprise parking spot lines 602a-602b.

The example scenario may comprise security stations 604a-604h. The security stations 604a-604h may be located in the parking spot lines 602a-602b. For illustrative purposes, the smart security floodlights 100a-100c and the lamp post 502 are labeled only on the security station 604a. However, each of the security stations 604a-604h may comprise three of the smart security floodlights 100a-100c mounted to the lamp post 502 similar to the example shown in association with FIG. 17. The multiple smart security floodlights 100a-100c implemented at the security stations 604a-604h may be configured to deliver intelligent deterrence.

Curved lines 610a are shown near the security station 604a, a curved line 610b is shown near the security station 604b, curved lines 610e are shown near the security station 604e and a curved line 610f is shown near the security station 604f. The curved lines 610a, 610b, 610e and/or 610f may represent audio generated by one or more of the smart security floodlights 100a-100c of the security stations 604a, 604b, 604e and 604f. For example, the security stations 604a-604b, 604e and 604f may be generating audio and the security stations 604c, 604d, 604g and 604h may not be generating audio.

Curved lines 612a-612h are shown near the security stations 604a-604h. The curved lines 612a-612h may represent the wireless communication of the communication devices 210 of the smart security floodlights 100a-100c of each of the security stations 604a-604h. For example, the smart security floodlights 100a-100c of each of the smart security stations 604a-604h may be in communication with each other and/or the central monitoring service 304.

The target 82 is shown near the security station 604h. The focused light beam 322 generated by one of the smart security floodlights 100a-100c is shown focused on the target 82. The audio message 420 is shown generated by one of the smart security floodlights 100a-100c of the security station 604h. In the example shown, the audio message may be, "The lot is empty. Please leave". The response 422 is shown from the target 82. In the example shown, the response 422 may be "I can't find my car".

The drone 550 is shown. A dotted circle 620 is shown around the drone 550. In one example, the dotted circle 620 may represent a field of view captured by the mobile camera 556. In another example, the dotted circle 620 may represent the light generated by the drone light 558. A dotted line 662 is shown. The dotted line 662 is shown from the drone 550 to the target 82. The dotted line 662 may represent a response to a command. In one example, the command 622 may be for the drone 550 to go to the location of the target 82 (e.g., the smart security floodlights 100a-100c of the security station 604h may be used as a general location of the target 82).

The drone 550 may be deployed in response to the smart security floodlights 100a-100c analyzing the target 82 and/or the response 422. In the example shown, the parking spots 602a-602b are empty. The analysis of the audio by the processor 200 may determine that asking about a location of a car when the parking spots 602a-602b is suspicious. In some embodiments, the processor 200 may be configured to generate the command 662 that may be communicated by the communication device 210 to the drone 550. In some embodiments, the security personnel 370 may review the footage of the target 82 captured by the smart security floodlights 100a-100c at the security station 604h and communicate the command for the drone 550 to the smart security floodlights 100a-100c of the security station 604h and the smart security floodlights 100a-100c may communicate the command 622 to the drone 550. In one example, the drone 550 may approach the target 82 and capture video data of the field of view 620 of the target 82. For example, either the smart security floodlights 100a-100c may provide the location of the target 82 and/or the security personnel 370 may provide the location of the target 82. The location of the target 82 (e.g., near the security station 604h) may be provided as part of the command sent to the drone 550. When the drone 550 reaches the security station 604h, the security personnel 370 may provide another command for the drone 550 to capture images of the target 82 and/or generate light on the target 82.

In some embodiments, the conversational AI may communicate with the target 82. For example, the conversational AI may recognize that no cars are in the parking lot (e.g., the intruder is lying). The target 82 may be warned to leave as one method of deterrence. In some embodiments, the security personnel 370 may monitor the situation from the central monitoring service (e.g., by watching the streamed video data and/or listening to the streamed audio). For example, the audio message 420 may be streamed speech audio spoken remotely by the security personnel 370. In some embodiments, the smart security floodlights 100a-100n and/or the security personnel 370 may contact the authorities 380.

In some embodiments, the smart security floodlights 100a-100c of each of the security stations 604a-604h may be configured to operate in concert to implement a deterrence method. One deterrence method may be to create the effect of a siren (e.g., the sound of a police car) approaching. Potential intruders usually leave a location when a police siren is heard. For example, to create the effect of the police siren approaching the groups of smart security floodlights 100a-100c that are farther away from the target 82 (e.g., on the security station 604a and on the security station 604e) may loudly play the siren that imitates a police siren (e.g., the curved lines 610a and 610e are shown large to indicate a louder volume). The groups of smart security floodlights 100a-100c that are far away, but closer to the target 82 (e.g., on the security station 604b and on the security station 604f) may play the siren that imitates a police siren at a lower volume (e.g., the curved line 610b and 610f are shown smaller to indicate a lower volume). The groups of smart security floodlights 100a-100c that are closest to the target 82 (e.g., on the security stations 604c-604d and on the security stations 604g-604h) may not play the siren. The closer lights may play the siren less loudly to provide the audio effect that the police car is far away and approaching.

Multi-camera co-ordination may provide an effective deterrent. Several smart security floodlights 100a-100n may be deployed at a site including residential homes and/or commercial properties. The multi-camera co-ordination may be implemented to create effective sounds and lights (e.g., police siren sound approaching from a distance, an array of light strobing in the direction of a suspicious person, a relay of voices about a security risk in the direction of the suspicious person, etc.). Conversational AI may be configured to engage intruders until help arrives. The conversational AI may be configured to pass the Turing Test for security intruders. The conversational AI may be configured to engage intruders (e.g., to keep them at one location until authorities arrive and/or until security personnel 370 are available to respond).

For example, in a typical car dealership, there may be 50 cameras mounted on 20 lamp posts to provide surveillance of the entire parking lot. When an intruder is detected by one camera, another camera farther away may start a relay of police siren sounds from 200 feet away across the parking lot to approach the intruder. The imitated approaching siren may scare the intruder away. Another co-ordination effect may be to strobe the lights in the direction of the intruder. The strobing effect may draw attention let people know the location of the intruder. In some embodiments, the network of smart security floodlights 100a-100n may be configured to provide multi-camera cooperation by relaying voices from one camera to another (e.g., a camera on one lamp post to a camera on a different lamp post). The voice relay may provide a notification about a security risk in the direction of the suspicious person.

The smart security lights 100a-100n and/or the autonomous camera drone 550 may be configured to form a coordinated intelligence network. The coordinated intelligence network may implement coordinated deterrence methods. In one example, locations of the devices 100a-100n with detection signals may provide information (e.g., relayed back to the monitoring center 304) about the movement of the intruder 82. The coordinated deterrence may perform voice down audio to persuade the intruder 82 to leave. The coordinated deterrence may comprise generating sequenced light shows using the light panels 130a-130d of each of the smart security floodlights 100a-100n to announce to the intruder 82 visually that the intruder 82 is being tracked. The audio messages 420a-420n may be generated based on the movements of the intruder detected.

Figure 20:
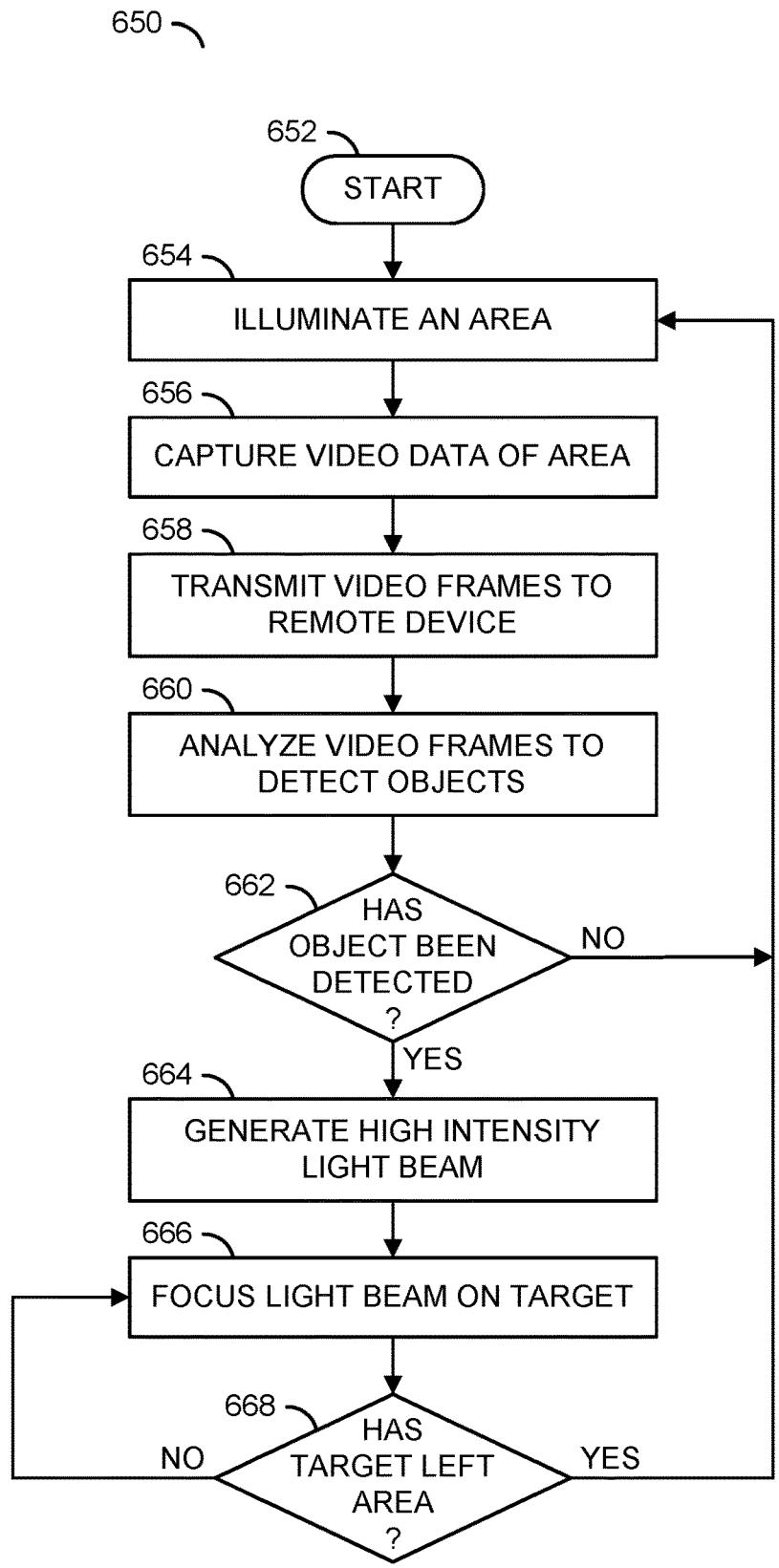
FIG. 20 is a flow diagram illustrating a method for generating a high intensity light beam in response to detecting a target.

Referring to FIG. 20, a method (or process) 650 is shown. The method 650 may generate a high intensity light beam in response to detecting a target. The method 650 generally comprises a step (or state) 652, a step (or state) 654, a step (or state) 656, a step (or state) 658, a step (or state) 660, a decision step (or state) 662, a step (or state) 664, a step (or state) 666, and a decision step (or state) 668.

The step 652 may start the method 650. In the step 654, the apparatus 100 may illuminate the area 80. In an example, the light panels 130a-130d may operate in a mode of operation that provides illumination of the area 80 below the level 182 of the apparatus 100. Next, in the step 656, the camera module 108 may capture pixel data that may be used by the processor 200 to generate video data of the area 80. In the step 658, the communication device 210 may transmit the video frames to the remote device 302 (e.g., the cloud computing resources and/or the central monitoring service 304). Next, in the step 660, the processor 200 may analyze the video frames to detect objects. For example, the video frame 400 may be analyzed to detect the intruder 82. In some embodiments, the cloud computing resources 302 may perform the computer vision operations to detect the target 82 and the results of the computer vision operations may be communicated to the apparatus 100. Next, the method 650 may move to the decision step 662.

In the decision step 662, the processor 200 may determine whether an object has been detected. The processor 200 may be configured to determine the characteristics 406a-406n and/or analyze the behavior 404 of the detected object to determine whether the object is an intruder, a welcomed visitor, etc. If the object has not been detected and/or the visitor is welcome, then the method 650 may return to the step 654. If the object has been detected and/or determined to be an intruder, then the method 650 may move to the step 664.

In the step 664, the processor 200 may provide a control signal to the LED controllers 220a-220d to cause the light panels 130a-130d to operate in a mode of operation that generates the high intensity light beam 322. Next, in the step 666, the light panels 130a-130d may focus the light beam 322 on the target 82. Next, the method 650 may move to the decision step 668.

In the decision step 668, the processor 200 may determine whether the target 82 has left the area 80. For example, the processor 200 may determine whether the target 82 is within the field of view 180a-180b and/or the PIR sensor 110 detects the target 82. If the target 82 has not left the area 80, then the method 650 may return to the step 666. If the target 82 has left the area 80, then the method 650 may return to the step 654.

Figure 21:
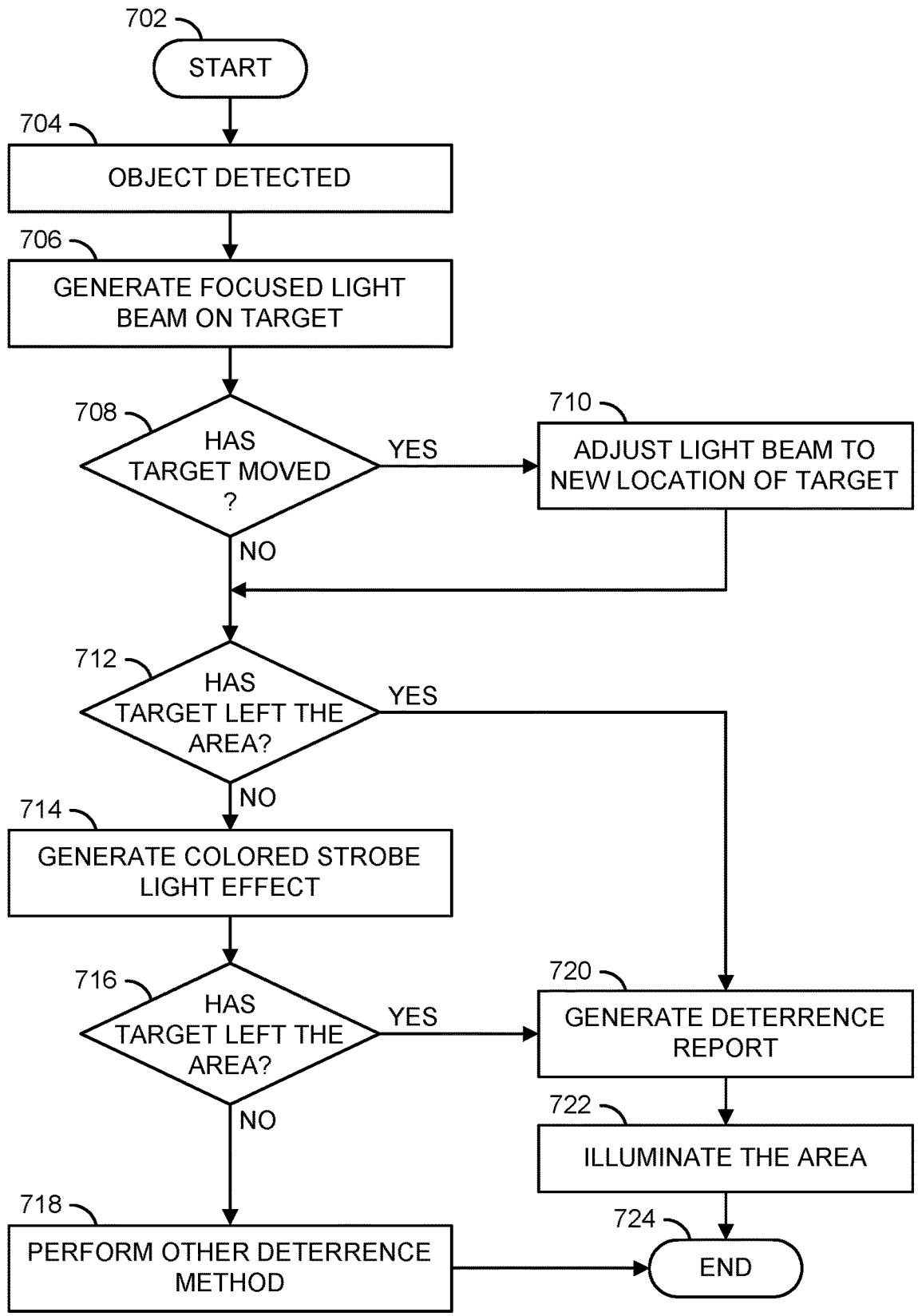
FIG. 21 is a flow diagram illustrating a method for tracking a target with the high intensity light beam and selecting alternate deterrence methods.

Referring to FIG. 21, a method (or process) 700 is shown. The method 700 may track a target with the high intensity light beam and select alternate deterrence methods. The method 700 generally comprises a step (or state) 702, a step (or state) 704, a step (or state) 706, a decision step (or state) 708, a step (or state) 710, a decision step (or state) 712, a step (or state) 714, a decision step (or state) 716, a step (or state) 718, a step (or state) 720, a step (or state) 722, and a step (or state) 724.

The step 702 may start the method 700. In the step 704, the processor 200 may detect the object 402. Next, in the step 706, the processor 200 may change the mode of operation of the light panels 130*a*-130*d* to generate the focused light beam 322 on the target 82. Next, the method 700 may move to the decision step 708.

In the decision step 708, the processor 200 may perform the video operations on the video frame 400 to determine whether the target 82 has moved. For example, the processor 200 may track the movement 408 of the target 82. If the target 82 has moved, them the method 700 may move to the step 710. In the step 710 the PZ actuators 222*a*-222*d* may adjust the light beam 322 according to the new location of the target 82 determined by the processor 200. Next, the method 700 may move to the decision step 712. In the decision step 708, if the target 82 has not moved, then the method 700 may move to the decision step 712.

In the decision step 712, the processor 200 may determine whether the target 82 has left the area 80. If the target 82 has been determined to have left the area 80, then the method 700 may move to the step 720. If the target 82 has been determined to have not left the area 80, then the method 700 may move to the step 714. In the step 714, the processor 200 may generate a control signal to change the mode of operation of the light panels 130*a*-130*d* to generate the colored strobe light effect. Next, the method 700 may move to the decision step 716.

In the decision step 716, the processor 200 may determine whether the target 82 has left the area 80. If the target 82 has been determined to have not left the area 80, then the method 700 may move to the step 718. In the step 718, the processor 200 may generate one or more control signals to initiate another one of the deterrence methods. For example, the apparatus 100 may play the audio message 420, release the consumables 214, alert the central monitoring service 304, alert the authorities 380, etc. Next, the method 700 may move to the step 724. If the target 82 has been determined to have left the area 80, then the method 700 may move to the step 720.

In the step 720, the processor 200 may generate a deterrence report. For example, the processor 200 may report to the central monitoring service 304 and/or the cloud computing resources 302 that the target 82 has been detected and the deterrence method has been successful. The reports may be used as feedback to form an artificial intelligence model for deterring intruders. Next, the method 700 may move to the step 722. In the step 722, the processor 200 may generate a control signal to cause the light panels 130*a*-130*d* to enter the mode of operation to provide general illumination for the area 80. Next, the method 700 may move to the step 724. The step 724 may end the method 700.

Figure 22:
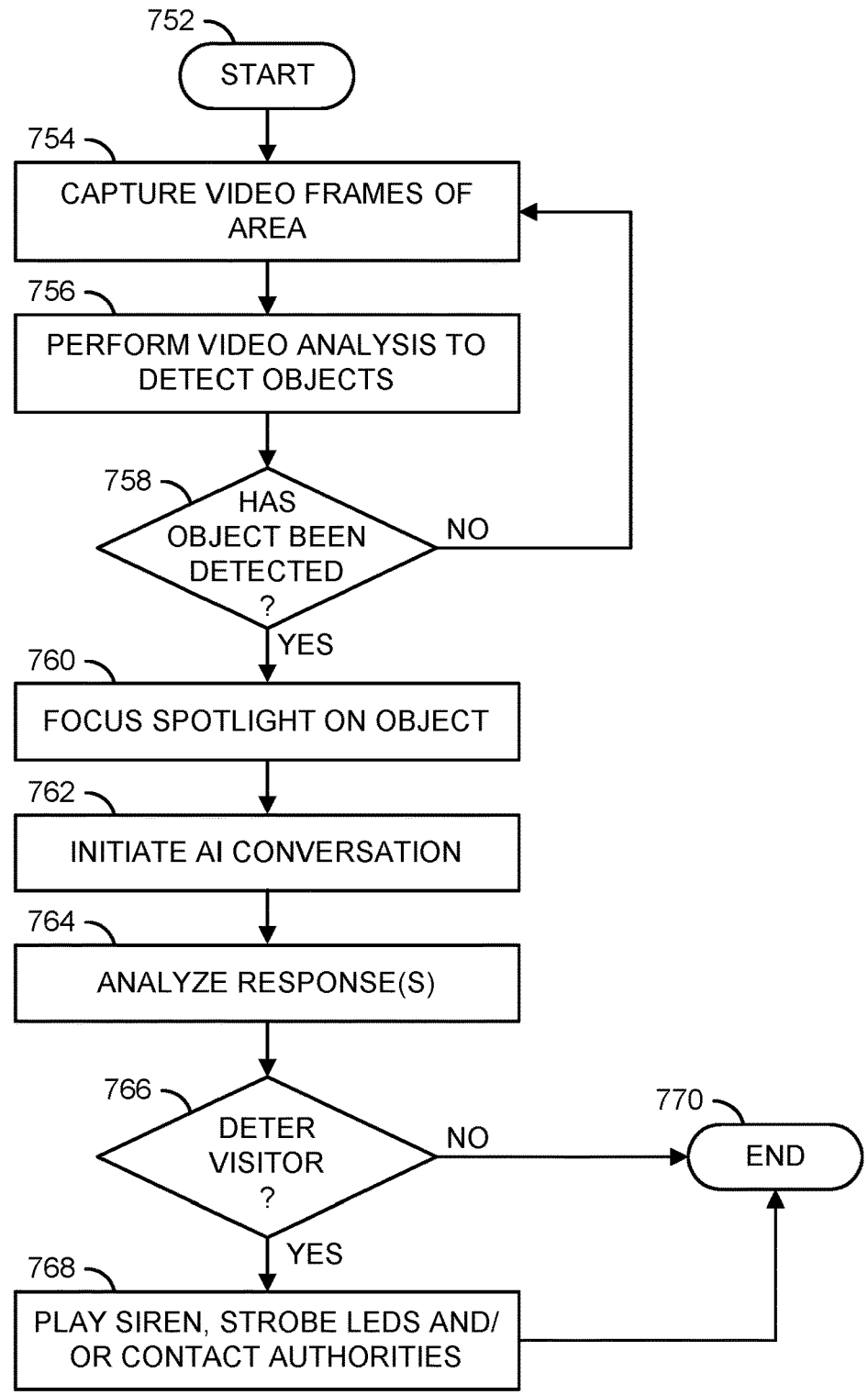
FIG. 22 is a flow diagram illustrating a method for deterring a visitor in response to a detected object.

Referring to FIG. 22, a method (or process) 750 is shown. The method 750 may deter a visitor in response to a detected object. The method 750 generally comprises a step (or state) 752, a step (or state) 754, a step (or state) 756, a decision step (or state) 758, a step (or state) 760, a step (or state) 762, a step (or state) 764, a decision step (or state) 766, a step (or state) 768, and a step (or state) 770.

The step 752 may start the method 750. In the step 754, the capture device 108 may capture video frames of the area 80. Next, in the step 756, the processor 200 may perform video analysis to detect the objects in the field of view 180*a*-180*b*. Next, the method 750 may move to the decision step 758.

In the decision step 758, the processor 200 may determine whether the object has been detected using the computer vision operations 402. If the object has not been detected, then the method 750 may return to the step 754. If the object has been detected, then the method 750 may move to the step 760.

In the step 760, the light panels 130*a*-130*d* may focus the light beam 322 on the target 82. Next, in the step 762, the processor 200 may initiate the AI conversation (e.g., if the object is a person generate the audio messages 420*a*-420*n* to engage with the person). Next, in the step 764, the microphone 204 may receive the responses 422*a*-422*n* from the target 82 and the processor 200 may analyze the responses 422*a*-422*n* (e.g., to assess the behavior). Next, the method 750 may move to the decision step 766.

In the decision step 766, the processor 200 may determine whether to deter the visitor 82 (e.g., determine whether the visitor 82 is an intruder, a loiterer, unwelcome, a potential burglar, a person intending to do harm to the property owner and/or classified as another type of undesirable visitor). If the visitor 82 is not to be deterred, then the method 750 may move to the step 770. If the visitor 82 is to be deterred, then the method 750 may move to the step 768. In the step 768, the apparatus 100 may generate various deterrence methods (e.g., play the siren audio, generate the strobe effect 342, release the drone 550, contact the authorities 380, etc.). Next, the method 750 may move to the step 770. The step 770 may end the method 750.

Figure 23:
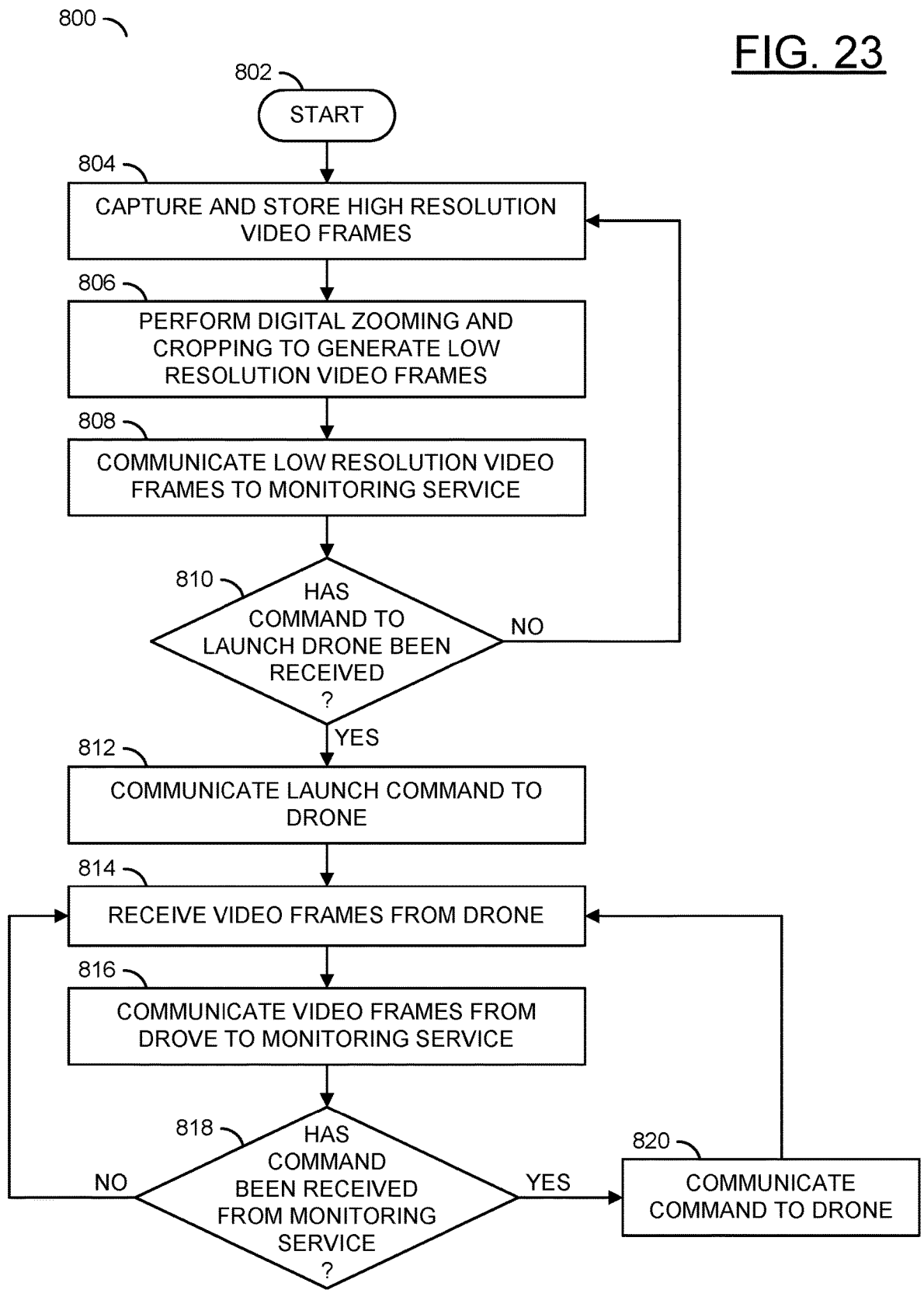
FIG. 23 is a flow diagram illustrating a method for providing instructions received from a monitoring service to a drone.

Referring to FIG. 23, a method (or process) 800 is shown. The method 800 may provide instructions received from a monitoring service to a drone. The method 800 generally comprises a step (or state) 802, a step (or state) 804, a step (or state) 806, a step (or state) 808, a decision step (or state) 810, a step (or state) 812, a step (or state) 814, a step (or state) 816, a decision step (or state) 818, and a step (or state) 820.

The step 802 may start the method 800. In the step 804, the processor 200 may generate the high resolution video frames 452 and store the high resolution video frames 452 in the memory 204. Next, in the step 806, the processor 200 may perform the digital zooming and/or cropping to generate the low resolution video frames 454. In the step 808, the communication device 210 may communicate the low resolution video frames 454 to the central monitoring service 304. Next, the method 800 may move to the decision step 810.

In the decision step 810, the processor 200 may determine whether the command CCTRL has been communicated by the central monitoring service 304 to launch the drone 550. If the command to launch the drone 550 has not been received, then the method 800 may return to the step 804. If the command to launch the drone 550 has been received, then the method 800 may move to the step 812.

In the step 812, the communication device 210 may connect to the drone 550 to establish a Wi-Fi connection and communicate the command to launch the drone 550. The drone 550 may fly autonomously and capture video data. Next, in the step 814, the communication device 210 may receive the video frames captured by the drone 550. In the step 816, the communication device 210 may communicate the video frames received from the drone 550 to the remote monitoring service 304. Next, the method 800 may move to the decision step 818.

In the decision step 818, the processor 200 may determine whether a command has been received from the monitoring service 304. In an example, the security personnel 370 may review the video frames captured by the drone 550 and then send commands to the drone 550 via the apparatus 100 (e.g., using the signal CCTRL). If no command has been received from the remote monitoring service 304, then the method 800 may return to the step 814. If a command for the drone 550 has been received from the remote monitoring service 304, then the method 800 may move to the step 820. In the step 820, the communication device 210 may communicate the command to the drone 550. Next, the method 800 may return to the step 814.

Figure 24:
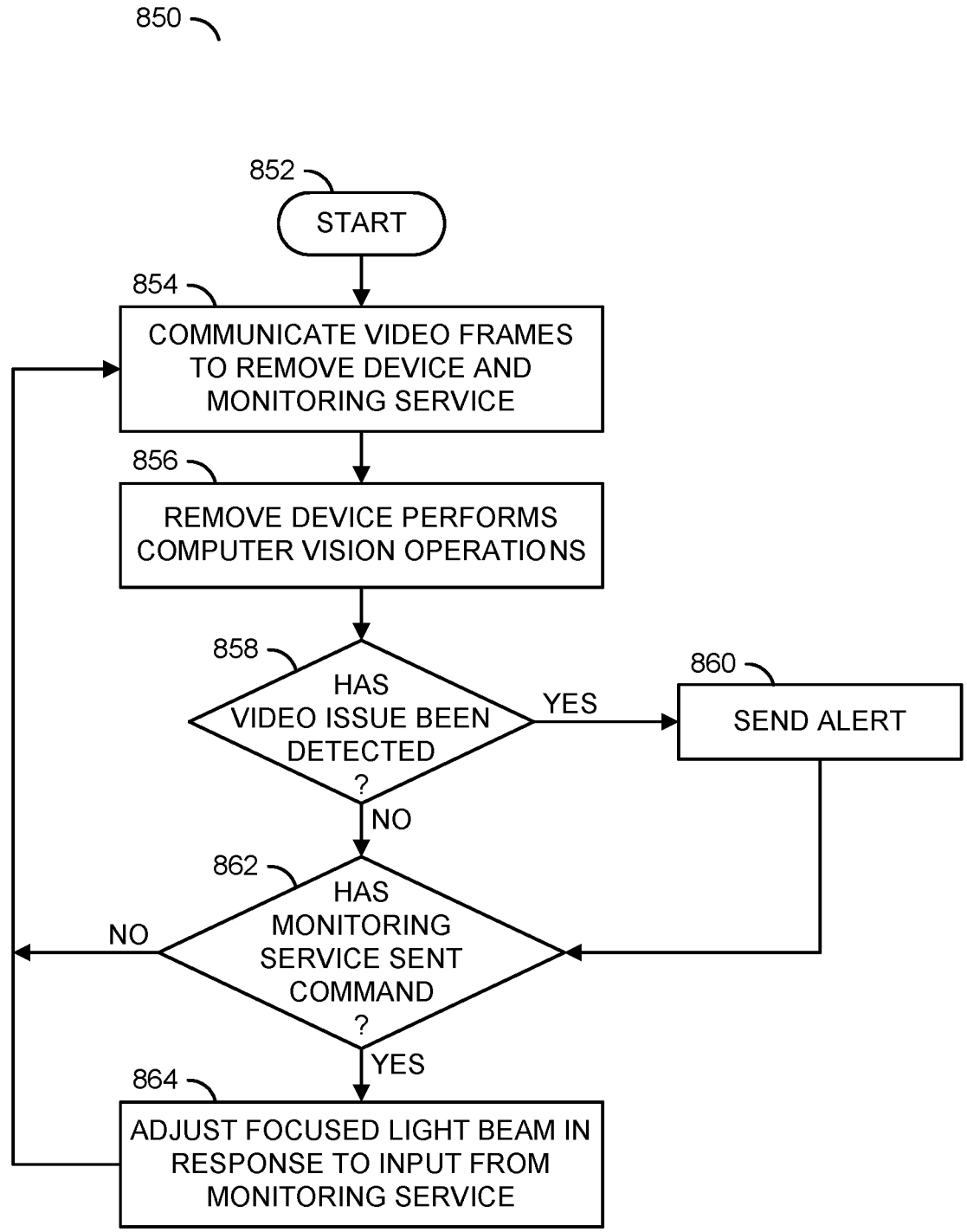
FIG. 24 is a flow diagram illustrating a method for determining a status of the apparatus.

Referring to FIG. 24, a method (or process) 850 is shown. The method 850 may determine a status of the apparatus. The method 850 generally comprises a step (or state) 852, a step (or state) 854, a step (or state) 856, a decision step (or state) 858, a step (or state) 860, a decision step (or state) 862, and a step (or state) 864.

The step 852 may start the method 850. In the step 854, the apparatus 100 may communicate the video frames generated by the processor 200 to the remote device 302 and/or the monitoring service 304. In an example, the communication device 210 may transmit the signal TLVID to the cloud computing resources 302 and to the central monitoring service 304 for manual review by the security personnel 370. Next, in the step 856, the cloud computing resources 302 may perform computer vision operations on the video frames. The cloud computing resources 302 may analyze the video frames for particular markers that may indicate that the apparatus 100 has been tampered with. The markers may comprise all black video frames, a cracked lens 118, an unexpected view (e.g., an indication that the apparatus 100 has been torn down), etc. Next, the method 850 may move to the decision step 858.

In the decision step 858 the cloud computing resources 302 may determine whether there has been an issue with the video. If an issue has been detected, then the method 850 may move to the step 860. In the step 860, the cloud computing resources 302 may send an alert. In one example, the alert may be a notification to the smartphones 310a-310n. In another example, the alert may be sent to the authorities 380. In yet another example, the alert may be sent to the security personnel 370. Next, the method 850 may move to the decision step 862. In the decision step 858, if no issue has been detected with the video frames, then the method 850 may move to the decision step 862.

In the decision step 862, the processor 200 may determine whether the monitoring service 304 has sent a command (e.g., the signal CCTRL). If the monitoring service 304 has not sent a command, then the method 850 may return to the step 854. If the monitoring service 304 has sent a command, then the method 850 may move to the step 864. In the step 864, the PT actuators 222a-222d may adjust the location of the focused light beam 322 in response to the input 372a-372b received in the command. For example, the command may enable manual control of the location of the focused light beam 322. Next, the method 850 may return to the step 854.

Figure 25:
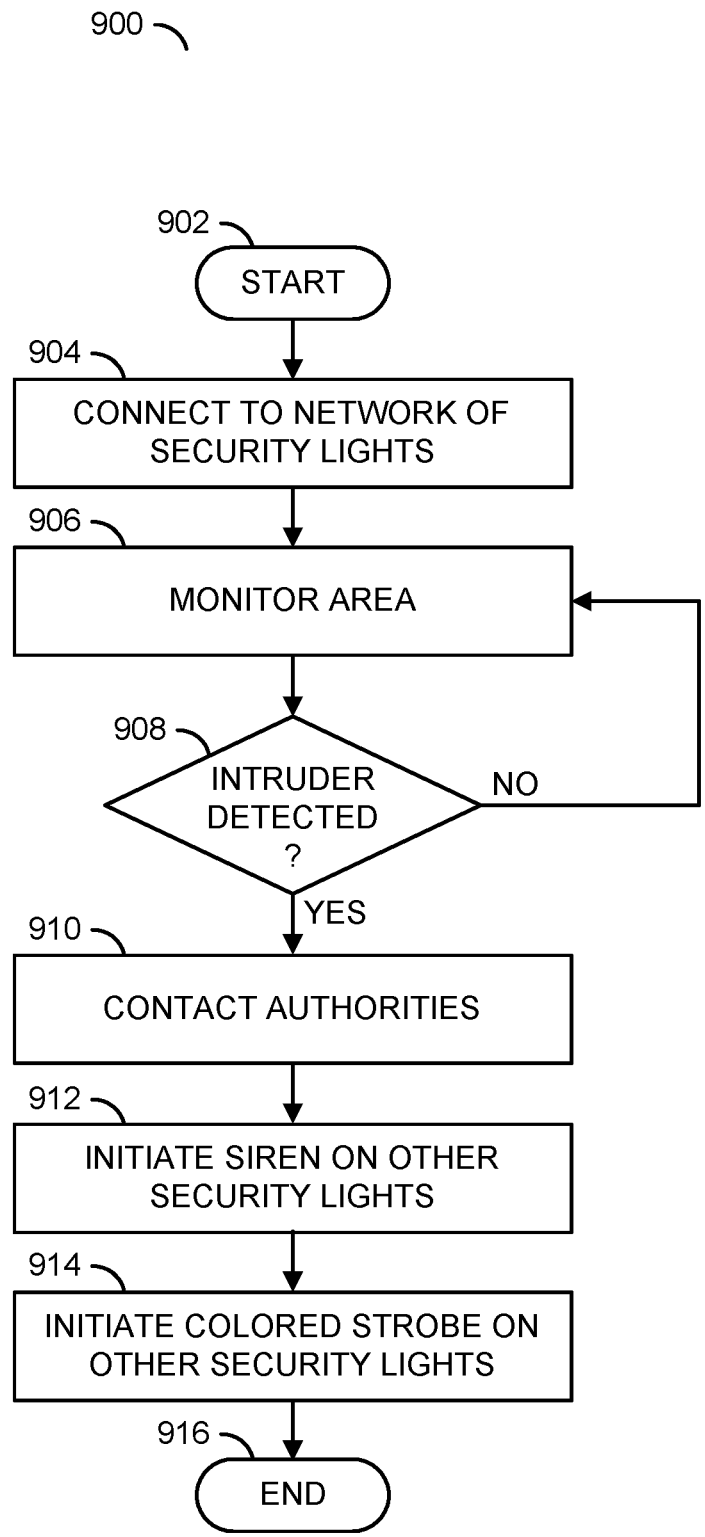
FIG. 25 is a flow diagram illustrating a method for contacting authorities in response to an intruder.

Referring to FIG. 25, a method (or process) 900 is shown. The method 900 may contact authorities in response to an intruder. The method 900 generally comprises a step (or state) 902, a step (or state) 904, a step (or state) 906, a decision step (or state) 908, a step (or state) 910, a step (or state) 912, a step (or state) 914, and a step (or state) 916.

The step 902 may start the method 900. In the step 904, the smart security floodlights 100a-100n may connect to each other (e.g., via the respective communication devices 210) to create a network of the smart security floodlights 100a-100n (e.g., the system 300). Next, in the step 906, each of the smart security floodlights 100a-100n may monitor an area (e.g., each of the smart security floodlights 100a-100n may monitor a respective area 80). Next, the method 900 may move to the decision step 908.

In the decision step 908, the smart security floodlights 100a-100n may determine whether an intruder has been detected (e.g., the target 82). In one example, the processor 200 of one or more of the smart security floodlights 100a-100n may perform the video analysis 402 to detect the object, determine the behavior 404 and/or the characteristics 406a-406n of the detected object to determine whether the target 82 is an intruder. In another example, the video frames may be uploaded to the cloud computing resources 302 and the cloud computing resources 302 may perform video analysis to determine whether the target 82 is an intruder. If no intruder is detected, then the method 900 may return to the step 906. If an intruder is detected, then the method 900 may move to the step 910.

In the step 910, the authorities 380 may be contacted. In some embodiments, the security personnel 370 at the monitoring service 304 may contact the authorities 380 after reviewing the video frames. Next, in the step 912, the smart security floodlights 100a-100n may initiate a siren sound. The siren sound may implement a coordinated security response. The siren sound may emulate the sound of a siren approaching from a distance. In an example, one of the smart security floodlights 100a-100n that is closest to the intruder 82 may not play the siren sound (e.g., since a police car would not show up immediately and would approach from a distance). The coordinated security response may comprise the smart security floodlights 100a-100n that are located farther away from the location of the intruder 82 playing the siren sound to create the effect that the siren is approaching the location of the intruder 82 from a distance. Next, the method 900 may move to the step 914.

In the step 914, the light panels 130a-130d of the smart security floodlights 100a-100n may initiate the colored strobe light effect 342. The colored strobe light effect 342 of the smart security floodlights 100a-100n may be another example of a coordinated security response. For example, the light panels 130a-130d of the smart security floodlights 100a-100n may provide a deterring light display (e.g., a light show). In an example, one of the smart security floodlights 100a-100n that is closest to the intruder 82 may strobe the light panels 130a-130d (e.g., since a police car would not show up immediately and the flashing lights of a police car would approach from a distance). The coordinated security response may comprise sequencing the smart security floodlights 100a-100n that are located farther away from the location of the intruder 82 strobing the light panels 130a-130d to create the effect that the flashing lights of the authorities 380 approaching the location of the intruder 82 from a distance. Next, the method 900 may move to the step 916. The step 916 may end the method 900.

The coordinated deterrence response may be implemented to cause the intruder 82 to leave the property. The goal of the coordinated deterrence may be to prevent the intruder 82 from trespassing. The coordinated deterrence may be a proactive response that prevents entry by encouraging the intruder 82 to leave instead of waiting for the intruder 82 to cause damage. For example, if the authorities 380 are contacted, the intruder 82 may know that there is a delay in response time and may attempt to steal.

Figure 26:
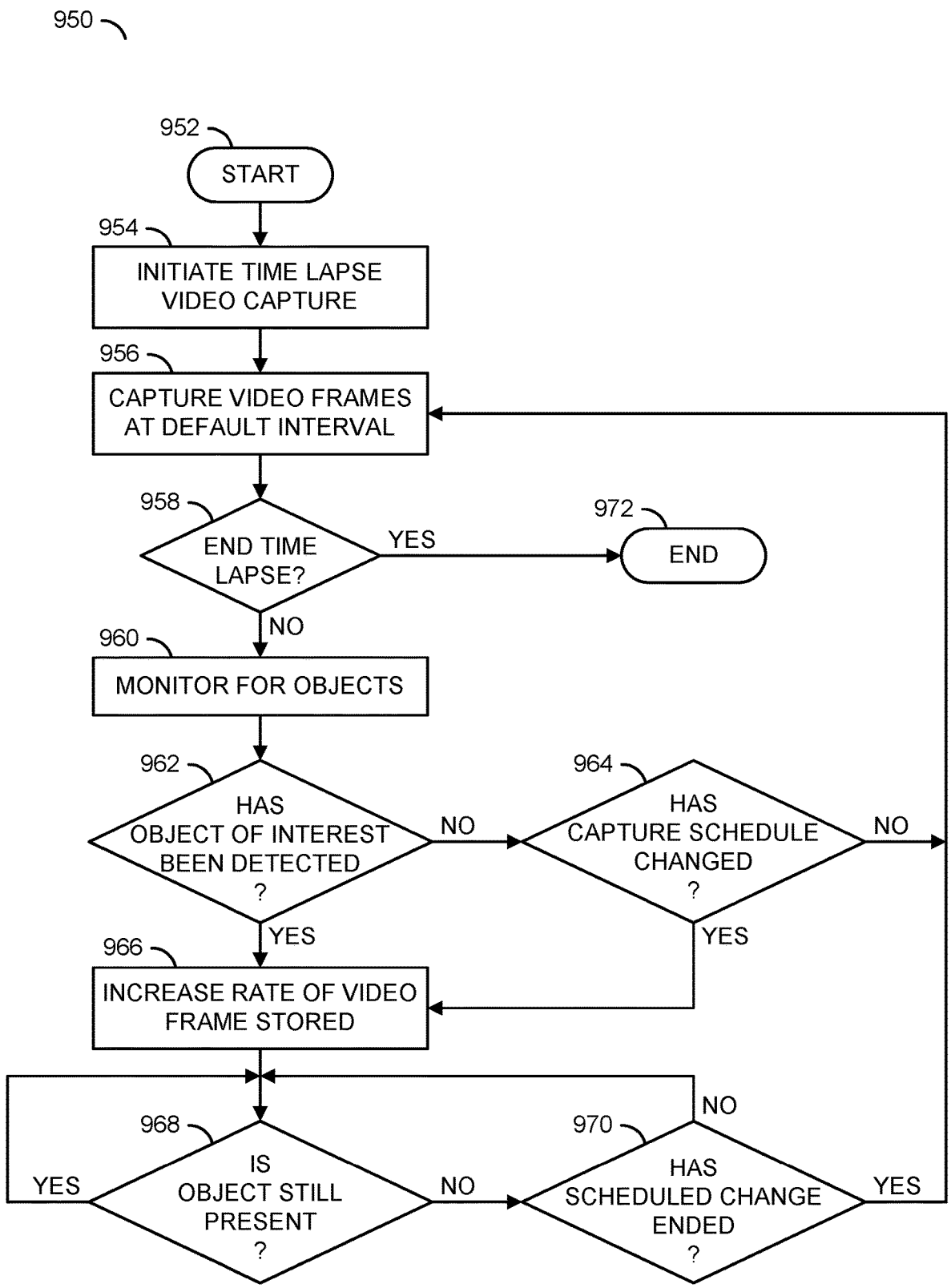
FIG. 26 is a flow diagram illustrating a method for generating a smart time-lapse video.

Referring to FIG. 26, a method (or process) 950 is shown. The method 950 may generate a smart time-lapse video. The method 950 generally comprises a step (or state) 952, a step (or state) 954, a step (or state) 956, a decision step (or state) 958, a step (or state) 960, a decision step (or state) 962, a decision step (or state) 964, a step (or state) 966, a decision step (or state) 968, a decision step (or state) 970, and a step (or state) 972.

The step 952 may start the method 954. In the step 954, the processor 200 may initiate the time lapse video capture 480 as shown in association with FIG. 15. Next, in the step 956, the processor 200 may generate video frames 490*a*-490*l* at the default interval. In one example, the default interval may be approximately two video frame images per minute (e.g., approximately a 400 speed up that may reduce the running time of twenty four hours worth of video to four minutes of video). The sped up time lapse video may provide an overview of the video frames captured over a period of time. Next, the method 950 may move to the decision step 958.

In the decision step 958, the processor 200 may determine whether to end the time lapse video stream. In an example, the time lapse video stream may be performed according to a schedule and/or a manual command (e.g., received from the remote monitoring service 304 and/or the smartphones 310*a*-310*n*). If the time lapse is to be ended, the method 950 may move to the step 972. The step 972 may end the method 950. If the time lapse is not to be ended, then the method 950 may move to the step 960. In the step 960, the cloud computing resources 302 may receive the time lapse video frames TLVID_A-TLVID_N and perform video analysis to monitor for objects of interest. Next, the method 950 may move to the decision step 962.

In the decision step 962, the cloud computing resources 302 may determine whether an object has been detected. If an object has been detected, then the method 950 may move to the step 966. If an object has not been detected, then the method 950 may move to the decision step 964. In the decision step 964, the processor 200 may determine whether the capture schedule has changed. In one example, the capture schedule may change based on a time of day (e.g., during business hours). If the capture schedule has not changed, then the method 950 may return to the step 956 (e.g., continue operating at the default frame rate interval for the time lapsed video). If the capture schedule has changed, then the method 950 may move to the step 966. In the step 966, the processor 200 may increase the rate that the video frames are stored (e.g., the processor 200 may store more video frames, which may increase the running length of the time lapsed video and provide more data). Next, the method 950 may move to the decision step 968.

In the decision step 968, the cloud computing resources 968 may determine whether the detected object 402 is still present in the area 80. If the object is still present, then the method 950 may return to the decision step 968. If the object is no longer present in the area 80, then the method 950 may move to the decision step 970. In the decision step 970, the processor 200 may determine whether the change of the capture schedule has ended. If the change to the schedule (e.g., the increased frame rate capture) has not ended, then the method 950 may return to the decision step 968. If the change to the schedule has ended, then the method 950 may return to the step 956 (e.g., switch the capture interval back to the default interval). For example, the processor 200 may generate the time-lapse video frames TLVID_A-TLVID_N using a default frame rate. When an object is detected or a schedule changes, more frames may be stored for a short period of time. The time-lapse video may then return back to the default frame rate.

Figure 27:
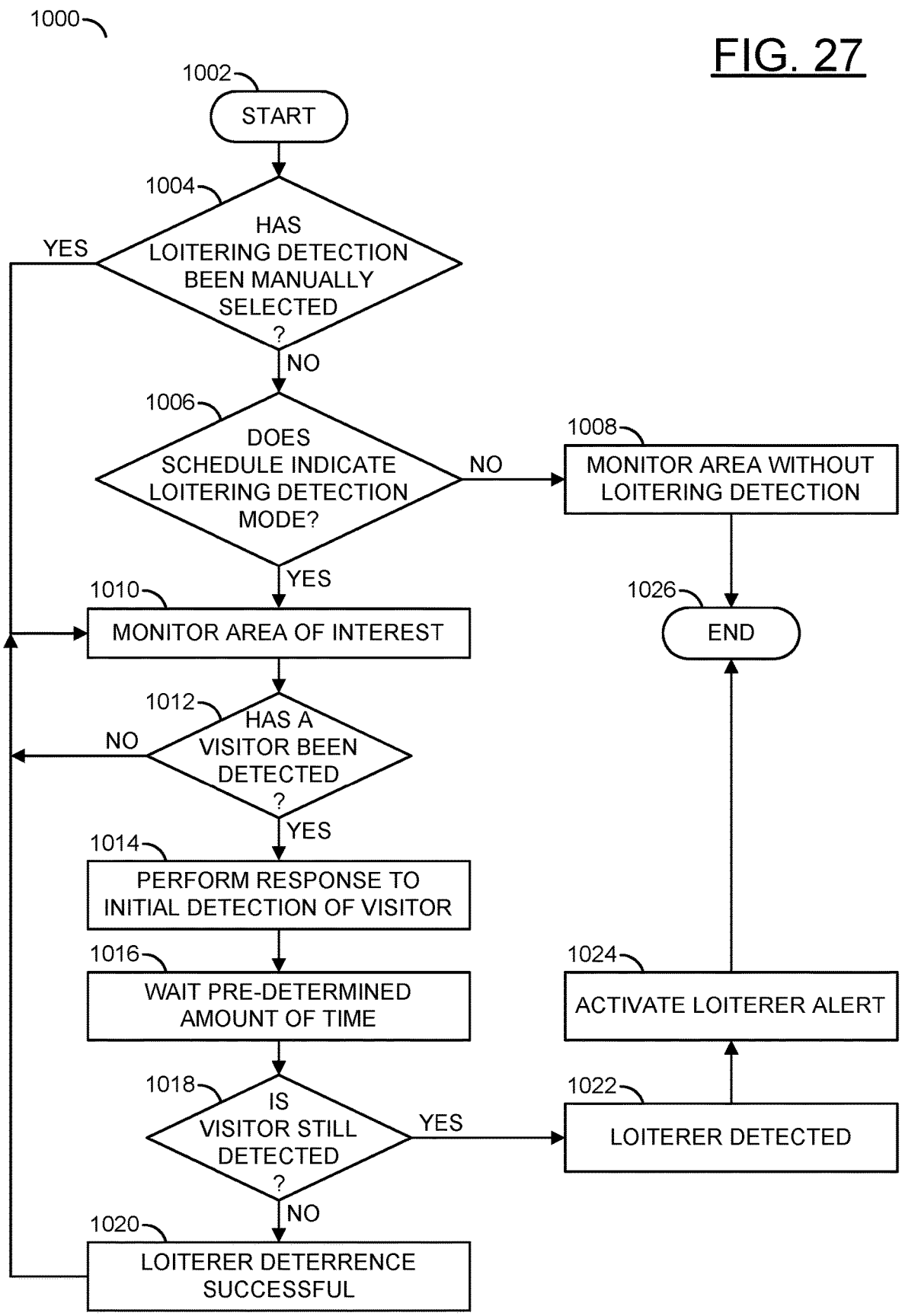
FIG. 27 is a flow diagram illustrating a method for detecting a loiterer.

Referring to FIG. 27, a method (or process) 1000 is shown. The method 1000 may detect a loiterer. The method 1000 generally comprises a step (or state) 1002, a decision step (or state) 1004, a decision step (or state) 1006, a step (or state) 1008, a step (or state) 1010, a decision step (or state) 1012, a step (or state) 1014, a step (or state) 1016, a decision step (or state) 1018, a step (or state) 1020, a step (or state) 1022, a step (or state) 1024, and a step (or state) 1026.

The step 1002 may start the method 1000. Next, the method 1000 may move to the decision step 1004. In the decision step 1004, the processor 200 may determine whether loitering detection has been manually selected. In one example, the loitering detection may be manually selected based on an input from the smartphones 310*a*-310*n*. In another example, the loitering detection may be manually selected based on the command CCTRL received from the remote monitoring service 304. If the loitering detection has been manually selected, the method 1000 may move to the step 1010. If the loitering detection has not been manually selected, then the method 1000 may move to the decision step 1006.

In the decision step 1006, the processor 200 may determine whether a schedule of operation indicates that a loitering detection mode should be activated. In an example, the memory 204 may store a schedule of various modes of operation that the apparatus 100 should operate in at particular times (e.g., hours of the day, days of the week, days of the month, etc.). If the schedule does not indicate the loitering detection mode, then the method 1000 may move to the step 1008. In the step 1008, the apparatus 100 may monitor the area 80 without loitering detection. Next, the method 1000 may move to the step 1026. In the decision step 1006, if the schedule does indicate that the loitering detection mode should be activated, then the method 1000 may move to the step 1010.

In the step 1010, the apparatus 100 may monitor the area 80. For example, the capture device 108 may capture video of the field of view 180*a*-180*b*, the microphone 202 may capture audio and the PIR sensor 110 may detect motion that all may be input that is analyzed by the processor 200. Next, the method 1000 may move to the decision step 1012.

In the decision step 1012, the processor 200 may determine whether a visitor (e.g., the target 82) has been detected. If the visitor 82 has not been detected, then the method 1000 may return to the step 1010. If the visitor 82 has been detected, then the method 1000 may move to the step 1014. In the step 1014, the apparatus 100 may perform a reaction to the initial detection of the visitor 82. The reaction may be selected by the processor 200. In an example, the reaction may be to generate the high intensity light beam 322. In another example, the reaction may be one of the audio messages 420*a*-420*n*. In yet another example, the reaction may be generating the strobe effect 342. Next, in the step 1016, the apparatus 100 may wait a pre-determined amount of time. The pre-determined amount of time may be a threshold for detecting a loiterer. The pre-determined amount of time may allow time for the visitor 82 to leave the area 80. In one example, the pre-determined amount of time may be approximately thirty seconds. Next, the method 1000 may move to the decision step 1018.

In the decision step 1018, the processor 200 may determine whether the visitor 82 is still detected in the area 80. If the visitor 82 is no longer detected, the method 1000 may move to the step 1020. In the step 1020, the successful deterrence of the loiterer may be recorded in the memory 204. For example, successful deterrence may provide positive feedback for the artificial intelligence model that selects the reaction for deterring the visitor 82 in the step 1014. Next, the method 1000 may return to the step 1010. In the decision step 1018, if the visitor 82 is still detected, then the method 1000 may move to the step 1022.

In the step 1022, the visitor 82 may be classified as a loiterer. For example, unsuccessful deterrence may be stored in the memory 204 to provide negative feedback for the artificial intelligence model that selects the reaction for deterring the visitor 82 in the step 1014. Next, in the step 1024, the apparatus 100 may activate a loiterer alert. For example, the loiterer alert may be more aggressive than the initial reaction in the step 1014. In an example, the audio messages 420a-420n may be a more stern message. In another example, the consumables 214 may be activated (e.g., pepper spray). In yet another example, the authorities 380 may be contacted. Next, the method 1000 may move to the step 1026. The step 1026 may end the method 1000.

The apparatus 100 may be configured to perform automated loitering detection. The apparatus 100 may be configured to generate automated emergency alerts. For example, loitering may be detected when the processor 200 detects the target 82 in the area 80 for a pre-determined amount of time (e.g., 30 seconds). The processor 200 may generate a deterrent method (e.g., playing a voice down message from the integrated speaker 206). If the target 82 is still detected after the deterrent method, then (e.g., detected for another 30 seconds), then the speakers 206 may generate an alarm sound. The detection of the target 82 may comprise PIR, radar, computer vision, manual review by the security personnel 370, detecting MAC addresses of mobile devices (a cell phone carried by the target 82), etc. Loiterer detection may be turned off/on based on a schedule (e.g., loiters may be detected after business hours, and loiterer detection may be turned off during business hours). Loiterer detection may have a manual override to activate/deactivate. In response to detecting a loiterer, the apparatus 100 may provide a notification. The notification may be communicated wirelessly to the smartphones 310a-310n. For example, the notification may be implemented as a phone call, an operating system notification, a text message, an email, etc. The notifications may be sent to designated people such as property owners, monitoring personnel, private patrol guards, police, etc.

The apparatus 100 may be configured to continuously upload time lapsed video (e.g., twenty-four hours a day, seven days a week). In one example, two images may be uploaded per minute (e.g., resulting in a 400 times speed up). Uploading two video frames per minute may result in twenty-four hours of footage being reduced to 4 minutes of video stored being communicated to the remote device 302. In some embodiments, the apparatus 100 may communicate a beacon to indicate that the camera 108 is working properly. The time lapsed video may show a cause of the camera 108 not working. The security personnel 370 may provide manual review of the time lapsed video to confirm that the apparatus 100 is operating properly.

The functions performed by the diagrams of FIGS. 1-27 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a housing;
   a capture device configured generate video data of an area below a level of said apparatus;
   a plurality of light panels configured to (a) illuminate said area in a first mode, (b) focus a high intensity light beam on a target in a second mode and (c) strobe colored light in a third mode;
   a plurality of speakers integrated within said housing, each configured to generate audio;
   a processor configured to (i) receive said video data from said capture device, (ii) perform video analysis on video frames generated from said video data to detect objects and (iii) change said light panels to said second mode in response to identifying said target from said objects detected; and
   a communication device configured to (i) communicate wirelessly, (ii) receive said video frames from said processor and (iii) transmit said video frames to a remote device, wherein
   (A) said apparatus is further configured to (i) communicate with a camera drone, (ii) provide communication between a remote monitoring service and said camera drone, and (iii) provide a Wi-Fi tether for said camera drone, and
   (B) said camera drone is configured to (i) capture remote video data, (ii) communicate said remote video data to said apparatus and (iii) said apparatus is configured to stream said remote video data received from said camera drone to said remote monitoring service.

2. The apparatus according to claim 1, wherein (i) said processor is further configured to (a) generate high resolution video frames from said video data, (b) perform said video analysis on said high resolution video frames, (c) perform digital pan, zoom and tilt operations on said high resolution video frames and (d) crop said high resolution video frames to low resolution video frames using said digital pan, zoom and tilt operations and (ii) said communication device (a) receives said low resolution video frames from said processor and (b) transmits said low resolution video frames to a user device.

3. The apparatus according to claim 2, wherein said high resolution video frames are stored locally to generate an intelligent time-lapse video.

4. The apparatus according to claim 3, wherein said processor generates said intelligent time-lapse video by altering a frame-rate for storing said high resolution video frames in response to at least one of (a) a schedule and (b) said objects detected.

5. The apparatus according to claim 1, wherein said communication between said remote monitoring service and said camera drone is provided within a range of latency from 0.1 seconds to 10 seconds.

6. The apparatus according to claim 5, wherein (i) security personnel at said remote monitoring service provide commands to said camera drone and (ii) said camera drone is configured to (a) fly autonomously and (b) respond to said commands.

7. A system comprising:
   a plurality of smart security floodlights each comprising (a) a housing, (b) a plurality of light panels integrated in an arrangement on a front face of said housing, (c) a plurality of speakers, (d) a capture device, (e) a processor and (f) a communication device, wherein said arrangement comprises (i) a first two of said light panels directed outwards from said front face of said housing and one of said first two of said light panels on each side of said capture device and (ii) a second two of said light panels directed to an area below a level of a respective one of said smart security floodlights; and
   a remote device configured to receive a plurality of video streams from said smart security floodlights, wherein said smart security floodlights are configured to (i) communicate with other of said smart security floodlights, (ii) generate said video streams, (iii) communicate said video streams to said remote device, (iv) detect an intruder in response to video analysis performed on said video streams and (v) perform a coordinated response to deter said intruder from a property.

8. The system according to claim 7, wherein said remote device comprises at least one of (i) an internet server configured to implement cloud computing, (ii) a local hub server and (iii) distributed processing among a network of said smart security floodlights.

9. The system according to claim 7, wherein said coordinated response comprises at least one of (a) sequencing said light panels of said plurality of smart security floodlights to provide a deterring light show and (b) generating audio that from said speakers to emulate an approaching siren based on a distance of said smart security floodlights from a location of said intruder.

10. An apparatus comprising:
    a housing;
    a capture device configured generate video data of an area below a level of said apparatus;
    a plurality of light panels configured to (a) illuminate said area in a first mode, (b) focus a high intensity light beam on a target in a second mode and (c) strobe colored light in a third mode;
    a plurality of speakers integrated within said housing, each configured to generate audio;
    a processor configured to (i) receive said video data from said capture device, (ii) generate high resolution video frames from said video data, (iii) crop said high resolution video frames to low resolution video frames and (iv) perform video analysis on said high resolution video frames to detect objects; and
    a communication device configured to (i) communicate wirelessly, (ii) receive said low resolution video frames from said processor and (iii) transmit said low resolution video frames to a remote device, wherein (a) said high resolution video frames are stored locally to generate an intelligent time-lapse video and (b) said processor generates said intelligent time-lapse video by altering a frame-rate for storing said high resolution video frames in response to at least one of (i) a schedule and (ii) said objects detected.

11. The apparatus according to claim 10, wherein (i) said high resolution video frames have a 4K or higher resolution and (ii) said low resolution video frames have a resolution small enough for wireless streaming.

12. The apparatus according to claim 10, said speakers are configured to output said audio as a 110 dB siren at 10 feet.

13. The apparatus according to claim 10, wherein said processor is configured to adjust at least one of a color, a frequency and a brightness of each of said light panels to sequence said light panels to provide a deterring light display.

14. The apparatus according to claim 10, further comprising a microphone, wherein said speakers and said microphone enable two-way communication between a person near said apparatus and a second person at a remote location.

15. The apparatus according to claim 14, wherein (i) said speakers and said microphone enable input and output for a conversational AI implemented by said processor configured to engage said target and (ii) an automated voice down message is generated using said conversational AI comprising a personalized message for said target determined in response to said video analysis.

16. The apparatus according to claim 10, further configured to communicate with a camera drone.

17. The apparatus according to claim 16, wherein (i) said apparatus is configured to provide a Wi-Fi tether for said camera drone, (ii) said camera drone is configured to (a) capture remote video data and (b) communicate said remote video data to said apparatus and (iii) said apparatus is configured to stream said remote video data received from said camera drone to a remote monitoring service.

18. The apparatus according to claim 10, wherein (i) said video analysis is configured to determine a location of said objects detected in said high resolution video frames, (ii) said location is used to track said objects detected in said area and (iii) said processor is configured to adjust said high intensity light beam according to said location.

19. The apparatus according to claim 10, wherein (i) said communication device transmits said video data to a monitoring service, (ii) security personnel at said monitoring service (a) view said video data and communicate input to said apparatus, (iii) said communication device receives said input and (iv) said processor uses said input to direct said high intensity light beam.

20. The apparatus according to claim 10, wherein said low resolution video frames are analyzed by said remote device to confirm an operating condition of said apparatus.

* * * * *